US011258602B2

(12) United States Patent
Daly

(10) Patent No.: US 11,258,602 B2
(45) Date of Patent: Feb. 22, 2022

(54) METHOD AND APPARATUS FOR SECURE PRIVATE KEY STORAGE ON IOT DEVICE

(71) Applicant: Amera IoT Inc., Dallas, TX (US)

(72) Inventor: Christopher J. Daly, Dallas, TX (US)

(73) Assignee: AMERA IOT INC., Dallas, TX (US)

( * ) Notice: Subject to any disclaimer, the term of this patent is extended or adjusted under 35 U.S.C. 154(b) by 76 days.

(21) Appl. No.: 16/917,583

(22) Filed: Jun. 30, 2020

(65) Prior Publication Data
US 2021/0266151 A1 Aug. 26, 2021

Related U.S. Application Data

(63) Continuation-in-part of application No. 16/888,815, filed on May 31, 2020, now Pat. No. 10,817,590.
(Continued)

(51) Int. Cl.
G06F 11/30 (2006.01)
G06F 12/14 (2006.01)
(Continued)

(52) U.S. Cl.
CPC .............. H04L 9/088 (2013.01); G06F 13/20 (2013.01)

(58) Field of Classification Search
CPC ................... H04L 9/088; H04L 9/0866; H04L 2209/805; H04L 63/062; H04L 63/0435;
(Continued)

(56) References Cited

U.S. PATENT DOCUMENTS 5,258,999 A 11/1993 Wernimont et al.
6,055,500 A 4/2000 Terui et al.
(Continued)

OTHER PUBLICATIONS

Patent Cooperation Treaty: International Search Report and Written Opinion for related PCT/US21/19267; Lee W. Young; dated May 7, 2021; 11 pages.

Primary Examiner — Amie C. Lin
(74) Attorney, Agent, or Firm — Gregory M. Howison

(57) ABSTRACT

An apparatus is disclosed for storing a private key on an IoT device for encrypted communication with an external user device and includes a proximity-based communication interface, encryption circuitry and IoT functional circuitry. The encryption circuitry includes a memory having a dedicated memory location allocated for storage of encryption keys utilized in the encrypting/decrypting operations, an encryption engine for performing the encryption/decryption operation with at least one of the stored encryption keys in association with the operation of the IoT functional circuitry, an input/output interface for interfacing with the proximity-based communication interface to allow information to be exchanged with a user device in a dedicated private key transfer operation, an internal system interface for interfacing with the IoT functional circuitry for transfer of information therebetween, memory control circuitry for controlling storage of a received private key from the input/output interface for storage in the dedicated memory location in the memory, in a Write-only memory storage operation relative to the private key received from the input/output interface over the proximity-based communication interface, the memory control circuitry inhibiting any Read operation of the dedicated memory location in the memory through the input/output interface. The IoT functional circuitry includes a controller for controlling the operation of the input/output interface and the memory control circuitry in a private key transfer operation to interface with the external user device to control the encryption circuitry for transfer of a private key from the user device through the proximity-based communication interface for storage in the dedicated memory location in the memory, the controller interfacing with the encryption circuitry via the internal system interface, and operational circuitry for interfacing with the user device over a peer to peer communication link and encrypting/
(Continued)

decrypting information therebetween with the encryption engine in the encryption circuitry.

10 Claims, 34 Drawing Sheets

Related U.S. Application Data

(60) Provisional application No. 62/981,996, filed on Feb. 26, 2020.

(51) Int. Cl.
*H04L 9/08* (2006.01)
*G06F 13/20* (2006.01)

(58) Field of Classification Search
CPC .............. H04L 63/0823; H04L 63/083; H04L 9/0863; H04L 9/0869; H04L 9/0894; H04L 9/3228; G06F 13/20; G06F 21/72; G06F 21/602; H04W 4/80; H04W 12/0471; H04W 12/041; H04W 12/009; H04W 12/069; H04W 12/63; H04W 12/65

See application file for complete search history.

(56) References Cited

U.S. PATENT DOCUMENTS

| | | | |
|---|---|---|---|
| 6,370,324 B1 | 4/2002 | Kawahara et al. | |
| 6,705,517 B1 | 3/2004 | Zajkowski et al. | |
| 6,750,917 B2 | 6/2004 | Yamada et al. | |
| 8,126,145 B1 | 2/2012 | Tewari et al. | |
| 9,049,010 B2* | 6/2015 | Jueneman | G06F 21/72 |
| 10,037,436 B2 | 7/2018 | White | |
| 10,250,387 B1* | 4/2019 | Guerin | G09C 1/00 |
| 2006/0242423 A1 | 10/2006 | Kussmaul | |
| 2013/0062420 A1 | 3/2013 | Hamman et al. | |
| 2014/0201536 A1 | 7/2014 | Fiske | |
| 2018/0176196 A1 | 6/2018 | Smith et al. | |
| 2018/0241556 A1* | 8/2018 | Brouwer | H04L 9/0869 |
| 2019/0014104 A1 | 1/2019 | Brands | |
| 2019/0289006 A1 | 9/2019 | Fang et al. | |
| 2019/0312854 A1* | 10/2019 | Fiske | H04L 9/0662 |
| 2019/0349762 A1 | 11/2019 | Bang | |
| 2020/0106606 A1* | 4/2020 | Pontaza Rodas | H04L 9/0891 |

\* cited by examiner

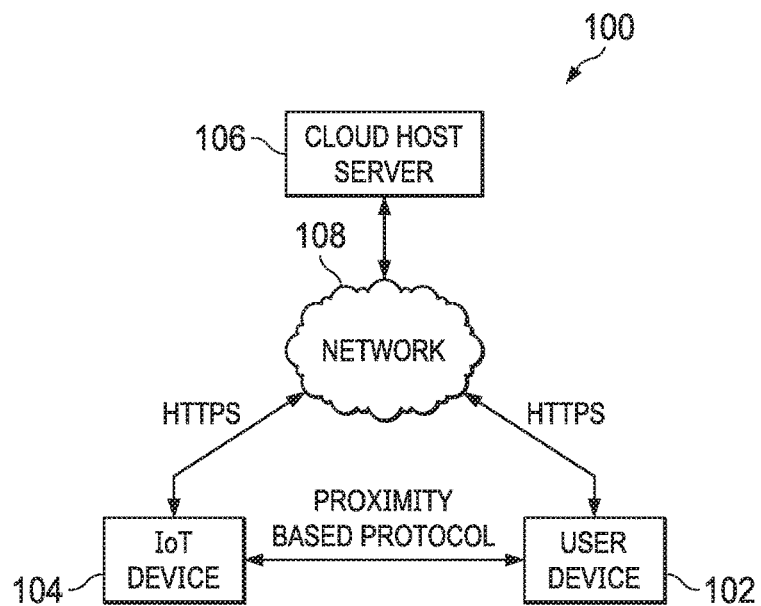
FIG. 1
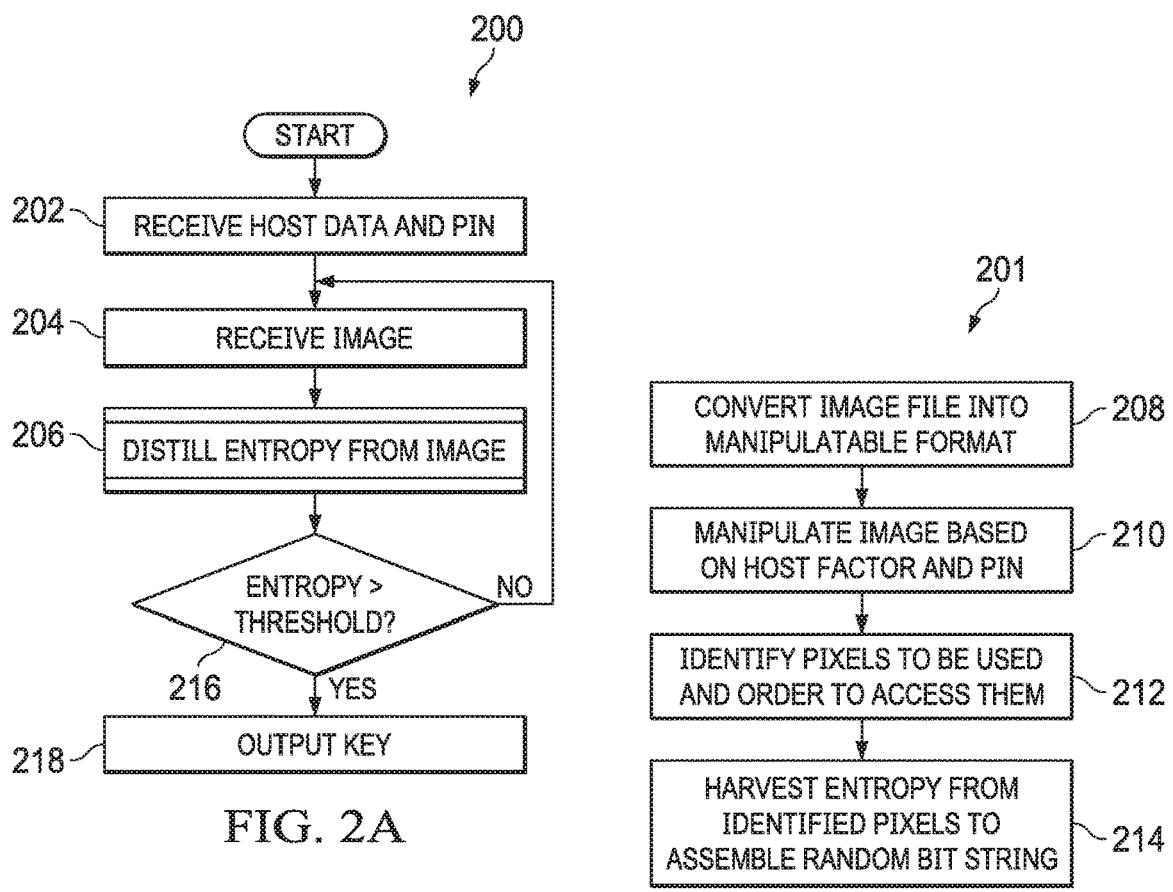
FIG. 2A
FIG. 2B

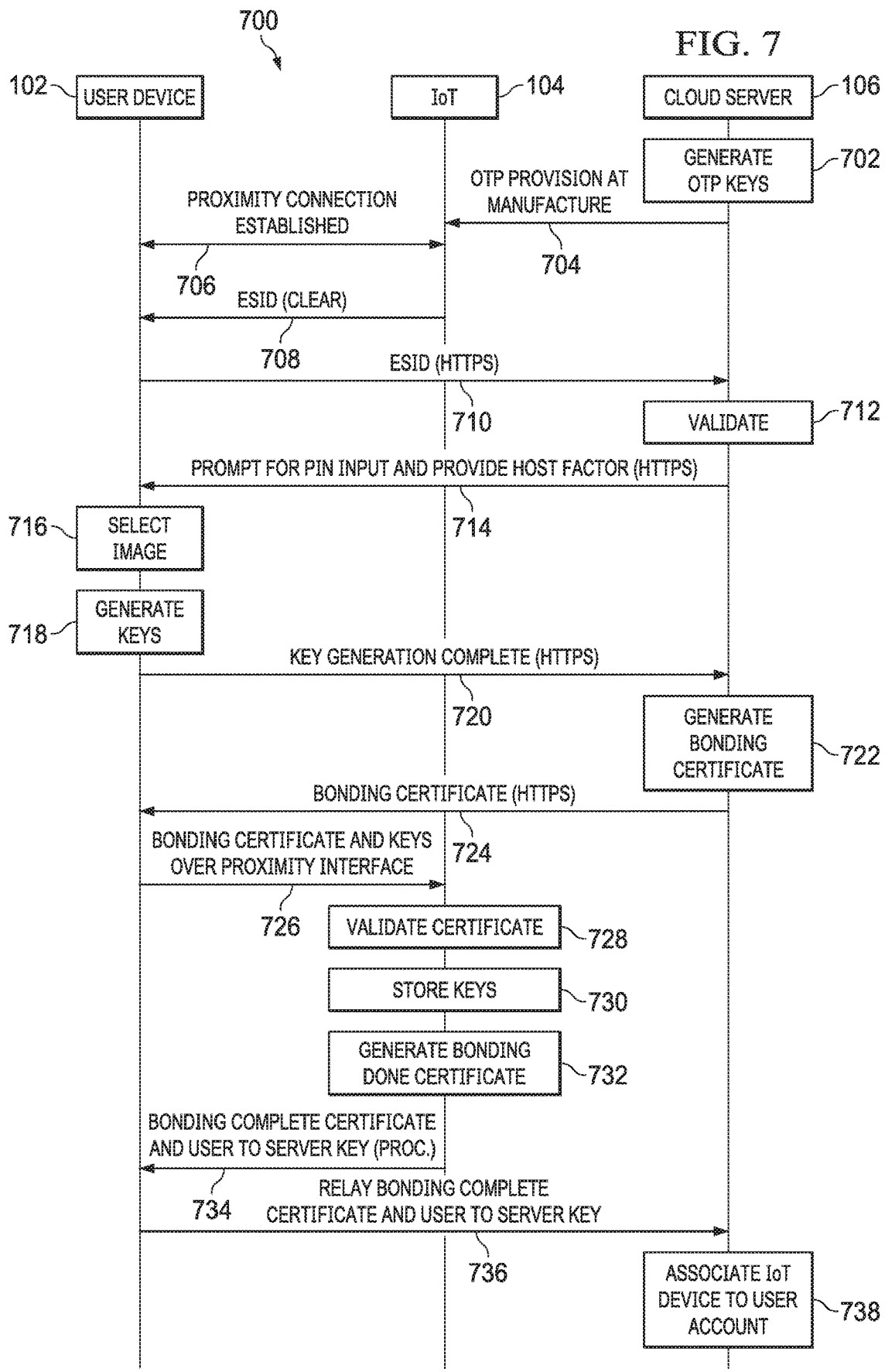

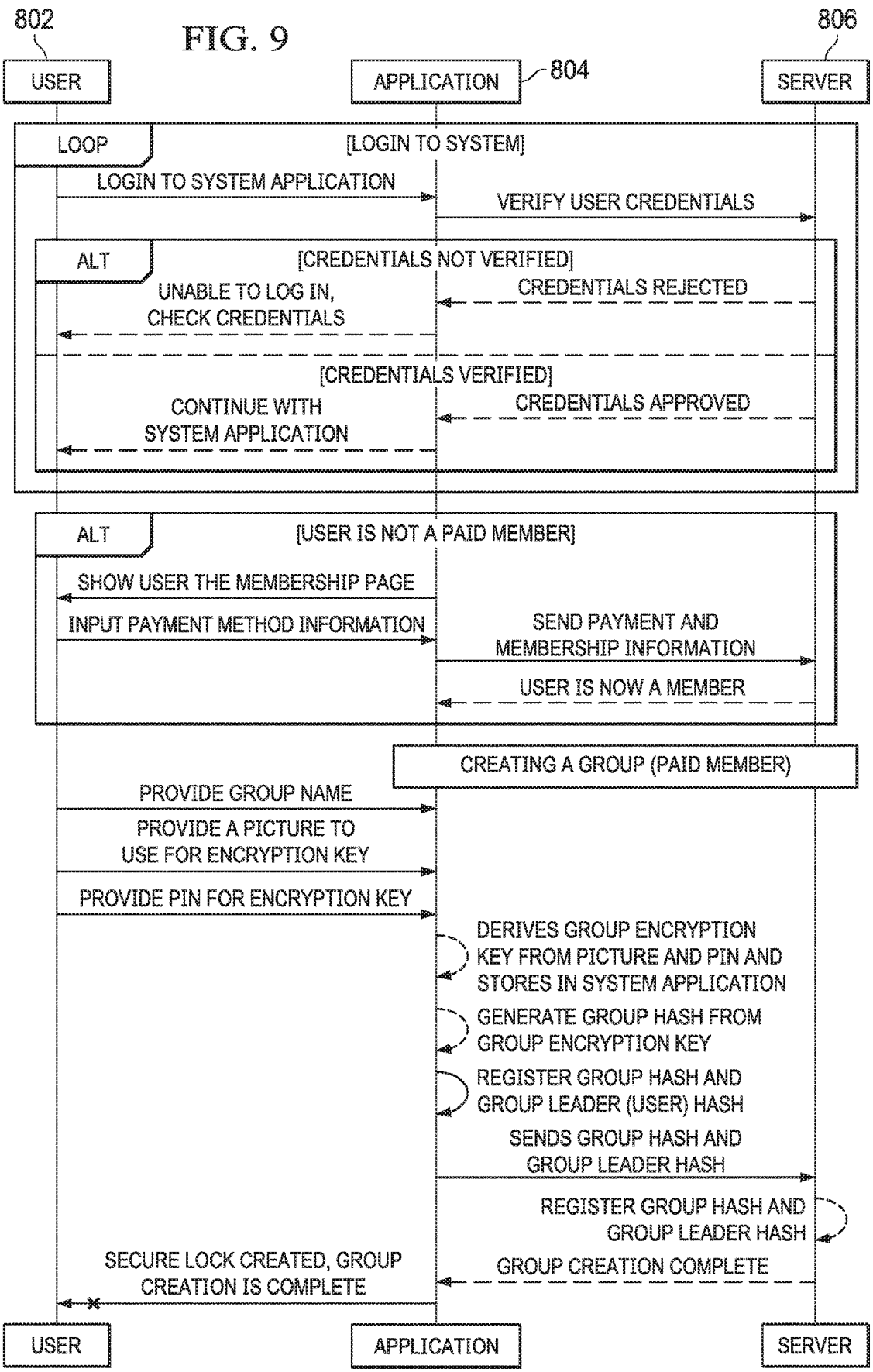

METHOD AND APPARATUS FOR SECURE PRIVATE KEY STORAGE ON IOT DEVICE

CROSS-REFERENCE TO RELATED APPLICATIONS

This application is a continuation-in-part of U.S. patent application Ser. No. 16/888,815, entitled METHOD AND APPARATUS FOR CREATING AND USING QUANTUM RESISTANT KEYS, filed on May 31, 2020. U.S. patent application Ser. No. 16/888,815 claims the benefit of U.S. Provisional Application No. 62/981,996, filed on Feb. 26, 2020, entitled TECHNIQUES FOR GENERATING QUANTUM RESISTANT KEYS, which is incorporated by reference in its entirety.

TECHNICAL FIELD

This disclosure relates to the field of cryptography. In particular, this disclosure relates to techniques for providing end-to-end cryptographic security including key generation, sharing, and use.

BACKGROUND

It has long been desirable to secure confidential communications so as to prevent unintended interception of information contained in those communications. One method of providing such confidentiality is the use of end-to-end encryption. End-to-end encryption can be achieved using ciphers, or keys. Ciphers are generally categorized as symmetric or asymmetric. Symmetric ciphers use a single key possessed by both parties to a communication. The same key is used both to encrypt and decrypt the communication. In order to ensure confidentiality, the parties must use a secure channel to share the key, as anyone who has access to the key is able to freely decrypt or encrypt communications using that key. Asymmetric ciphers use a pair of related keys. Each party to a secure communication possesses one of the pair of keys. One party uses their key, known as a private key, to generate a second key, known as a public key. This party provides their public key to the second party to the communication. The second party is able to encrypt data with the public key, and, ideally, only the owner of the private key is able to decrypt those communications. Accordingly, the owner of the private key does not need to be concerned about who has access to the public key, and it can be provided to the second party "in the clear," that is, over public channels where it may be overheard or intercepted.

Asymmetric cipher encryption and decryption is computationally more complex than symmetric cipher encryption and decryption. This is a tradeoff for the ability to easily and conveniently set up a confidential communication channel using an asymmetric cipher without needing to worry about unintended third parties ever obtaining the private key, and without needing an initial secure channel to communicate the key to intended second parties. This computational overhead makes asymmetric ciphers undesirable for communication of large amounts of data. Furthermore, a major concern with any given cipher is its robustness against attack, and in particular against brute force attacks. Some current asymmetric ciphers, such as Rivest-Shamir-Adleman (RSA) or Diffie-Hellman (DH) ciphers, are potentially unsafe in a post-quantum computing world.

SUMMARY

The present invention disclosed and claimed herein, in one aspect thereof, an apparatus for storing a private key on an Internet of Things (IoT) device for encrypted communication with an external user device having the same private key and includes a proximity-based communication interface, encryption circuitry and IoT functional circuitry. The encryption circuitry includes a memory having a dedicated memory location allocated for storage of encryption keys, an encryption engine, an input/output interface for interfacing with the proximity-based communication interface to allow information to be exchanged with the external user device in a dedicated private key transfer operation, an internal system interface for interfacing with the IoT functional circuitry, memory control circuitry controlling storage of a received private key from the input/output interface for storage in the dedicated memory location in the memory, in a Write-only memory storage operation, the memory control circuitry inhibiting any Read operation of the dedicated memory location through the input/output interface. The IoT functional circuitry includes a controller for controlling the input/output interface and the memory control circuitry in a private key transfer operation to interface with the external user device to control the encryption circuitry for transfer of a private key from the user device through the proximity-based communication interface, the controller interfacing with the encryption circuitry via the internal system interface, and operational circuitry for interfacing with the user device over a peer to peer communication link and encrypting/decrypting information therebetween with the encryption engine in the encryption circuitry.

BRIEF DESCRIPTION OF THE DRAWINGS

For a more complete understanding, reference is now made to the following description taken in conjunction with the accompanying drawings in which:

FIG. 1 illustrates a system for generating a private key and storing on an Internet of Things (IoT) device;

FIG. 2A illustrates a flowchart for a method of distilling entropy from a photograph and generating a private key;

FIG. 2B illustrates a flowchart for processing of the harvesting operation;

FIG. 7 illustrates a sequence diagram for communication between the user device, an IoT device and a host.

FIG. 9 illustrates a sequence diagram for a group creation sequence;

FIGS. 18A and 18B illustrate a sequence diagram for authenticating a user via direct access the device the:

DETAILED DESCRIPTION

Figure 2C:
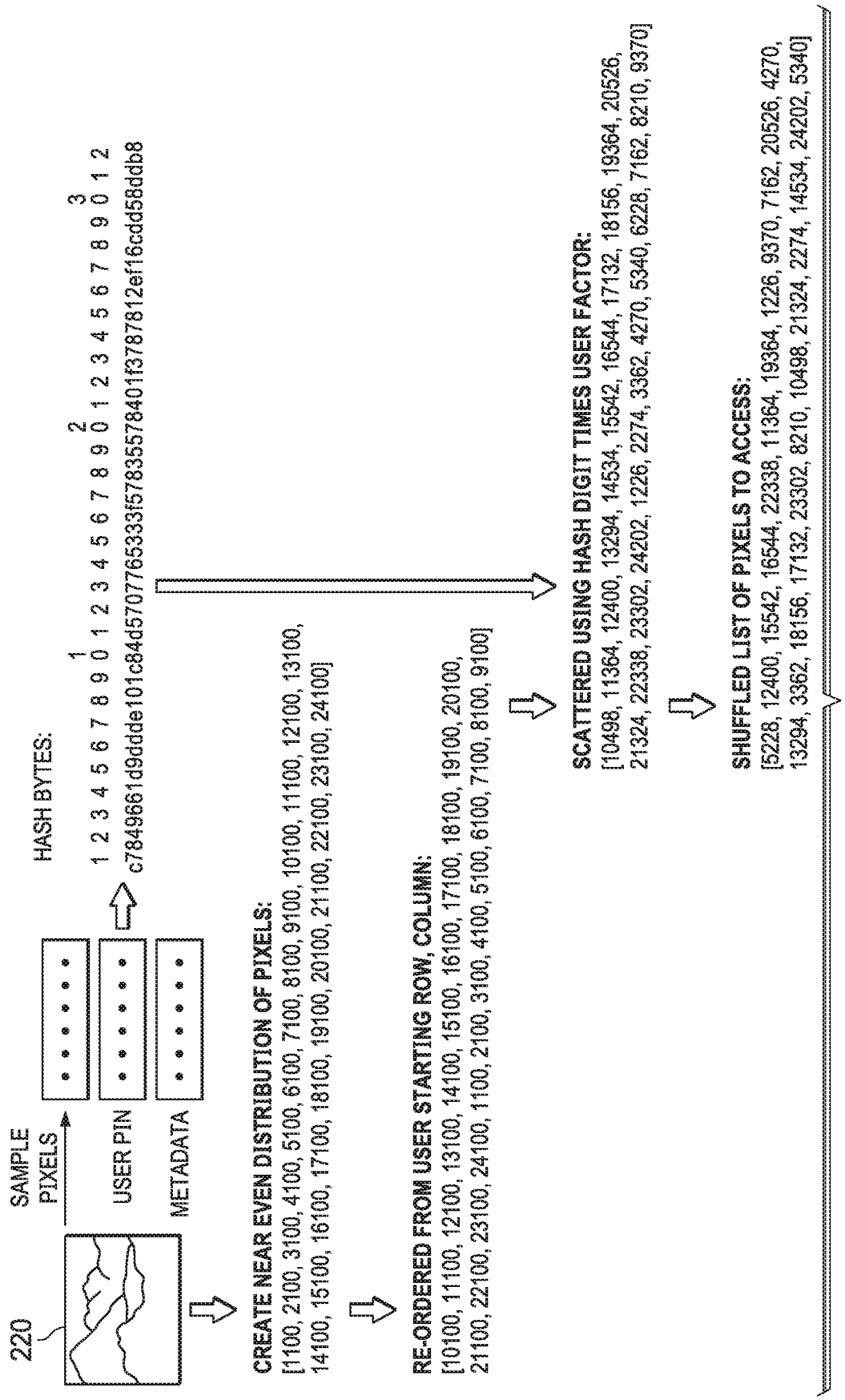
FIG. 2C illustrates a diagram of a pixel access plan.

Referring now to the drawings, wherein like reference numbers are used herein to designate like elements throughout, the various views and embodiments of techniques for generating quantum resistant keys are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Embodiments of the present disclosure contemplate that both parties to a confidential communication using symmetric ciphers must possess the same cryptographic quality key, while preventing any third parties from obtaining that key. For "offline" threats, such as securing data at rest or recorded traffic (i.e., securing information that is static rather than real time, which allows a malicious third party as much time as they need to decrypt the cipher), use of a true random number generator (TRNG) for key generation is the most secure option. With a truly random key, a human or algorithm can gain no significant advantage over brute force guessing of the key, as there are no discernable patterns that can be exploited to gain such an advantage.

A TRNG leverages physical events such as atmospheric noise, atomic decay, or shot noise to seed the random number generator (RNG). Some computing devices that are unable to leverage physical events instead leverage operating system entropy from interrupts, mouse movements, or the like to seed the RNG. Although this approach is weaker than one using physical events, in some cases it can be strong enough to provide an acceptable quality cryptographic key. However, smaller computing devices such as IoT devices do not have enough operating system entropy to make even this approach viable. Accordingly, the present disclosure contemplates the generation of cryptographic quality keys for communications with IoT devices.

Embodiments of the present disclosure further contemplate the need for securely and confidentially distributing a symmetric cipher key between parties. One secure method is quasi-physical distribution. A more flexible method is use of an asymmetric cipher to encrypt a symmetric cipher key for transmission to a second party. Many asymmetric ciphers, however, are not quantum safe (i.e., safe from brute force attacks by a quantum computer). Moreover, the use of an asymmetric cipher to establish a secure channel is predicated on the ability of both parties to produce a high quality asymmetric cipher key. As discussed above, some devices, such as IoT devices, lack access to enough entropy to generate a high quality key for use with an initial asymmetric cipher exchange. Accordingly, there is a need for a system for secure key exchange with an IoT device. Existing practice for an IoT device is to embed a cryptographic key, which is provisioned during manufacture to both a chip and a server. By definition, such keys are known by the manufacturer and are not private to the using parties.

Embodiments of the present disclosure additionally contemplate that IoT devices are often placed in an environment where they are not physically secure. As a result, it should be assumed that malicious actors will be able to gain physical access to the devices, and will be able to obtain copies of any static data storage, desolder and probe chips, and conduct various other attacks on the devices. Furthermore, user devices often communicate with the IoT devices through a cloud host (or cloud server), and device vendors or the cloud host may be able to access data stored on the cloud host. Accordingly, there is a need for "zero knowledge" encryption of stored data on the device (i.e., encryption that does not allow service providers or others with physical access to the device to access data).

To meet the above needs, embodiments of the present disclosure include harvesting high quality entropy data from, in a disclosed embodiment, an image using a user chosen numerical sequence (e.g., a personal identification number (PIN)) and an external factor to parameterize the harvesting of the entropy. It should be understood that the disclosed embodiment utilizing an "image" refers to a photograph that is digitized to provide a dataset that can be considered "ordered" by the fact that it is not completely random as it has a bias that is imparted thereto by the external environment from which the image or photograph was derived. For example, if the image was created with purely random pixels with random RGB values, it would not be considered ordered. Typical photographs, on the other hand, will have certain portions that are associated with a sky, for example, and have relatively similar pixel values adjacent to each other in that particular area of the image. Thus, they have a certain level of order inherent in the associated pixel dataset.

It should also be understood that this "dataset" can be represented by any fixed dataset that can be stored and retrieved at a later time. Thus, the dataset is not limited to an image and it can be any "fixed" dataset. Fixed datasets can be such datasets that are used, for example, in machine learning. There are various datasets that are implemented for such. For example, image data in the form of facial recognition, action recognition, object detection and recognition, handwriting and character recognition, and aerial images could be utilized. Text data in the form of reviews, news articles, messages, Twitter and tweets, dialogue and other text can be utilized as a database. Sound data in the form of speech, music, etc. can also be used. Signal data in the form of electrical signals, motion-tracking signals, etc. can be used. Datasets can be extracted from physical data such as, high energy physics, various physical systems, astronomy, or sciences and other physical environments. Biological data could be utilized to create datasets, such as datasets relating to humans, animals, plants, microbes and drug discovery. Additionally, multivariate data forms of financial data, weather data, census data, transit data, Internet data and games could be used to create datasets. These various datasets are stored and made available to various companies for machine learning. All of these datasets have entropy associated there with and any of these datasets when used in conjunction with the user PIN can yield a resulting entropy that can be harvested as harvested entropy, i.e., a subset of the resulting user PIN/dataset entropy.

Embodiments associated with the disclosed embodiment also include imprinting the harvested entropy into IoT devices as keys for use as a long-term secret. Embodiments additionally include leveraging the imprinted keys as a shared secret for end-to-end encryption with zero knowledge at the host for both commands and data. Embodiments further include creation of keys at a host for use as a shared secret for communications between the host, applications, and devices.

Referring now to FIG. 1, there is illustrated a system 100 according to embodiments of the present disclosure. The system 100 includes a user device 102, which can be any suitable device, such as a mobile phone, a laptop computer, a tablet, a wearable device, or the like. The system further includes an IoT device 104, which can be any suitable device, such as a smart surveillance camera, a smart speaker, a doorbell camera, a smart door lock, a smart thermostat, or the like. In some embodiments, the user device 102 and the IoT device 104 are capable of connecting to each other using a proximity based protocol such as near-field communication (NFC), BLUETOOTH® Low Energy (BLE), or the like. The system additionally includes a cloud host server 106, which connects to the user device 102 and the IoT device 104 through a network 108, such as the Internet. In some embodiments, the cloud host server 106 connects to the user device 102 and the IoT device 104 using a protocol such as HTTPS. It is understood that the system 100 can include any number of each of the user device 102, the IoT device 104 and the cloud host server 106.

Referring now to FIG. 2A, there is illustrated a method 200 for generating keys based on entropy according to embodiments of the present disclosure, which entropy is derived from a photograph, as will be described hereinbelow. In some embodiments, the method 200 is performed by a user device 102. For example, the method 200 could be performed by a mobile phone that is connected to a cloud host server 106 via a mobile data connection using the Hypertext Transfer Protocol Secure (HTTPS) protocol and having a resident application for such operation. The mobile phone can be able to connect to an IoT device 104 using NFC when the mobile phone is within close enough proximity to the IoT device 104 for NFC to function. In some embodiments, the method 200 is implemented as an application that runs on a processor of the user device 102—a device resident application. This application could be downloaded onto the user device 102, for example from the cloud host 106. Although the method 200 is described with respect to a mobile phone as the user device 102, it is understood that any suitable device could perform the method 200.

In this method, as will be described more fully hereinbelow, the disclosed embodiment harvests a random key from user PIN/picture entropy. This is compared to two scenarios where the random key is harvested from a local TRNG or it is a service provider key which is used. The scenarios are as follows:

Scenario 1: As an individual user, in accordance with a disclosed embodiment, the individual user is able to harvest a random key from PIN/picture entropy.
    Can it be cryptographical high quality? Yes
    Is the individual user's data secret from vendors? Yes
    Is individual user's data secret from attackers? Yes
    Does the individual user have a way to remember it? Yes, picture and user PIN is not hard to remember
    Can the individual user recreate it? Yes
    Does the individual user have a secure way to distribute it to others, besides physical? Yes. Sharing pictures does not reveal the key. The user PIN can be arbitrarily long distributed through voice, SMS, other. It is as secure as it needs to be.

Scenario 2: As an individual user, the individual user can harvest a random key from a local TRNG random physical phenomenon, such as heat source, processor entropy and so on.
    Can it be cryptographical high quality? Yes
    Is the individual user's data secret from vendors? Yes
    Is the individual user's data secret from attackers? Yes
    Does the individual user have a way to remember the key? No
    Can the individual user recreate the key? No
    Does the individual user have a secure way to distribute the key to others, besides physical? No. Physical delivery via USB drive is the only option.

Scenario 3: As an individual user, the individual user relies on a service provider harvested random key.
    Can it be cryptographical high quality? Yes
    Is the individual user's data secret from vendors? No. By definition the vendor can access the individual user's data
    Is the individual user's data secret from attackers? Limited by vendor security
    Does the individual user have a way to remember it? Yes, if it is in a vendor's key vault
    Can the individual user recreate it? No
    Does the individual user have a secure way to distribute it to others, besides physical?
    Limited. The distribution is done from vendor's store to individual parties through HTTP/TLS, which has opportunities for discovery.

Beginning at step 202, the user device 102 receives host data and a user PIN (Personal Information Number). This user PIN is a PIN that is created by the user and is personal to the user. The host data can also be referred to as a host factor or second factor and is generated by the host and provided to the user for the purpose of generating a private key using the inherent entropy of a known photograph, which will be described in more detail hereinbelow. Further, for each user PIN, the host can generate multiple different host factors to allow for generation of different private keys for the user using the same photograph and PIN, the operation of which will be described hereinbelow. In some embodiments, the host data is received from the host cloud server 106 through the network 108, for example using HTTPS protocol to provide standard security. HTTPS is not perfectly secure, however, and it can be assumed that it is possible for the host data to be intercepted.

The user PIN is entered by the owner of the user device 102 that is performing the method. Accordingly, the PIN is not received through any communications channel, and is not prone to interception. In order for the PIN to be compromised, a physical attack must be made on the phone. For example, an attacker must physically observe the user entering the PIN, or physically access the PIN if it is stored on the device. In preferred embodiments, the PIN is 6-12 digits long and is comprised of alphanumeric characters.

In some embodiments, the user device 102 also receives a desired key size for the output key at step 202 during the key creation operation. For example, the key size can be 256 bits. This key size can also be a predetermined default that is set in an application that implements the method. The key size is a subset of the entropy source, i.e., the photograph, such that, for example, if the photograph has 4,000 pixels, each pixel comprised of 3 bytes (e.g., color—red-green-blue or "RGB"), that computes to 4,000×8 bits/byte×3=96000 bits. In some embodiments, the application contains a default key size of 256 bits but a user may specify a larger key size, or the cloud host 106 can specify a larger key size (for example in the host data), to obtain a stronger key.

At step 204, the user device 102 receives an image. The image can be received in any suitable fashion. For example, when the user device 102 is a mobile phone, the image may be captured using a camera that is part of the mobile phone. Alternatively, the user may choose an existing image from another source, for example by downloading the image from the internet. This image or photograph is then kept by the user so that the user can later recreate the private pey(s) with this image, user PIN and host data/factor. It is not that multiple users cannot have the same image or photograph; rather, it is the combination of the three factors of image/photograph, user PIN and unique host data/factor that imparts security to the generated private key. In addition, as will be described hereinbelow, the host does not possess the photograph, so the private key cannot be created or discovered via information lying solely on the host servers.

Any given image embodies a certain amount of entropy based on the amount of variation in color between individual pixels of the image. In general, when dealing with images, it is understood that an image inherently has associated entropy. This entropy, from one viewpoint, is a way to relate the amount of uncertainty about an event associated with the given probability distribution, wherein entropy can serve as a measure of "disorder." As a level of disorder rises, the entropy rises and events become less predictable. With respect to a photograph or image, this can be represented by a dataset of digitized pixel values and the entropy can be considered to be the randomness of the dataset associated with the image, which corresponds to a measure of the amount of information within an image. That is to say, a very complex image has more information contained therein than a very simple image. Just the image itself on a document for, by way of example, a color image with a resolution of 1920×1080 with 10,000 colorful dots and an image with only five gray dots would vary differently in the amount of information within the image and, consequently, the amount of randomness or entropy.

It is possible to calculate the entropy H(x) with, by way of one example, use of the following equation based on Claude Shannon's work commonly known as Shannon entropy:

$$H(x) = -\sum_{i=1}^{n} p_i(s_m)\log_2(p_i(s_m)).$$

The $p_i$ value is the occurrence probability of a given symbol. Here the symbols are pixels. For example, consider a single-channel 8-bit image (256 intensity levels per pixel), one can compute $p_i$ as follows:

$$P_i = \frac{\text{Number of occurrances of the intensity level } i}{\text{Number of intensity levels}}$$

This is basically the probability that the outcome x happens. M are all the possible outcomes. The probability density $p_i$ is calculated based on, in one example, the value of i being the potential values of the pixel, wherein each pixel can have 256 values for each color. This is just one example to determine the randomness of the particular image or photograph. The reason to consider the entropy for the entire image is to determine if any particular photograph or image has a sufficient level of uncertainty or randomness inherent thereto in order to provide the basis for harvesting the private key therefrom, as will be described in more detail hereinbelow. It should also be appreciated that certain images have very low entropy, such as a completely white image—which basically has no entropy—and a relatively complex image—which has a higher entropy. Within any particular image, it should also be appreciated that there are certain areas that have higher entropy than others. Each of these photographs or images has certain order associated therewith as compared to an image of completely random pixels. Thus, the dataset associated with a photograph or image will be an ordered dataset, with the order defined by the ordered information contained within the photograph. There are certain biases that are naturally associated with the photograph, such as a scene having a sky in the upper portion thereof and the scenery in the lower portion thereof.

At step 206, entropy is distilled from the image using the host data and the PIN received at step 202. In this process, one or more harvesting processes is applied to the ordered dataset in order to extract therefrom the information that is who comprise the private key, i.e., 256 bits in one example. This process is described in further detail with respect to FIG. 2B.

Referring now to FIG. 2B, there is illustrated a sub-method 201 for distilling, or harvesting entropy from a received image using host data or factor and a user PIN. Distillation of entropy from the image involves selecting a number of pixels from the image (i.e., sampling pixels from the image), from which bits of information are selected for use as a key. In this way, high quality cryptographic keys can be generated without the use of a RNG, which require substantially more processing capability. The process of selecting or sampling pixels is referred to herein as pixel harvesting. Modern digital images obtained from a smartphone camera often contain 10 megapixels or more. Assuming a standard RGB camera using 24 bit color, each RGB pixel contains 24 bits of information—8 bits for each of the red (R), blue (B), and green (G) color channels of the pixel. A 10 megapixel image thus contains 24 million bits of information. The pixel sample size required to generate a key will be substantially less than the number of pixels in an image, and accordingly a large number of unique keys may be generated from a single image's entropy using the same user PIN and an associated host factor. As will be described in more detail hereinbelow, the multiple harvesting processes can be individually selected by the user PIN, and the host factor can be different for a particular user and their associated user PIN in order to allow different private keys to be generated from the same photograph and same user PIN. For example, the user may have multiple applications, each requiring a private key. Since the host generates the host factor, a relational database can be maintained at the host server, wherein the generation of the host factor thereat results in a separate and unique host factor being generated for a particular user, a particular user PIN of that user, and a particular image or photograph (noting that the host does not have access to the particular image or photograph). Thus, with the particular image or photograph, the user PIN and any one of the unique host factors associated with that user, a unique and individual private key can be generated. Further, all that is required to re-create the private key is the same particular image or photograph, the same user PIN and the associated unique host factor.

At step 208, the image file is converted into a manipulatable format. This can include, for example, determining a set of "orientation pixels" comprising pixels at the corners of the image and at points between the corners of the image. These pixels can be stored and used as reference points to determine whether the image is in its original orientation in the future. This is useful when reestablishing keys based on the same image or photograph. The orientation pixels can, in some embodiments, be used in a scatter hash, which is discussed further below.

In some embodiments, step 208 also includes eliminating duplicate pixels in the image (e.g., compressing the image). This process involves scanning the pixels of the image in sequence and removing duplicate pixels (having the same value) adjacent to each other. The selection of duplicate pixels for use in generation of the key may reduce the entropy of the selected pixels used to generate the key, and elimination of duplicate pixels as a preliminary step in this method can result in higher entropy of data harvested from the image.

The sub-method 201 can also include initial checks at this point to disqualify the image from being used based on various benchmarks. In some embodiments, after compression, a threshold amount of 1000 pixels of remaining image data per bit of the key may be required. This may be done to ensure that there is an adequate sample size of pixels to ensure high quality cryptographic keys are generated as an output. In this case, if the desired output comprises 256 bit keys, then for each desired key, 256,000 pixels of image must remain after step 208. Under these constraints, a 10 megapixel image could produce up to 39 keys if very few pixels were eliminated. In other embodiments, a benchmark of a predetermined number of unique colors may be required per data bit of the key. If the image has too few unique colors, the lack of variation could translate to a lack of entropy. Accordingly, this requirement may be imposed to ensure that there is an adequate amount of entropy to ensure high quality cryptographic keys are generated as an output. It should be understood that any method for evaluating a particular photograph or image for its level of uncertainty or entropy could be utilized to determine that there is a sufficient amount of uncertainty or entropy in the resulting "ordered dataset" of remaining pixels. It may be that certain areas of the image are analyzed and, if determined to have a very low level of uncertainty or entropy, they are just eliminated from the ordered dataset.

At step 210, the image is manipulated based on the host data or factor and the user PIN. In some embodiments, the first 6 digits of the PIN each correspond to a direct transformation of the image that affects the pixels harvested, or selected, in the harvesting operation and the order in which they are harvested. This transformation of the image serves to make it difficult to recreate the user's keys based on possession of the image. Furthermore, this transformation eliminates local bias to a particular area of the image, and correlation between the pixels of the image that may be introduced by predictable order within the image. For example, pictures taken outdoors tend to have a large portion of sky and a large portion of ground, and attackers may be able to take advantage of such assumed order, however if the image is transformed before pixels are harvested, then this sort of order cannot be taken advantage of.

This harvesting operation for obtaining the 256 bits, as defined by the predetermined number of bits that are set for the private key, is basically a method to extract or distill these bits from the image. As described hereinabove, the first step is to ensure that the image or subset thereof has a requisite level of uncertainty or entropy. As will be described in more detail hereinbelow, the application that resides on the user device 102 has a plurality of preset applications or operations associated therewith. They can be operations that require the user PIN and host data or factor or they can be operated independently. If just the inherent entropy in the photograph or image is to be utilized for the harvesting operation, the operation could be first, to define the length of the private key and then, second, to process the photograph or image via the associated ordered dataset to extract the number of bits required by the private key from a defined location within the ordered dataset. This, of course, is a very simplistic use of the photograph or image and its associated ordered dataset and will result in only a single private key for a given ordered dataset. Therefore, anybody possessing the image or photograph can potentially discover the process for extracting the key therefrom.

By employing a plurality of subsequent harvesting processes that are dependent upon the user PIN and the host data or factor, a much higher level of security can be imparted to the private key. As such, the plurality of harvesting processes is disposed on the user device 102 as a part of the application and the processes are selected/manipulated via the user PIN and the host data or factor. Since the user PIN is a fixed user PIN that is personal and unique to the user that owns this user PIN, with the use of this user PIN in the absence of the host data or factor, a single private key can be distilled from the photograph. As such, all that would be required to re-create the private key is the user PIN and the original dataset associated with the original photograph or image. The use of this second host data or factor that is generated by the host and associated with the user PIN imparts another level of difficulty to any individual discovering the private key, even if they have the photograph in their possession. In a fairly straightforward operation, the user PIN can just be utilized to select among the plurality of harvesting processes and then the host data or factor is utilized to manipulate the operation of that process. This will be described in more detail hereinbelow.

In one example of use of harvesting processes, a plurality of harvesting processes is provided, which are made to transform the image and its associated ordered dataset. Each alphanumeric digit of the user PIN can be used to parameterize an associated process, such that each process can function in different ways depending upon the value of an associated digit of the user PIN.

In some embodiments, one digit of the PIN in an associated harvesting process may determine rotation or inversion of the image for that particular harvesting process. Based on the alphanumeric character chosen to be the first digit of the PIN, one of a set of predefined rotation values may be applied to pixels of the image. For example, a lookup table or relational database maintained by the application within the user device 102 could be consulted to determine the value that is related to the chosen PIN digit. This harvesting process and its associated transformation disrupt statistical tendencies of the image due to, for example, the presence of sky or ground in the picture.

A second digit of the PIN may start a scramble pattern in an associated harvesting process. That is, the pixels that are ultimately harvested from the image may be chosen in a scrambled order, rather than in a left-to-right, top-to-bottom order, or any other monotonic order. The scrambling algorithm can use pixel data as a randomizing input, and the PIN digit can determine where the input starts. This harvesting process performs a transformation that disrupts correlation that might exist between pixels in adjacent areas of the image if they were accessed in a monotonic order. For example, adjacent areas of an image often share similar lighting and colors, and attackers may be able to exploit this tendency for correlation without the scrambling of harvested pixels.

A third digit of the PIN can be used in association with a separate harvesting process to determine an increment between harvested pixels. That is, after the pixels are rotated and scrambled, this digit of the PIN is used to determine that only one pixel out of a given number of pixels (e.g., out of every 100 pixels) is harvested. In some embodiments, the method associated with this harvesting process begins from a default increment and the PIN digit adjusts that increment by a percentage. This yields a uniform distribution of pixels to sample, which further eliminates bias towards a local area of the image, and serves to disrupt calculations from attackers.

A fourth digit of the PIN can be used in association with a separate harvesting process to determine a column of pixels to begin pixel harvesting at. For example, rather than beginning harvesting at the left-most or right-most column of the image, the fourth digit of the PIN can be used to parameterize a function that shifts the starting column away from the edge of the image. This disrupts assumptions by attackers that pixel harvesting will begin predictably at the first column and first row of the image.

In a similar manner, a fifth digit of the PIN can be used in association with a separate harvesting process to determine a row of pixels to begin pixel harvesting at. For example, rather than beginning harvesting at the top-most or bottom-most row of the image, the value of the fifth digit of the PIN can be used to parameterize a function that shifts the starting row away from the edge of the image. This similarly disrupts assumptions by attackers that pixel harvesting will begin predictably at the first row of the image A sixth digit of the PIN can be used in association with a separate harvesting process to generate a scatter pattern based on a hash. For example, the method can begin from a default assumption of harvesting pixels equidistant from each other in the image. This default can be modified such that each accessed pixel location is offset by successive bytes in a hash multiplied by the sixth digit of the PIN, and this is the scatter pattern. The hash can be, for example, a Secure Hash Algorithm—256 bit (SHA256) hash that is calculated from the user PIN, the host factor, and the orientation pixels. Multiplication of each byte of the hash by the sixth digit of the PIN further modifies the harvesting, and the number of possible unique pixel harvesting sequences is such that the probability of brute force guessing the used harvesting sequence is the same as the probability of brute force guessing the SHA256 hash. It is noted that, in this particular example, the host factor is actually utilized as part of the harvesting process. Thus, it can be appreciated that each unique host factor associated with each unique user PIN associated with each unique ordered dataset associated with the original image or photograph results in a unique private key. Since the photograph and its associated ordered dataset are fixed, changing of the host factor can result in the ability to create multiple private keys from a given photograph or image and a user PIN.

It is understood that the purpose of the transformations performed in step 210 is to increase the difficulty of brute force attacks used to recreate a key based on partial information. Even if the attacker obtains the image used to generate the keys, these transformations greatly increase the difficulty in determining the key from the image. As the transformations are done using both the user's PIN and the externally provided host factor, an attacker must also acquire these pieces in addition to the image to have access to all of the data used to generate the keys. Of course, an attacker would also have to have knowledge of the harvesting processes that were utilized.

At step 212, pixels to be harvested are selected, and the order in which they are to be harvested is selected, based on the manipulation done in step 210. This can also be referred to as generating a pixel access plan. First, a nominal pixel access distribution is determined. This can include calculating a sample size of pixels. This sample size is calculated based on a number of bits to be harvested per pixel for use in generating a key. Determining the nominal pixel access distribution can further include calculating an increment between pixels to be accessed. This refers to a number of pixels to skip over between pixels selected to be harvested. For example, it may be desirable to achieve a uniform distribution of accessed pixels, and based on the number of pixels in the image and the determined pixel sample size, an increment between pixels is chosen such that the uniform distribution of accessed pixels is achieved. A uniform distribution of accessed pixels can further reduce local bias to any particular area of the image.

As discussed above, the increment between accessed pixels can be modified based on a digit of the user PIN in an associated harvesting process. In some embodiments, the size of the increment between accessed pixels can be varied from 0-15% based on the value of a predetermined one of the digits of the user PIN. For example, the default increment amount could be determined to be 500 pixels, and this amount could be increased by 10% based on the digit of the user PIN to 550 pixels. This increases the difficulty of an attacker determining the distribution of the harvested pixels while maintaining the uniformity of the pixel distribution in order to reduce local bias.

Based on the modified increment, a list of pixels to be accessed can be generated. For example, as discussed above, a starting row and column of the image can be determined based on digits of the user PIN in an associated harvesting process. The pixel located at the intersection of the starting row and column is selected as the first pixel in the access list, and the increment is applied to select the next pixel. For example, if the modified increment is 550 pixels, then the pixel 550 pixels in sequence along the row is selected as the next pixel in the access list.

In some embodiments, the pixel access list is additionally modified based on a scatter pattern and associated harvesting process. As discussed above, a hash (such as a SHA-256 hash) can be calculated based on the user PIN, the host factor, and the orientation pixels. This results in a pixel access list that is uniquely determined for each image, user PIN and host factor. For each pixel to be harvested (i.e., each pixel in the access list), the location of the pixel can additionally be offset based on the hash. For example, each successive byte of the hash can be multiplied by a predetermined digit of the user PIN plus 1, and the result can be added to the location of the pixel in the access list to further modify the location of the accessed pixels. Due to the underlying uniform distribution of the locations of the pixels in the access list, the distribution of the pixels remains uniform after this further modification, and the modification makes it more difficult for attackers to determine the harvested pixels. In some embodiments, if the locations of the accessed pixels exceed the locations available in the image after this modification, the list can wrap back to the beginning of the image (i.e., back to the first row and column of the image).

Although the pixel access list at this point has been modified to increase the difficulty of attackers discerning the accessed pixels, the list is still in monotonically increasing order (i.e., each pixel in the access list is located at a later position in row, column, or both than the previous pixel in the access list). In order to remove this predictable pattern to avoid potential determination by attackers of correlation between the accessed pixels, the access list can be shuffled. For example, a Fischer-Yates shuffle (or Knuth shuffle) can be used. This shuffle exchanges successive entries in the pixel access list with another entry chosen based on a random integer between 0 and an index number of the entry being swapped (e.g., for the $n^{th}$ entry in the list, the random integer would be chosen between 0 and n).

An example of the pixel access plan is illustrated in FIG. 2C. In this example, an image 220 is processed with sample pixels distilled therefrom in accordance with the process described hereinabove.

At step 214, after the pixel access list has been determined, modified, and scrambled, bits are harvested based on the pixel access list. Again, this pixel access list is created in accordance with the execution of the various harvesting processes. A random string of bits can be assembled by simply concatenating the RGB values of each pixel in the pixel access list, and this random string of bits can be used as a cryptographic key. This can be referred to as a raw mode of harvesting pixels. Statistically, however, the high order bits of each color byte in an image tend to have more zeroes than ones. This pattern could make keys generated with the raw mode vulnerable to attack. Different modes of harvesting the pixels from the pixel access list can be used to remove this statistical correlation, and thereby generate keys with reduced vulnerability to attack. Again, the more harvesting processes that are used and the more complex these harvesting processes are, the less vulnerable the private key is to attack.

One alternative approach to pixel harvesting modes involves combining the R, G, and B bytes of each pixel in various fashions to create a single byte of information from each pixel. An example of such a combination pixel harvesting mode is a low bit merge mode. In this mode, the 3 lowest order bits of two colors of a pixel are concatenated with the 2 lowest order bits of the third color of the pixel to form a single byte of information. Additionally, the color bytes from which 3 bits are chosen can be rotated with each harvested pixel (e.g., 3 bits can be chosen from each of the R and G bytes in one pixel, while 3 bits are chosen from the G and B bytes of the next pixel, and so on). Bytes generated in this fashion can then be concatenated together to form a full key. Compared to the raw mode, this reduces the statistical correlation between bits in a resultant key created by concatenating bytes of information generated from the pixel access list.

An alternative combination pixel harvesting mode is a pixel product mode. In this mode, the R, G, and B bytes of a pixel are multiplied into a product, which is masked to a single byte of information. This reduces high order zero bias; however, some statistical correlation from the original pixel may remain. Bytes generated in this fashion can then be concatenated together to form a full key. Compared to the raw mode, this reduces the statistical correlation of a resultant key to the original pixels. This pixel harvesting mode has similar strength to the low bit merge mode.

Another alternative combination pixel harvesting mode is a pixel exclusive or (XOR) mode. In this mode, the R, G, and B bytes of each harvested pixel are bitwise XORd into a single byte of information. For a single sampled pixel, this mode shows high order zero bias; however; sampling multiple pixels using this mode will cancel this bias. For example, when more than 8 pixels are sampled, the statistical correlation to the original pixels is very low and the strength of the resulting key is higher than that created by the low bit merge mode or the pixel product mode.

As discussed above, the higher order bits of each color byte tend to have more zeroes than ones. As compared to the raw pixel harvesting mode or the combination pixel harvesting modes, another alternative approach to pixel harvesting is low bit pixel harvesting modes. The lower order bits contain information that is affected by environmental light flicker, movement of the image subject or of the camera, artifacts of quantization of the pixels, power supply levels of the camera, environmental air movement, and such other environmental noise factors. Such information has low correlation to the subject of the image itself, and is accordingly where the entropy of the image is concentrated.

An example low bit pixel harvesting mode selects the lowest order bit of each color byte in each pixel. This approach could reflect color bias in the original image. Use of the above-discussed scattering factor should reduce the tendency, however, to over or under sample any particular color in the original image.

An alternative low bit pixel harvesting mode is a low bit XOR mode. In this mode, the R, G, and B bytes of each pixel in the pixel access list are XORd together to form a single byte of information for each pixel. The lowest order bit of each XORd byte is then selected and concatenated to generate a key. In some embodiments, multiple pixels can be XORd together before the lowest order bit is selected. Due to the scrambling of the pixel access list described above, the content of several pixels from different areas of the image is thus compressed together into a single bit. Of the discussed pixel access modes, this mode distills the highest amount of entropy from the source image, thereby having the least statistical correlation with the original image.

Returning now to FIG. 2A, after the entropy is distilled from the image, keys are provisionally generated by concatenating bits of the harvested pixels as discussed above, at decision block 216 the provisional keys are compared to a threshold amount of entropy to determine if the key contains a large enough amount of entropy. For example, the Shannon entropy of the key can be calculated and compared to a predetermined threshold Shannon entropy that is considered to be a minimum acceptable entropy for a secure key. If the key does not meet or surpass the threshold for the predetermined entropy threshold, then the method returns to step 204, and a new image is obtained. In some embodiments, this includes prompting a user of the user device 102 to take a new image with a camera, or choose a new image from another external source. In some embodiments, other tests such as one-zero bias, number and lengths of directional runs, Chi-square, covariance and the like commonly used to self-test sources of entropy are employed to ensure the key meets acceptable standards.

If the provisionally generated key does meet the threshold amount of entropy, then the key is output for use at step 218. This can include, for example, storing the key in a register or database within a memory of the user device 102. In some embodiments, the keys, once stored, can only be accessed by a security application that uses the keys to encrypt or decrypt data, to sign data, or the like. This is discussed further below.

Figure 3:
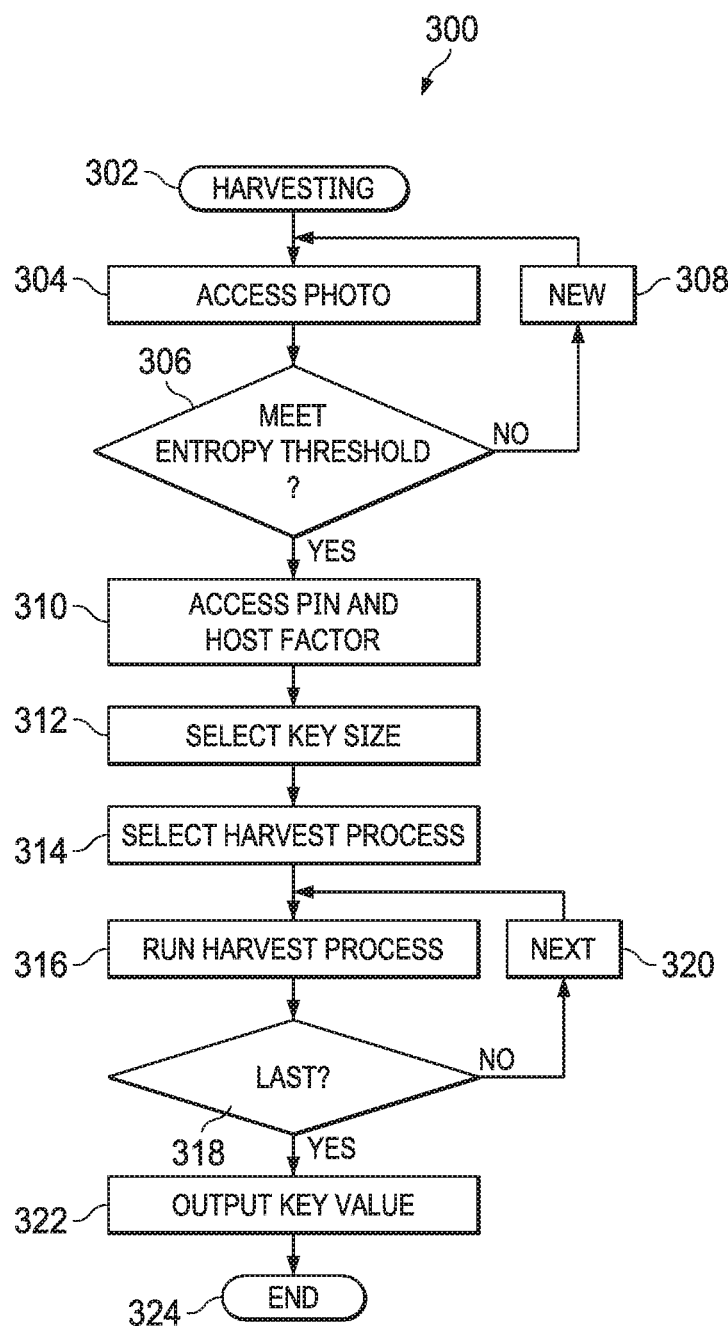
FIG. 3 illustrates a flowchart for the harvesting operation.

Referring now to FIG. 3, there is illustrated a flowchart for the overall general harvesting process, in one disclosed embodiment. The flow is initiated at a Start block 302 for a harvesting operation. The first step in this particular exemplary harvesting operation is to access a photograph, as noted by a function block 304. This photograph or image in a digitized form and it can be taken by a camera that is associated with the user, it could be provided to a group of individuals, such that a predefined group would have a single photograph associated with their respective private key(s) or could be provided by the host from some library. In any event, this particular photograph, once accessed, then provides the entropy source. This is opposed to utilizing a Random Number Generator (RNG) for the entropy source.

The program then flows to a decision block 306 in order to determine if this particular photograph meets some entropy threshold. As described hereinabove, the photograph has associated therewith an ordered dataset as compared to a truly random image having nothing but random pixels associated therewith, since an ordered photograph having associated therewith an ordered dataset arguably has some bias associated therewith. As such, depending upon the complexity of the image, the entropy of the image or photograph can vary. It is also noted that, in this example, this entropy threshold is determined after access of the photo but, could also be determined after all of the harvesting processes are performed. It is possible to actually evaluate the final generated key to determine if sufficient entropy exists. If the photograph does not pass the entropy threshold, the program flows along an N path to function block 308 in order to select a new photograph and then proceeds back to the input of function block 304.

Once an acceptable photograph is accessed, the program flows along a Y path to a function block 310. Function block 310 is where the user PIN and the host factor or data is accessed for the harvesting process. The program then flows to a function block 312 to select the key size which in one example is 256 bits. However, the key size can be selected to be any size. The program then flows to a function block 314 in order to select a harvesting process from among a plurality of harvesting processes that are stored in association with the application resident on the user device 102. The overall harvesting process uses a plurality of individual harvesting processes in order to make the resulting key less vulnerable to attack. As noted hereinabove, a simple harvesting process could be just initiating a count from the first row and first column of the photograph by a predetermined count value and then selecting the next 256 bits. This would be the same for every key generated in the system, such that only one key could be generated for each image or photograph. This, of course, is somewhat undesirable. This particular step would not require any user PIN or any external input to determine the count value, i.e., it would be fixed by the resident application on the user device 102. A further step could be to utilize the user PIN to determine where the count is initiated. It should be understood that a user only has one user PIN and, as such, whatever digit of the user PIN is used to define the initial composition would still only allow a single key to be generated from a single photograph.

In the disclosed embodiment, multiple harvesting processes are utilized to harvest the entropy from the photograph. The function block 314 selects the harvesting process and then the program proceeds to a function block 316 to run the selected harvesting process. As noted hereinabove, this harvesting process may require the user PIN alone with no other input, the user PIN in association with the host data or factor, the user PIN in association with the results of a previous harvesting process or the user PIN in association with both the host data or factor and the results of a previous harvesting process.

After completion of the selected harvesting process, the program flows to a decision block 318 to determine if all of the harvesting processes have been run. If not, the program selects the next harvesting process in a function block 320 and, after the last harvesting process has been run, the program flows to a function block 322 in order to output the private key value. This is a 256 bit value, in one example, which has been distilled or harvested from the image, as described hereinabove.

Figure 4:
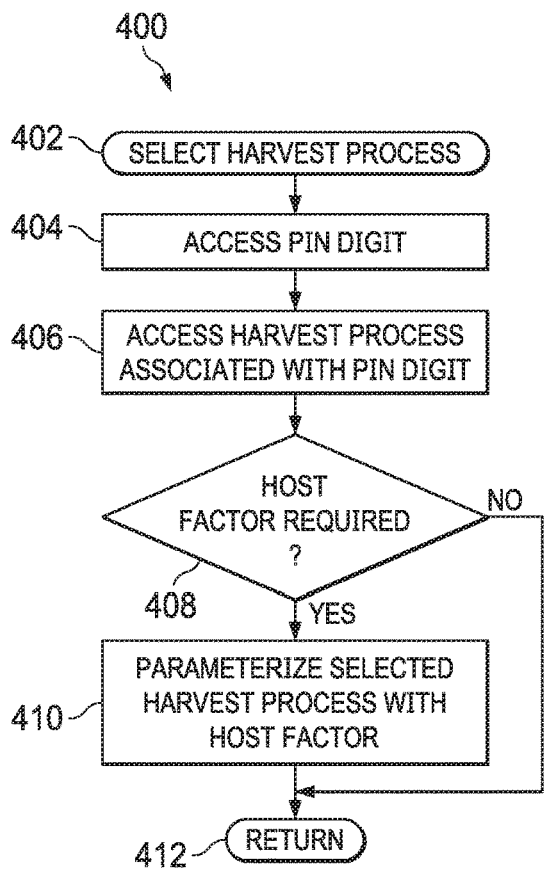
FIG. 4 illustrates a flowchart for the selection of a harvest process.

Referring now to FIG. 4, there is illustrated a flowchart for selecting the harvest process, which is initiated at a block 402. The program flows to a function block 404 wherein a single digit of the user PIN is selected. As noted hereinabove, this is an alphanumeric value. The program then flows to a function block 406 wherein the associated harvest process is accessed and the program then flows to a decision block 408 to determine if there is any host data or factor associated with this particular process, i.e., is there a host data or factor required to parameterize this particular process. As described hereinabove, the host generates this particular host data or factor to change or parameterize the operation performed by the selected harvest process. For example it could be that the alphanumeric digit associated with the harvest process from the user PIN would select some type of scramble operation or offset operation with a predetermined value of how much offset is provided, this predetermined value defined by the alphanumeric digit from the user PIN. The host data or factor could then be utilized to actually modify this value as an additional operation. Thus, by changing the host data or factor, a different private key can be provided for each value of the host data or factor for the same alphanumeric value of the digit from the user PIN associated with that harvest process. This will be described in more detail hereinbelow. If the host data or factor is required to parameterize this particular selected harvest process, the program flows along a Y path to a function block 410 to parameterize the selected harvest process in accordance with the particular host data or factor. If not, the program flows along the N path from the decision block 408 to bypass the function block 410, the outputs of both flowing to a return block 412.

Figure 5:
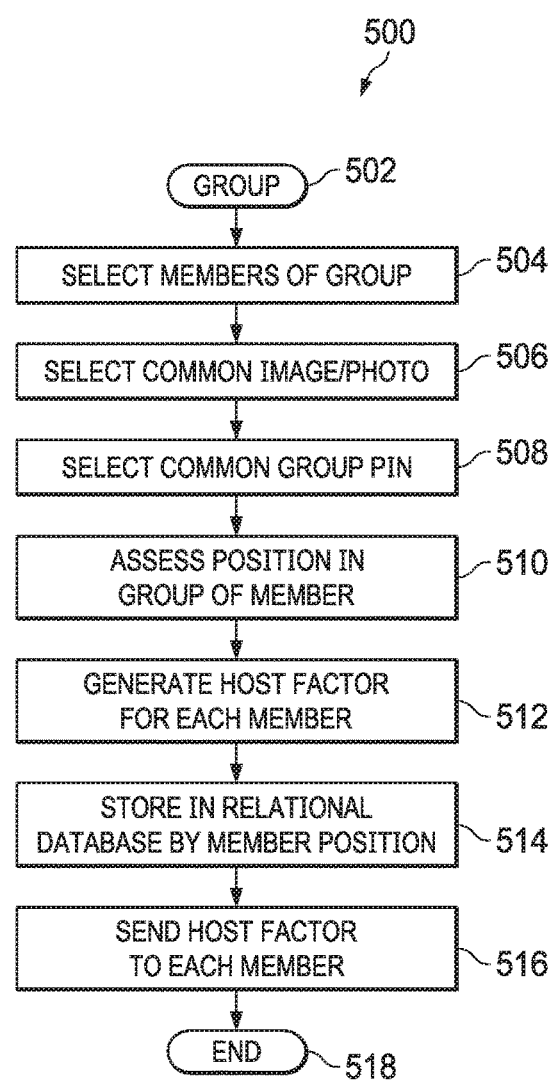
FIG. 5 illustrates a flowchart for generating host factors for multiple members of a common group.

Referring now to FIG. 5, there is illustrated a flowchart depicting the operation of generating a plurality of private keys for different members of the group. It may be desirable to have a group of users that all possess the same photograph or image from which to distill entropy. In this example, each member of the group not only possesses that same photograph or image but also there is a group PIN generated provided to each member of the group. As these individuals are invited to the group, they are provided both the image and the group PIN. Additionally, the way that members are distinguished from each other is by their "position" within the group. When a member enters the group via some type of invitation, the host will log their position at the time they enter the group. This makes them unique within the group such that only their position and the group PIN is required. The concept for this group is that with the shared photograph and group PIN, all that is required to generate a unique private key among each individual in the group is a unique host factor for each key generated. By utilizing position in the group, the host factor can be varied between each group member.

The process flow is initiated at a block 502 and then proceeds to a block 504 to select the members of the group. This is by invitation or some other process. The program then flows to a function block 506 wherein a common image or photograph is selected for this particular group. The program then flows to a function block 508 to select a common group PIN for all members of the group. Since each group member is in possession of the group image or photograph and the group PIN, they basically own the private key or keys generated therefrom and can re-create these private keys if necessary. It is important to note that all of the private keys are unique due to the fact that the host factor is unique. Even for a single member of the group who desires to generate multiple private keys, each of those private keys is unique even to that individual member. The program then flows to a function block 510 to assess the position in the group of that particular member or members and then to function block 512 to generate the host factor for that particular member. After all the host factors are generated, they are stored in a relational database indexed by the member position. Thus, all that is necessary for the host to identify a particular member is the group PIN and the position of that member in the group. The actual member could identify themselves to the host by some type of unique ID that is established at the time the particular member logged into the host initially. It is in just a lookup operation to look up the member's position from the relational database. The program then flows to a function block 516 to send the respective host factor generated to each member and then to a termination block 518.

For a particular user, the possession of multiple private keys can be useful. In some situations, there may be an IoT device that requires different levels of access to data. One private key can be utilized to access certain data store as considered to be highly sensitive and can only be decoded by a personal entity with which the user has shared this particular private key. In another operation, there may be an operation wherein a data store is to be shared with a less secure group of individuals and this particular private key can be shared with a group of individuals for access to only that particular data store. There can also be private keys that have different functionality associated therewith, such that the user can associate certain functionality with a particular data store and the recipient must have a shared relationship with the user in order to access this particular data.

Figure 6:
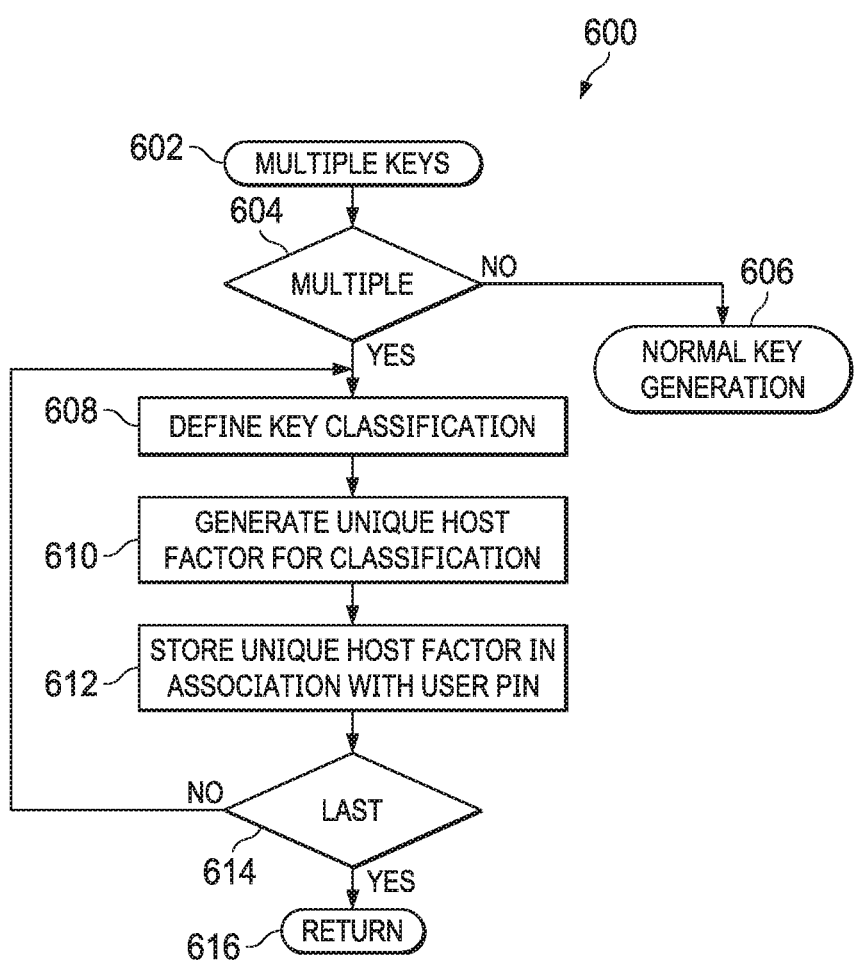
FIG. 6 illustrates a flowchart for generating multiple host factors for a single user such that a user can distill multiple keys from a single photograph or image.

Referring now to FIG. 6, there is illustrated a flowchart depicting a method for allowing a user with a single user PIN to generate multiple keys from the same photograph. As described hereinabove, at least the user PIN and the image dataset are required to generate a user PIN/image dataset entropy from which random data can be harvested to generate the private key. In addition, as described hereinabove, a host factor can be utilized to generate a host data/user PIN/image dataset entropy from which random data can be harvested to generate the private key. Since the user PIN and the image dataset are fixed and can be retrieved by the user at any time in order to re-create private key, One factor that can be changed is the host factor.

The process is initiated at a block 602 to generate multiple private keys, in accordance with and in association with the single and unique user PIN and the selected image dataset that is to be associated with generation of private keys by that user utilizing that user PIN. The program then flows to a decision block 604 to determine if multiple private keys are to be generated. If not, the program flows along the "N" path to a block 606 for normal private key generation in accordance with the above disclosed embodiment. If multiple private keys are to be generated, the program flows along the "Y" path to a function block 608 in order to define, in one embodiment, a key classification to discriminate between private keys for that user and user PIN. In one example of why a user would want multiple private keys, consider a situation wherein a user wants to create private keys to protect various functions at different levels in a single system. For example, an IoT could have various operations wherein data is collected for either encrypted stay at rest data that is to be stored in a local data store, or for transmission of encrypted data to various entities for different purposes. Additionally, the user may want to have private keys that are classified for use on different devices such as a gaming system, a smart refrigerator, etc. In order to facilitate such, the host or server can maintain a relational database or table in which various host factors can be generated, one for each different private key to be generated, and each of the host factors associated with same user PIN. Thus, when the user generates the private key in accordance with the above disclosed embodiment, in association with the same image dataset, the only difference between private keys for that user and that user PIN/image dataset combination is the host factor.

After defining the key classification for the particular user, the program flows to a function block 610 to generate a unique host factor classification and associated that with that user. The program then flows to function block 612 in order to store the unique host factor in association with the user PIN. In general, is not necessary for the host to have the actual user PIN stored at the server; rather, all that is necessary is to have some type of identification to securely identify the user such that the user can interface with the host/server in a secure manner in order to access the host factor necessary to generate the private key for any particular classification. The program then flows to a decision block 614 to determine if all of the private keys have been generated and, if not, the program flows back to the input of the block 608 to process another host factor to enable the user to generate another private key for that same user PIN/image dataset combination.

By way of additional detail, the following exemplary technical details of the distilling process are set forth:
Details of Exemplary Entropy Distillation from an Image
  Processing options
    Inputs
      Key size in bits, default is 256, multiples of 8
      Digital image file—for example, Joint Photographic Experts Group (JPEG, file extension "jpg) or Portable Network Graphics (PNG, file extension "png")
      User pin. At least 6 digits, alphabetic characters ok, no upper size
      Host factor
      Compress (eliminate duplicate pixels)
      Mode and count (for exclusive OR modes):
        Low order bit: 'lowbit', 'lowxor'

Combo: 'lowmerge', 'pixelxor', 'product'
Raw: 'colorcode', 'simplepixel', 'simplecolor'
Outputs
  Keys
  Hash and other nonces, . . .
  Orientation pixels (verify orientation)
Notes:
  Image data is accessed by rows and columns. The data is requested in nominally RGB format, wherein there are 3 successive bytes of red, green and blue, known as "RGB".
  Color code refers to creating a 24-bit integer from RGB bytes concatenated in that order.
  rows and columns are flattened to a 1-dimensional array for linear pixel access.
  some modes access by color index and pixel index. For those modes, rows, columns and RGB colors are flattened to a 1-dimensional array for linear access.
  SHA256 hash is currently SHA2 256-bit hash; SHA3 or subsequent hash algorithms may be chosen as the art advances.
  User pin is accepted as a string with minimum length of 6.
    The least significant 6 are treated digits modify harvesting.
    The entire user pin is treated as a byte sequence with unbounded length for the purposes of a SHA256 hash.
1. Load image file into pixels
   a. Save orientation pixels. Orientation pixels are a small set of pixels chosen at the corners and certain intermediate points saved to identify/verify the image is in the original orientation, useful if a key is reestablished. The orientation pixels are also used in the scatter hash.
   b. Eliminate duplicate pixels—optional. Images may contain a certain number of duplicate pixels. This option scans the image in sequence and removes subsequent duplicates.
   c. Sanity check key size versus pixel count. A ratio of 1000 pixels for one key bit of information is enforced to ensure an adequate sample size to deliver quality data.
2. Process pin digits. The pin provides a simple to use and remember key for the user. More crucial, each of the first 6 digits directs a round of transformations which determines the pixels harvested and the order. This creates a potentially very large set of outcomes controlled by the user. This also eliminates bias and correlation with order present in the digital image.
   a. Rotate and/or invert from pin digit. The user digit selects from a set of predefined values. This transformation disrupts statistical picture tendencies such as sky above, ground below.
   b. Start of scramble pattern from pin digit. The pixels ultimately selected for harvest will be accessed in a scrambled order. The scrambling algorithm uses pixel data as its randomizing input; the digit determines where the input starts. This transformation disrupts correlation that might exit between pixels in adjacent areas if they were accessed in a monotonic order.
   c. Increment from uniform distro x factor from pin digit. An increment between pixels is calculated to yield a uniform distribution of pixels to sample. This is considered optimal to eliminate bias towards any area on the image. The user digit modifies that by a percentage to disrupt outside calculations of the same distribution.
   d. Horizontal start from pin digit. The user digit determines the starting column in the image to harvest. This disrupts an anticipation that harvesting will start on a particular column.
   e. Vertical start from pin digit. The user digit determines the starting row in the image to harvest. This disrupts an anticipation that harvesting will start on a particular row.
   f. Scatter pattern from SHA2 hash of pin and factor from pin digit. Pixels to be accessed nominally lie equidistant from each other. Each successive pixel access is offset by successive bytes in a hash multiplied by a factor from a pin digit. Since the user pin is not limited in length, the number of unique access sequences is subject to the same limits as a brute force attack to extract a key is no more likely than breaking SHA256 hash, which is quite large, even if the image is obtained by a breech.

Referring now to FIG. 7, there is illustrated a sequence diagram 700 of communications between a user device 102, an IoT device 104, and a cloud host server 106, for setting up secure communications channels based on keys generated according to embodiments of this disclosure. For the purposes of this disclosure, the user device 102 is a mobile phone that is connected to the cloud host server 106 via a mobile data connection using the HTTPS protocol. The IoT device 104 can be any type of IoT device, and it connects to the cloud host server 106 via the internet using the HTTPS protocol. The mobile phone connects to the IoT device 104 using NFC when the mobile phone is within close enough proximity to the IoT device 104 for NFC to function. It is understood that any suitable internet data protocol can be used to connect the user device 102 to the cloud host server 106, and any suitable proximity-based communication protocol can be used to connect the user device 102 to the IoT device 104.

The sequence diagram 700 includes communications to establish a secure communications channel between the user device 102, the IoT device 104, and the cloud host server 106. For example, IoT device 104 may typically operate with the cloud host server 106 as an intermediary between the user device 102 and the IoT device 104. That is, after an initial setup that links the IoT device 104 to the user device 102, the IoT device 104 and user device 102 may communicate through the cloud host server 106 to exchange information, configuration settings, and the like. A goal of the present disclosure is to securely provide high quality cryptographic keys from the user device 102 to the IoT device 104 to allow the IoT device 104 and the user device 102 to communicate through the cloud host server 106 with end-to-end encryption that prevents the cloud host server 106 from reading any of the communications. Additionally, a goal of the present disclosure is to encrypt data at rest on the IoT device 104 such that the cloud host server 106 and any malicious third party attackers are unable to access the data at rest on the IoT device 104. The communications of the sequence diagram 700 may be managed at the user device 102 by a management application for managing the IoT device 104.

In some embodiments, in order to facilitate establishing a connection between a user device 102 and an IoT device 104, it is desirable to provision one or more keys to the IoT device 104 at the time of manufacture. The cloud host server 106 may belong to a manufacturer of the IoT device 104, and accordingly may generate a set of one time programmed (OTP) keys for the IoT device 104 at step 702. The cloud host server 106 may have access to the systemic entropy needed to produce high quality cryptographic keys for use in this process. Furthermore, the cloud host server 106 generates an electronic serial identification (ESID) that is unique for the IoT device 104.

These keys and the ESID can be programmed into the IoT device 104 at step 704. The OTP keys can include one or more device to server keys, which can be used to encrypt data, a server to device authentication key (SCAK), which can be used to validate payloads transmitted from the cloud host server 106 to the IoT device 104, and a device to server authentication key (DCAK), which can be used to authenticate payloads transmitted from the IoT device 104 to the cloud host server 106. The SCAK and DCAK can be used to create and validate security certificates for communication of the IoT device 104 and the cloud host server 106 without the need for an external certificate authority. This can reduce the battery power needed for the IoT device 104 to verify these communications, as the need for communicating with a certificate authority through the internet is removed.

These OTP keys can be embedded in a memory of the IoT device 104 such that they cannot be read under any circumstance. The keys can only be used by a secure application for encrypting, decrypting, signing, or the like, the results of which can be read. Even if the physical memory containing the keys is accessed by attackers, the keys cannot be read. Instead, the keys can only be applied to encrypt. In this way, the keys are kept entirely confidential once programmed into the memory.

When a user that owns the user device 102 purchases the IoT device 104 and chooses to initiate a setup for the IoT device 104, the user connects with the IoT device 104 using a wireless protocol (such as 802.15.xx) or proximity based protocol, such as NFC, BLE, Zigbee or the like, at step 706. A proximity based protocol is inherently more physically secure than longer range wireless connections, and thus the risk of information being intercepted by malicious third parties is very low. The proximity protocol using NFC utilizes inductive coupling between two nearby loop antennas effectively forming an air-core transformer. The interaction between these two loops is described as "near field." NFC standards governing this communication link cover communications protocols and data exchange formats, and are based on existing RFID standards including ISO/IEC 14443 and ISO/IEC 18902. In some embodiments, a connection can be established using a wired connection utilizing the 802.15.xx standards protocols, or a USB memory device, which reduces risk of interception to zero.

At step 708, the IoT device 104 transmits its ESID to the user device 102 in the process of establishing the user's ownership of the IoT device 104. This information can be transmitted in the clear, as the ESID of the IoT device 104 is not secret information. At step 710, the user device 102 may send the ESID of the IoT device 104 to the cloud host server 106 (for example, using an internet protocol such as HTTP or HTTPS) in order to validate or establish the user's ownership of the IoT device 104.

At step 712, this validation is performed by the cloud host server 106. For example, the cloud host server 106 may maintain a database of all IoT devices manufactured by the owner of the cloud host server 106, and the ESID of the particular IoT device 104 in question may be referenced against this database to validate that the particular IoT device 104 is not already associated with another owner.

Association with an owner comprises registration of an account on behalf of the user with the cloud host server 106. A user account may include information on any number of different IoT devices 104 owned by and associated with the same user, and may allow the user to apply a same set of keys to multiple IoT devices 104. In some embodiments, the owner of the cloud host server 106 does not manufacture the IoT device 104 itself, but manufactures one or more security elements (e.g., a security chip) that are implemented within the IoT device 104 to facilitate the embodiments of this disclosure.

At step 714, the cloud host server 106 sends a host factor, as described above, to the user device 102 along with a prompt to input the user PIN (e.g., a 6-12 digit alphanumeric PIN of the user's choosing as described above) into the management application, and a prompt to select an image. The host factor, user PIN, and image are used as described above for generation of keys to be exchanged between the user device 102 and the IoT device 104.

At step 716, the user device 102 selects an image for use in generating keys, as described above. In some embodiments, a camera of the user device 102 can be used to capture an image for this purpose. In other embodiments, the user can choose an image from the internet, or receive an image from some other external source.

At step 718, the user device 102 generates keys using the image, the host factor, and the user PIN, as described above. In some embodiments, a number of keys are generated from this set of inputs. For example, an encryption key for encrypting data at rest, a user-to-device key for encrypting user device 102 to IoT device 104 communications, and a user-to-server key for encrypting user device 102 to cloud host server 106 communications may be generated.

At step 720, once the keys are generated, the user device 102 informs the cloud host server 106 that key generation has been completed. At step 722, the cloud host server 106 generates a bonding certificate for use by the user device 102 to bond with the IoT device 104. The cloud host server 106 sends the bonding certificate to the user device 102 at step 724.

At step 726, the user device 102 sends a payload including the bonding certificate and the keys generated at step 718 to the IoT device 104 via the proximity communication protocol. In some embodiments, this communication can be encrypted, e.g. using Diffie-Hellman exchange techniques, but this is likely not necessary as the proximity interface is inherently secure. In some embodiments, a user must actuate a physical button on the IoT device to confirm the user's presence in proximity to the device. This could be required when a longer range protocol such as BLE is used instead of a very short range protocol like NFC in order to guarantee that only a user with physical access to the device is able to perform the bonding process.

At step 728, the IoT device 104 validates the bonding certificate. For example, the bonding certificate may be generated using the SCAK, which is provisioned to IoT device 104 as described at step 704. The IoT device 104 can therefore validate any certificate generated by the cloud host server 106. At step 730, the IoT device 104 stores the keys in its memory. In some embodiments, the keys may be stored in the same way as the OTP keys are, in a register from which they keys cannot be read but can only be applied.

At step 732, the IoT device 104 generates a bonding done certificate for the cloud host server 106. The bonding done certificate is encrypted using the DCAK that was provisioned to IoT device 104 as described at step 704. At steps 734 and 736, the encrypted certificate is relayed through the user device 102 to the cloud host server 106. In this way, the cloud host server 106 can know that the IoT device 104 is bonded with the user device 102, and can associate the IoT device 104 with a user account for the user device 102, at step 738.

At the end of this process, the IoT device 104 has knowledge of the private keys generated by the user device 102 according to the above-disclosed embodiments. These private keys are cryptographically strong (preferably quantum resistant) and known only to the IoT device 104 and the user 102. Because the keys are exchanged with the physically secure proximity interface, the keys may be used as a symmetric cipher, as there is no opportunity for the keys to be intercepted during communication. All further communication of data between the IoT device 104 and the user device 102 is encrypted with one of these keys. Any sensitive data stored on the IoT device 104 is encrypted with one of these keys. The cloud host server 106 is therefore unable to read any data that is relayed through the cloud host 106 to the user device 102, and is unable to access the data at rest on the IoT device 104.

In some embodiments, the certificates described above include expiration dates, and the initial user of the user device 102 no-expiration user. Additional temporary users can be given a certificate with a countdown value that indicates a limited number of users to access the IoT device 104. For example, with a countdown value of 0, the user must obtain a new certificate from the cloud host server 106 before each access of the IoT device 104, with a countdown value of 1 the user may access once without obtaining a new certificate, and so on. In this way, the initial bonded user of the IoT device 104 can grant others temporary permission to access the IoT device 104.

Figure 8A:
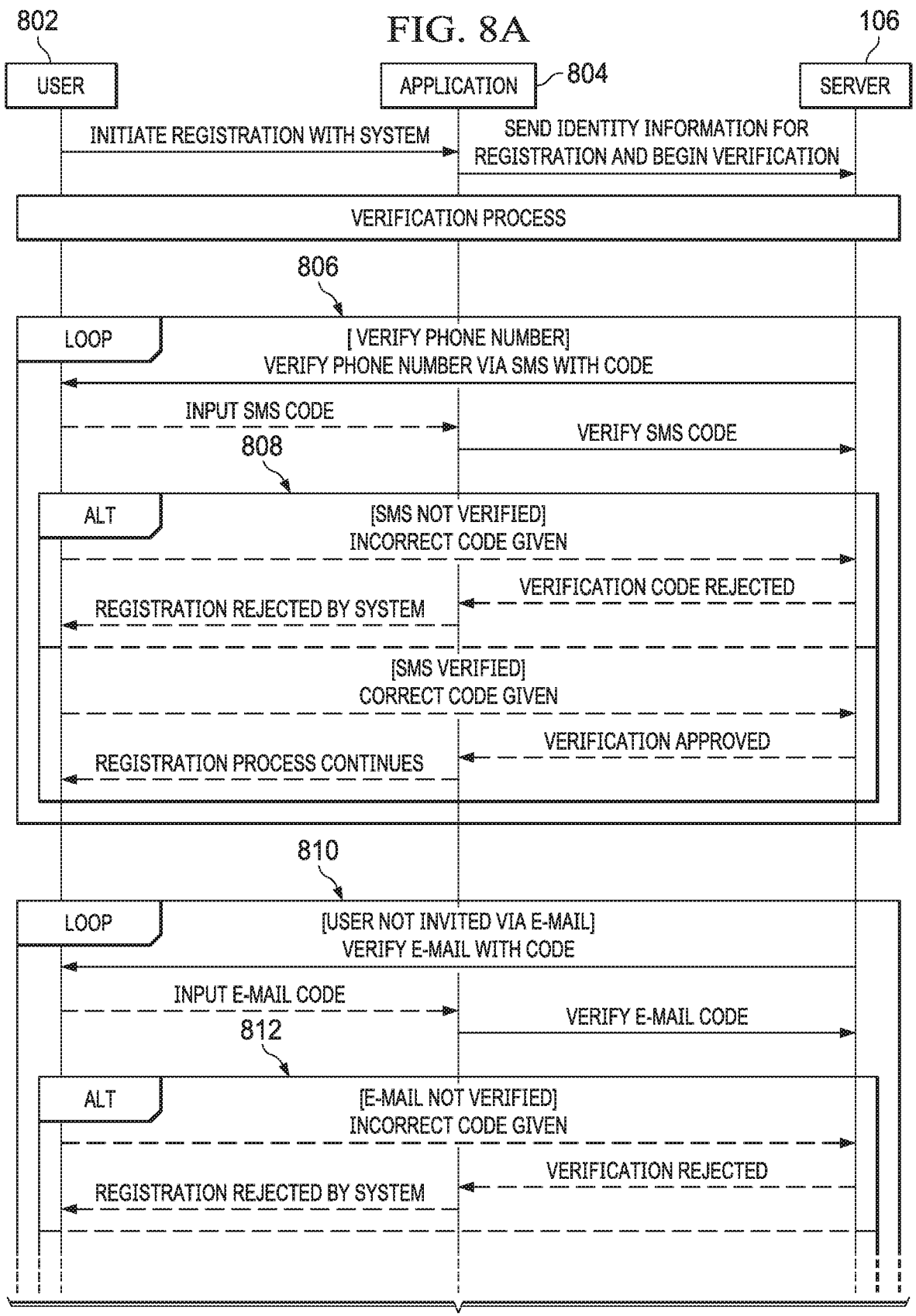
FIGS. 8A, 8B and 8C illustrate a sequence diagram for a user registration sequence.
Figure 8B:
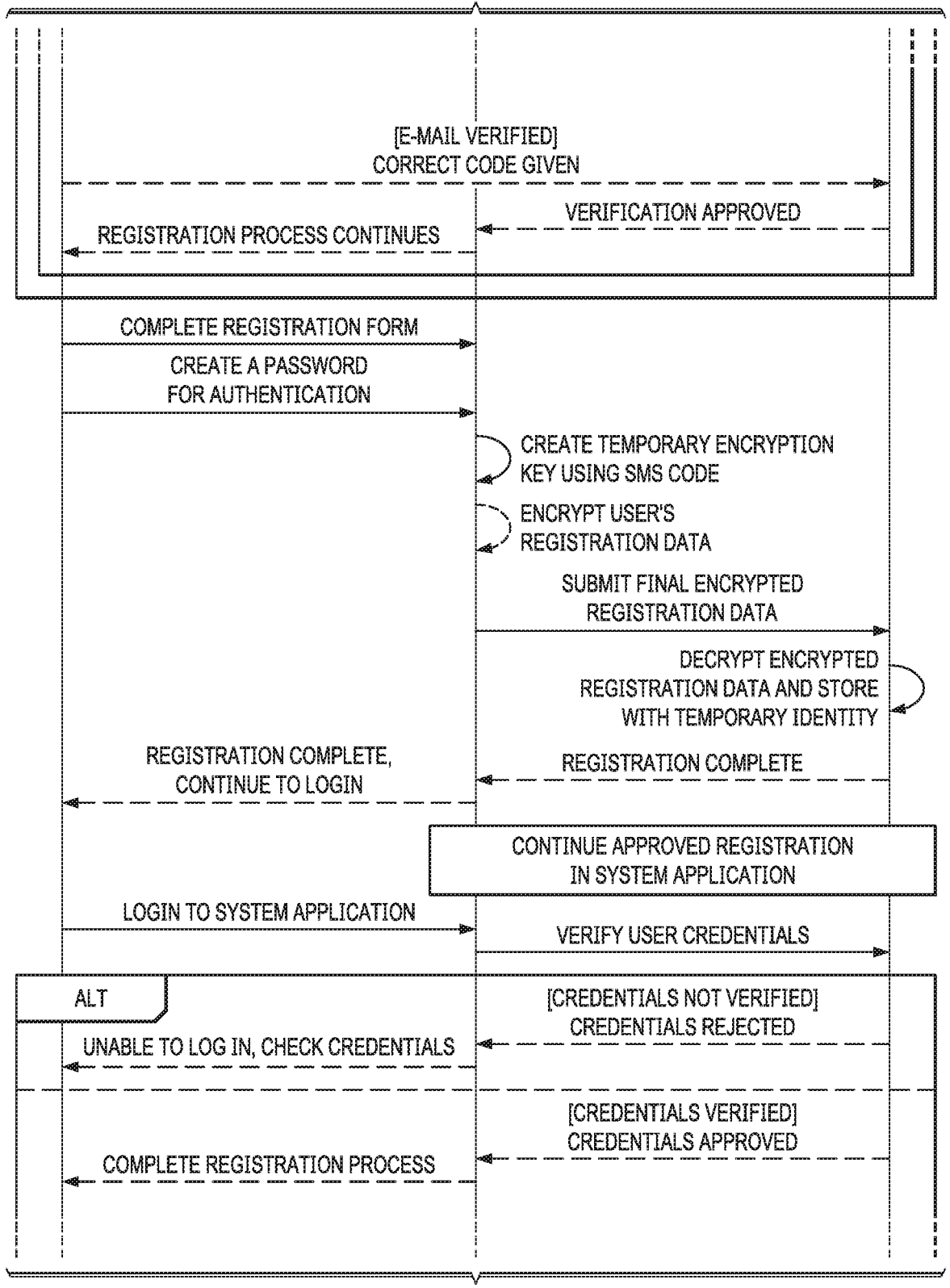
Figure 8C:
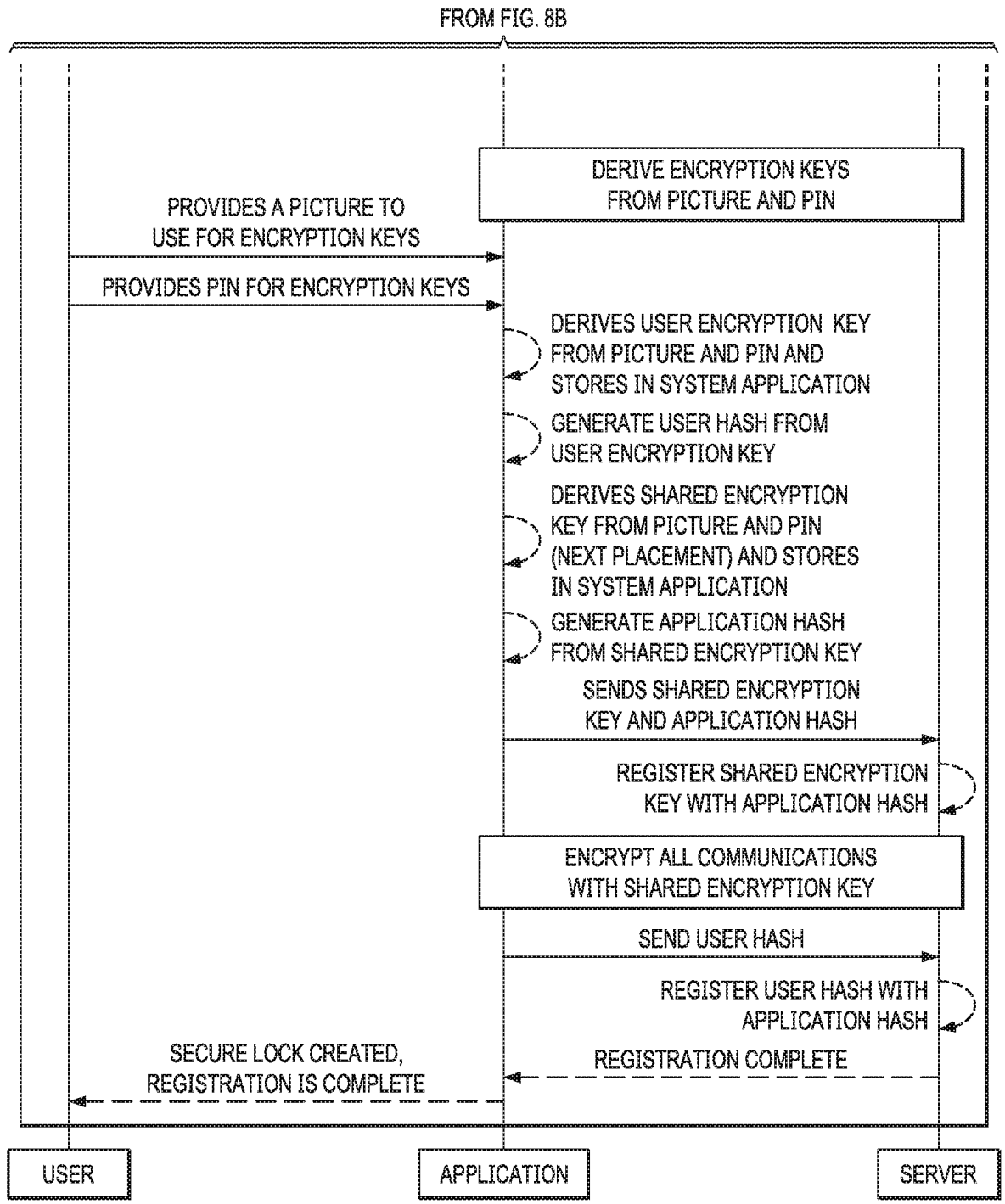
Figure 10:
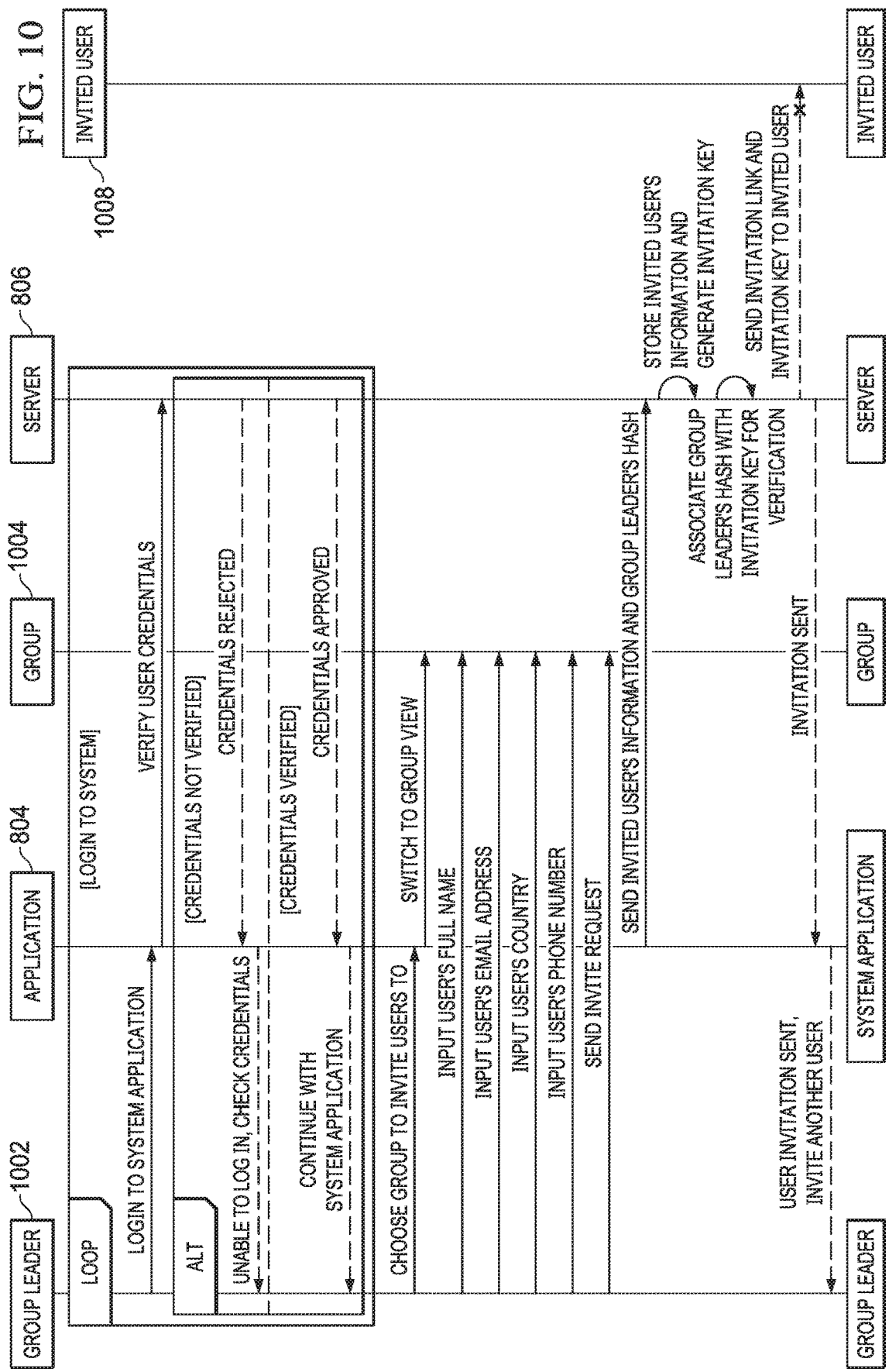
FIG. 10 illustrates a sequence diagram for an invite group members sequence.
Figure 11:
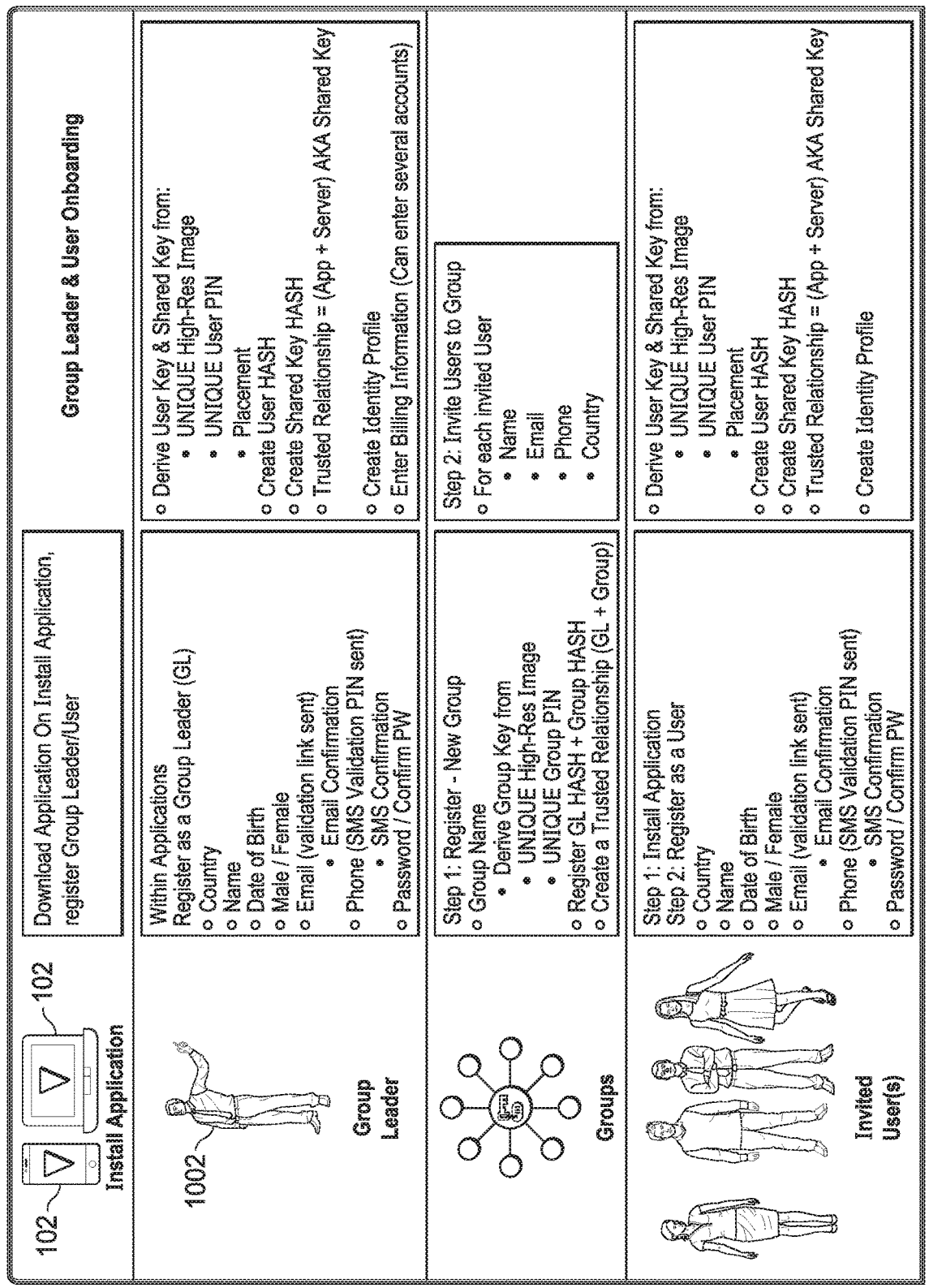
FIG. 11 illustrates a diagrammatic view for the operations of FIGS. 8A, B and C-10.

Referring now to FIGS. 8A-C, FIG. 9 and FIG. 10, there are illustrated sequence diagrams for initiating a user registration sequence in order to register a normal user and also define a group leader, FIG. 11 illustrating a diagrammatic view of the sequence diagrams of FIGS. 8A-C, FIG. 9 and FIG. 10. In this registration process, the user registration can happen into manners: the user is invited to join a group by a group leader, or the user is interested in joining the system through the system website. Referring specifically to FIGS. 8A-C, the first step for the user is to initiate registration by contacting the user device 102, which runs applications 804. At the application, the user device 102 then sends identity information for registration begins verification at the server 106. This identity information is a user's information for dedication and verification purposes. The system then enters a loop 806 in order to verify the phone number via an SMS message, where a code that is generated by the server 106 is sent to the user device 102. Once the user inputs the code received at the user device 102 (or via some other reception method) in the phone verification step, the phone number is then verified. If the SMS message is not verified, the system enters a loop 808 wearing, because the incorrect code was given, the server returns a "verification reject" command to the user device 102 in the application 804. The application then notifies the user 802 that the system has rejected the registration. The user then attempts to provide a correct code until verification has been received, at which time the registration process continues.

Email validation is only necessary if the user was not invited to join a group in the system. The validation of the email address is done through an email message, where a code generated by the server 106 is sent to the user via some method, such as email, and, once the user inputs the code in the email verification step, the email address is verified. This is facilitated in a loop 810 wherein the user inputs the email code to the application 804, which then forwards this code to the server 106. If the incorrect code has been received, system goes to step 812 in order to allow the server 106 to provide a "verification reject" command back to the application, which then informs the user that registration has been rejected. Once the registration is accepted, the process continues.

In the next step, the registration form is completed in order to allow the user, once the user has verified their contact information, to fill out the rest of the information gathered by the system: country, gender, date of birth. The user will be required to provide a password to authenticate with the system. In this process, communication to the server is encrypted with the SMS code, thereby allowing both the system and the user to be able to derive the same key to be able to transmit the user's personal information in a secure manner. This encryption method is temporary. This is facilitated by creating the temporary encryption key the SMS code, encrypting the user's registration data and submitting the final encrypted registration data to the server 106. At the server 106, the encrypted registration data is decrypted and stored with the temporary identity. Once the information has been processed by the server 106, an indication is sent back to the user device 102 and the application 804 indicating the registration is complete and then the user is notified of the completion and the necessity to continue to login. The next step, login step, is facilitated at the application level. At this step, the user will be asked to sign in with their email address and password they just provided to the system and create their own encryption key. Once the user credentials are verified, the registration process requires the user to provide a picture for use in generating the encryption keys. If, however, the credentials are not verified, the server indicates this with a "credentials rejected" reply to the application 804 which is then relayed to the user 802 in order to again send the email address and password.

Along with the picture, the user is also prompted to provide a user PIN to be associated with the key generation process. As noted hereinabove, this encryption key, once generated, is unique to the user, this being the private key of the user, sometimes of her to as a user encryption key or the secret key. A hash is then generated from the private key to represent the user based on this key. This process first requires the private encryption key to be generated from the provided picture and user PIN, as described above. After the hash of the private key is created, a separate shared encryption key will be derived for communication with server 106, and a hash, generated to represent the application for the user, will be generated based on this shared encryption key. This shared encryption key and application hash are then sent to the server 106 wherein the server 106 registers the shared encryption key with the application hash. This shared encryption key allows the user's system application to encrypt all requests to the server 106 and decrypt all responses from the server 106. The server registers this shared encryption key with the application hash, such that all on-going to communications will then be encrypted in this manner. The application then sends the user hash to the server 106 and the server 106 then registers the user hash with the application hash. At this point, the registration is complete, and a secure lock is created, which is indicated to the user 802.

Capturing now to FIG. 9, there is illustrated a single diagram for the group creation sequence that defines how groups allow members (users who have registered with the system) to securely possess a collection of devices and provide other users access to those devices via a shared encryption key for the group. The ability to create a group is only available if the user is a paid member and has given the system their payment information. The user must first log into the application 804 and then the application will verify the user credentials with the server 106, unless not verified, which then requires the user to again input their login information. If the user is not a paid member, the application will transmit a membership page to the non-member user, who will then provide input payment information, which is then sent to the server 106 by the application 804 which, once processed, results in the user being registered as a member.

The operation of creating a group by a paid member requires first providing a group name, a picture to be utilized by the group for the encryption key and PIN for use with the group encryption key. These are all sent to the application by the user. The application data for then derives the group encryption key from the picture and the pin and stores it in the system application 804. A group hash is then generated from the group encryption key. And this group hash (generated from the group encryption key) is then registered along with a group leader (paid user/member) hash. This group hash and group leader hash are then sent to the server 106 for registration with the server. Once this registration is complete, the group creation is complete. A secure lock is then created for transmission to the user (group leader) 802.

Referring now to FIG. 10, there is illustrated is sequence diagram for the operation of inviting members to the group. Group leaders can invite as many users as they wish to their groups. When inviting users to groups, group leaders must provide all required information about the user. This includes information like the mobile phone number, the email address and the country. A group leader, represented by a block 1002, initiates this operation by logging into the system application 804 and then the group leader's user credentials are verified. Then the group leader chooses a group to invite users to (group previously created by the group leader). This will cause the system to switch to a group view, wherein the group leader will then input the user's full name, email address, country, phone number and a request to send an invite request to this user. The application 804 will then send the invited user's information along with the group leader's hash to the server 106 where such information will be stored. The server 106 will then generate an invitation key that will be associated with the group leader's hash. This allows the group leader to be notified when the user is registered, and if there were any discrepancies of the data submitted in the invite. An invited user 1010 will then receive an email with the invitation link for them to register as a new user in the group. The user registration process will then begin for this new invited user.

Figure 12:
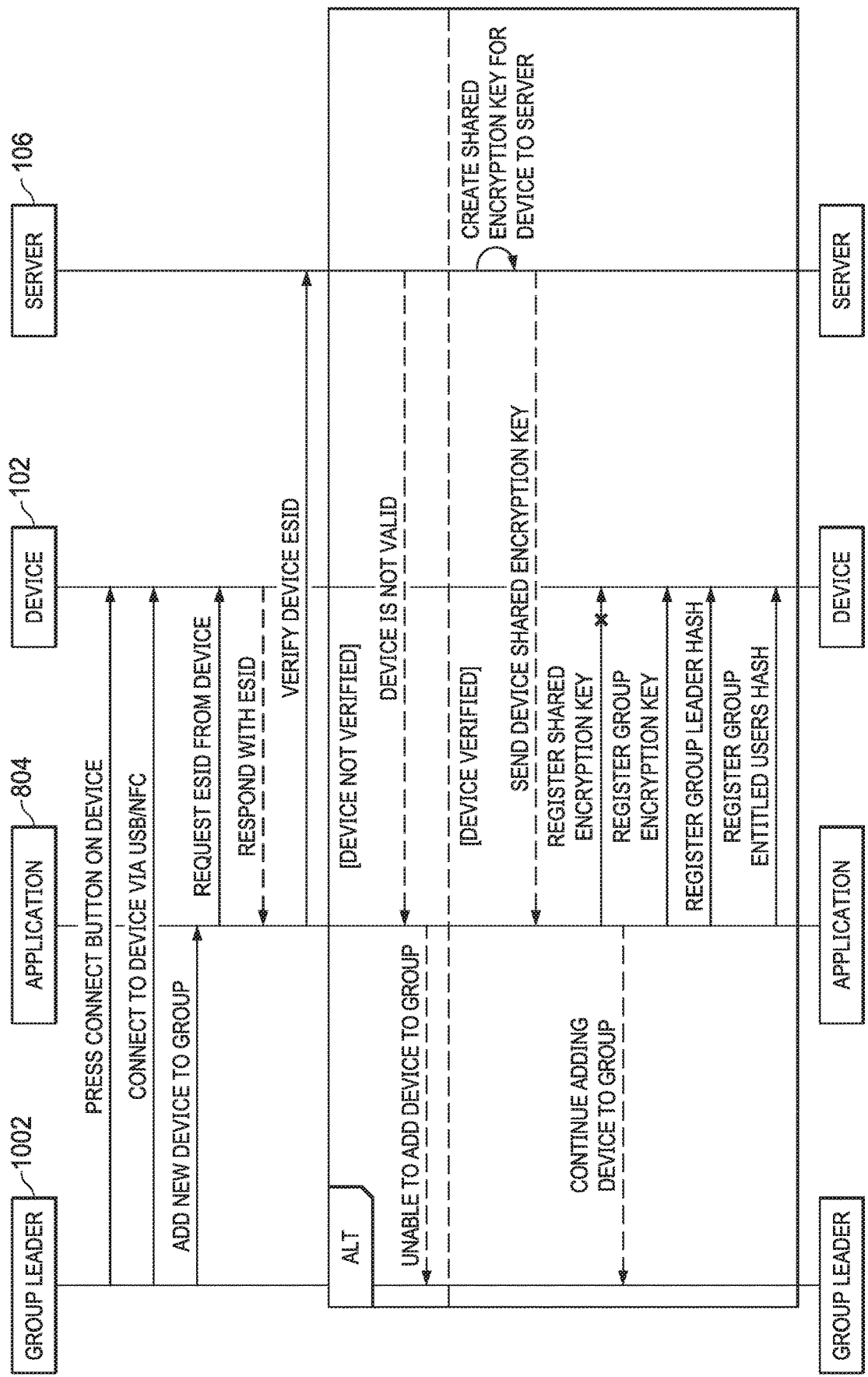
FIG. 12 illustrates a sequence diagram for the device bonding.
Figure 13:
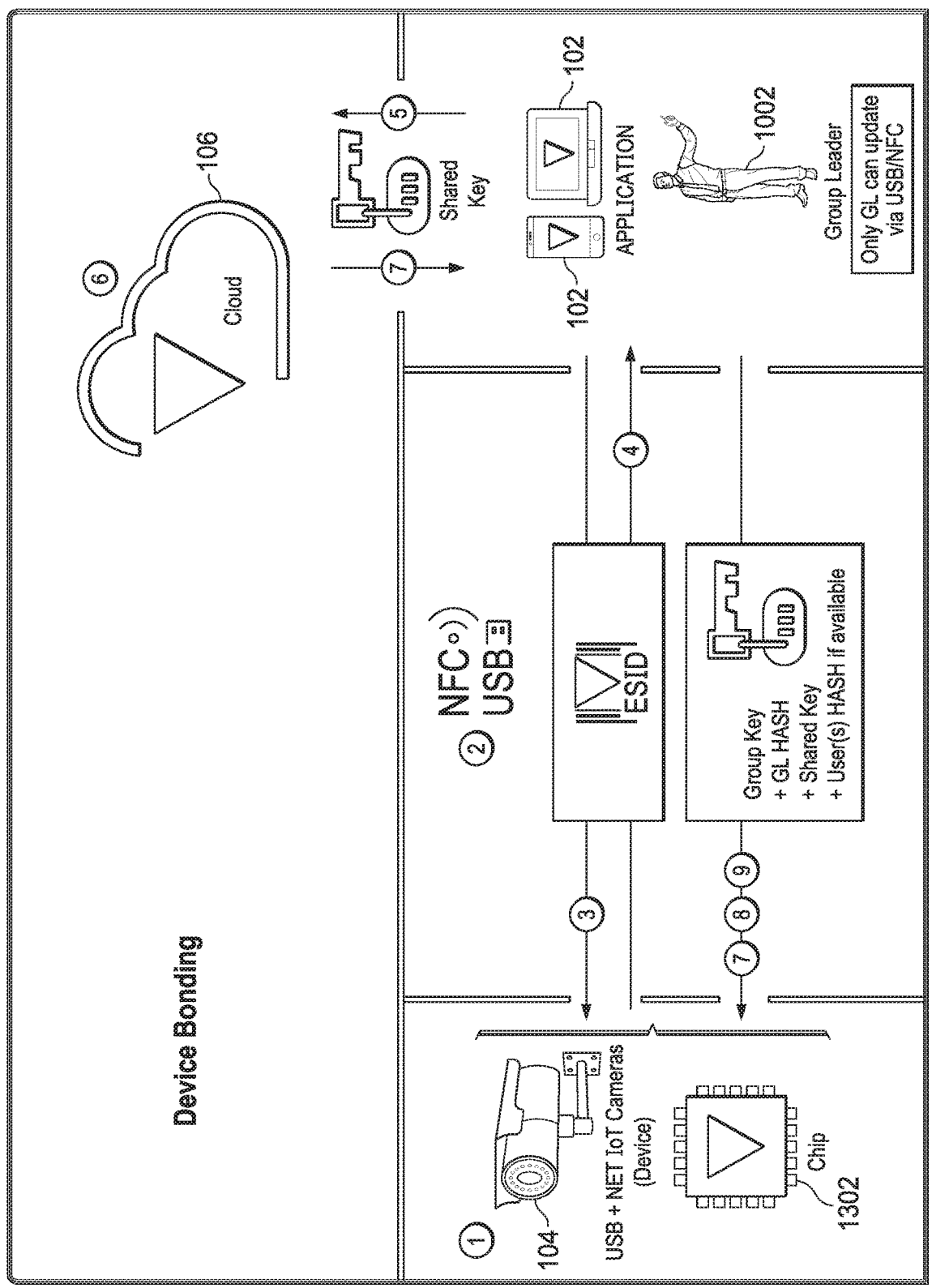
FIG. 13 illustrates a diagrammatic view for the operation of FIG. 12.

Referring now to FIG. 12 and FIG. 13, there is illustrated the process for bonding with the IoT device 104, the sequence illustrating that the IoT device 104 must be registered with the group leader before being able to use it securely. With specific reference to FIG. 12, the first step is to register an IoT device by connecting it to through either NFC or USB in order to establish a connection from the user device 102 to the IoT device 104 and follow through the bonding process. The group leader presses a contact button on the IoT device 104 and then connects to the IoT device 104 via USB/NFC. This is operation in FIG. 13. The group leader 1002 will then add a new device of the group wherein the application will request an ESID from the IoT device 104. The IoT device 104 will respond with its ESID and the application 804 will then verify the device ESID with the server 106. If the ESID is not valid, the device bonding process will terminate. In the illustration in FIG. 13, the IoT device 104 is illustrated as being an IoT camera that has associated therewith an encryption engine in the form of a separate chip 1302. This separate chip 1302, as will be described here below, is the device upon which the private key is stored and is also the device that encrypts data on the device 104. It is basically the encryption engine of the IoT device that forms a part of the IoT device 104. FIG. 13 illustrates the NFC/USB connection as path ② and the request for the ESID from the IoT device 104 along path ③ with the ESID transmitted to the application 804 along path ④. The application 804 will then verify the ESID with the server 106 along path ⑤, with the validation operation occurring at ⑥. If the ESID is not valid, the device bonding process will terminate. If valid, the server 106 will create a device shared key to establish a trusted relationship between the server and the device. This device shared encryption key will be registered in the IoT device 104 through the system application's connection to the IoT device 104, but not on the actual application 804 itself. This is illustrated as the path ⑦ which path illustrates the shared key being passed to the application 804 and then the group key plus the group leader hash plus the shared key plus the user's hash, if available, is then relayed to the chip 1302 in the device 104. This is a registration process of the shared encryption key with the device 104. Paths ⑧ and ⑨ illustrate the transmission of the group leader hash+shared key and the user's hash, respectively. This operation comprises the registration of the group key into the IoT device 104 (and not in the application 804), this being the created group private key from the group user PIN/image dataset. It is noted that this diagram relates to registration of the group encryption key with the IoT device 104. For this registration of a single user, the private (or secret) key of the user will be registered with the device 104. This means that it will be stored in memory on IoT device 104 for use with encryption/decryption. Thereafter, the user hash for the user will be transferred. Thus, the overall bonding process is a sequence wherein 1) the user presses a contact button on the device, 2) the user disposes the user device 102 upon which the application 804 is running proximate to the IoT device 104 in order to establish a proximity-based communication link, 3) the application 804, once a connection is made, requests the ESID from the IoT device 104, 4) the IoT device 104 responds with the ESID to the application 804, 5) the application 804 verifies the device ESID with the server 106, 6) the server 106 performs verification of the ESID and, upon verification, creates a shared encryption key for device-to-server communication, 7) the shared encryption key is returned from the server 106 to the application 804, 8) the application 804 then registers the shared encryption key with the IoT device 104, and 9) the private key of the user (group key for a group) is registered with the IoT device 104. As will be described in below, this is a Write Only operation to memory on the IoT device 104 that cannot be read from the IoT device 104.

With respect to FIG. 13, the paths are defined as follows: 1) the user presses button on IoT device 104; 2) connects via USB or NFC to the IoT device 104 through application 804; 3) request ESID from IoT device 104; 4) receive ESID from IoT device 104; 5) validate ESID with server 106; 6) create device shared key to define a trusted relationship between the server 106 and the IoT device 104; 7) send shared key from server 106 to IoT device 04 through application 804; 8) send group key+group leader hash; and 9) send user(s) hash.

Figure 14A:
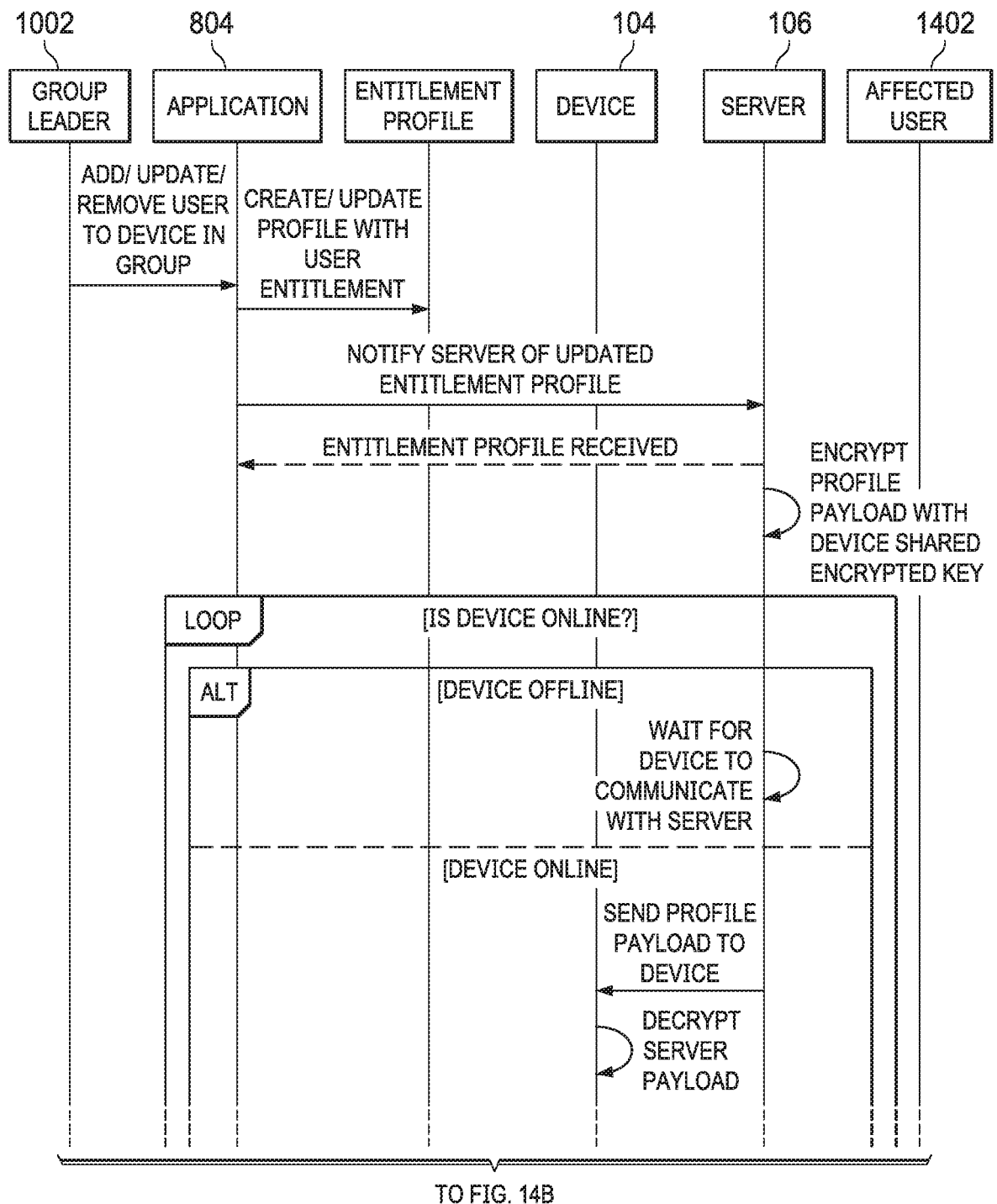
FIGS. 14A and 14B illustrate a sequence diagram for managing user entitlements on a device.
Figure 14B:
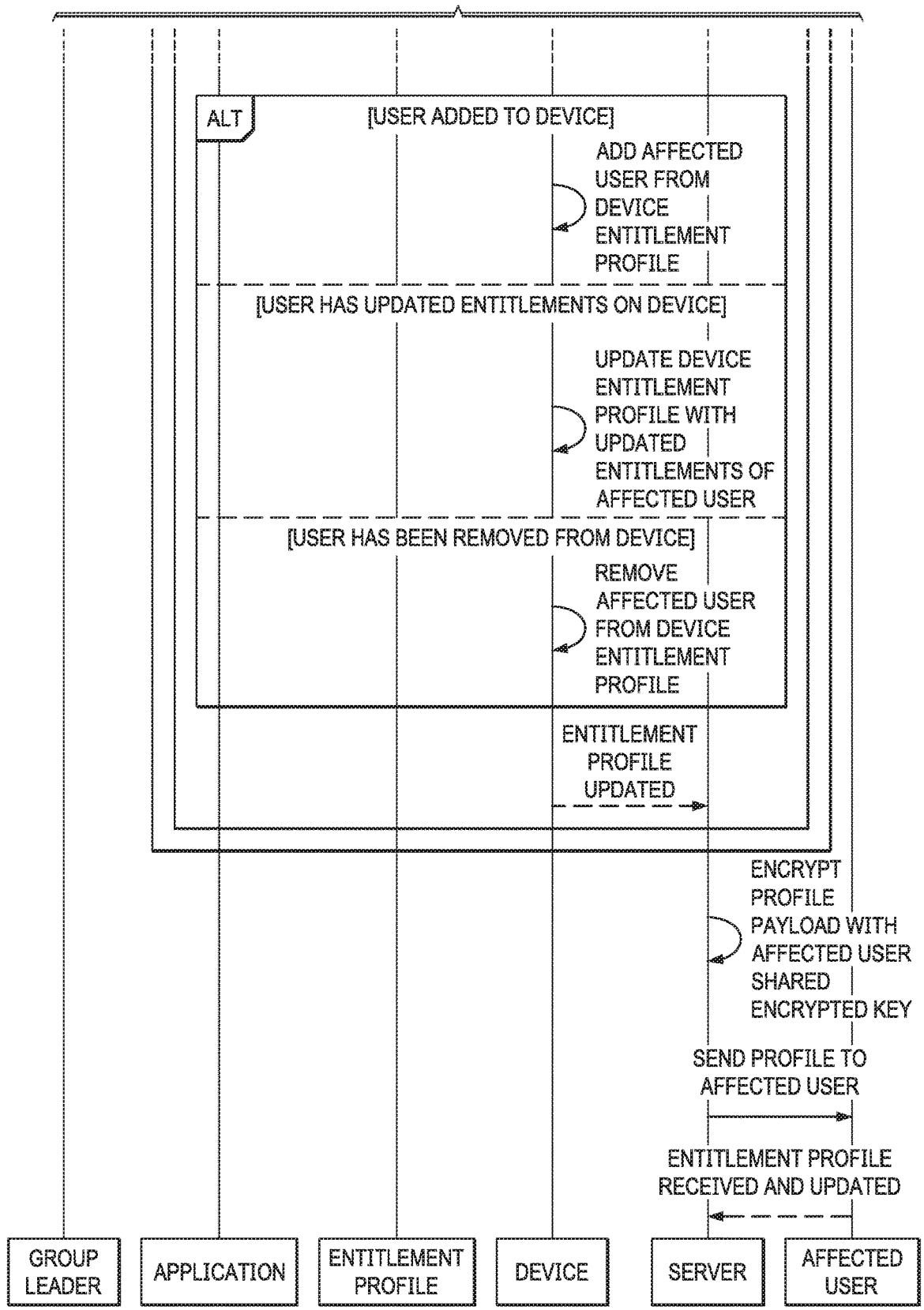
Figure 15:
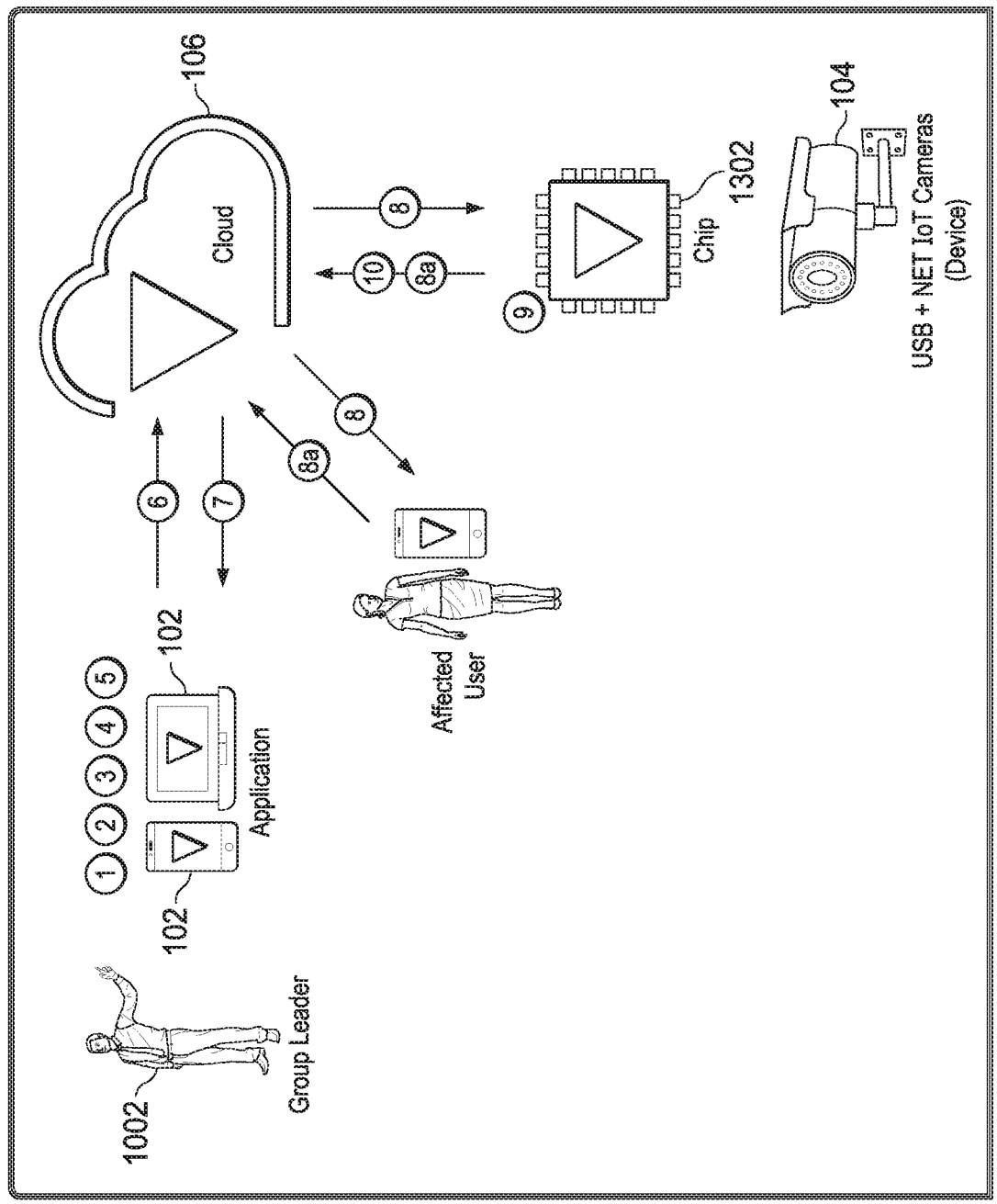
FIG. 15 illustrates a diagrammatic view of the operation of FIGS. 14A-B.

Referring now to FIGS. 14A-B and 15, there are illustrated a sequence diagram for managing user entitlements and a diagrammatic representation thereof, respectively. Managing user entitlements allows the group leader to add, remove users to access devices in the group, but also to update the type of access the users have on those devices. With respect to FIGS. 14A-B, the group leader 1002 decides to add or update entitlements for each user to each group. The group leader accesses the application and creates an updated profile with user entitlement. This involves opening the group entitlements, selecting the device, selecting the user, adding or removing an entitlement for that user and that device and then saving it on the application for the affected user. This is indicated by paths ① to ⑤. The application 804 then saves the profile (the group hash, plus a device hash plus the user hash plus the entitlement) to the server/cloud 106 along the path ⑥. The server/cloud 106 will then send back acknowledgments to the application 804 along the path ⑦. The server/cloud 106 will then push these entitlement profiles down to the affected user's applications 102 in order to ensure that the affected user has the latest entitlements saved. This occurs along path ⑧. An acknowledgment would be sent back to the server/cloud 106. The server/cloud 106 will then encrypt the profile payload with the device shared encrypted key and attempt to communicate with the device 104. If the device 104 is off-line, the server will wait and retry until the device comes back online. Once the server/cloud 106 establishes an encrypted connection with the device, the server 106 will then push to the device 104 the encrypted entitlement profile changes that the group leader 1002 requested, decrypt the payload and add or remove users from accessing, or update type of access the user has on the device 104 in an update process. They can also remove a user from the device. The entitlement profile is then updated and the server/cloud 106 is notified of such. The profile is then encrypted at the server/cloud 106 with the affected user shared encrypted key and then the profile payload is sent to the affected user, with an acknowledgment from the affected user to the service/cloud 106 that the entitlement profile has been received and updated.

With respect to FIG. 15, the different paths are defined as follows: 1) open group entitlements; 2) select device, 3) select user, 4) add/remove entitlement, 5) save, 6) application saves profile (group hash+device hash+user hash+entitlement) to server, 7) server acknowledgment to application, 8) server sends profile to device and affected user applications, 8a) acknowledgment sent back to server, 9) device decrypts and executes-add/remove/ignore command, wherein the add command relates to the user hash not being in the device and is not given any entitlements, the remove command is where the user hash is not in the device and the profile has requested a removal of the user hash and the ignore command is where the user hash is in the device and the profile has updated entitlements, and 10) device sends encrypted acknowledgment to server.

Figure 16A:
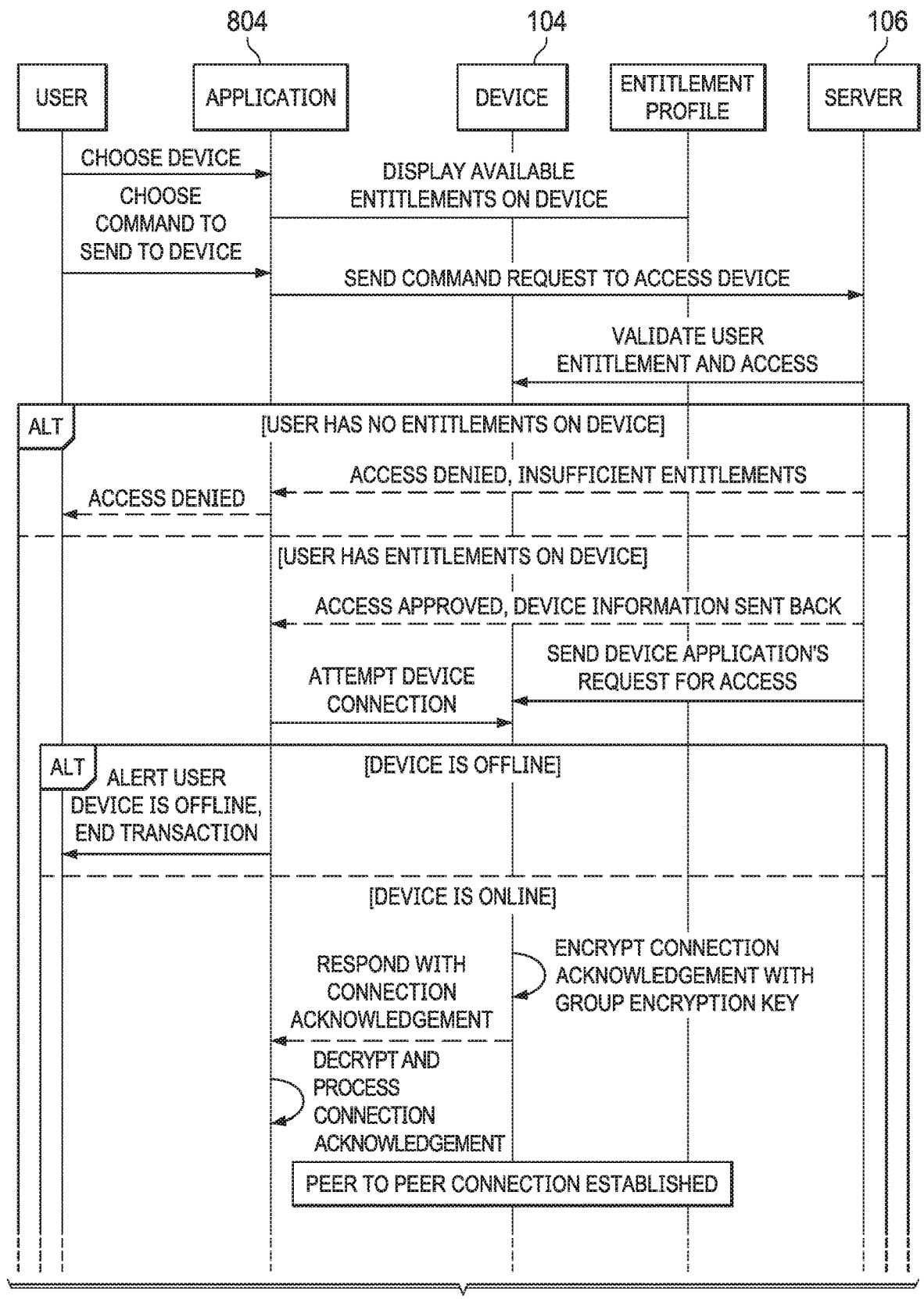
FIGS. 16A and 16B illustrate a sequence diagram for authenticating a user on a device.
Figure 16B:
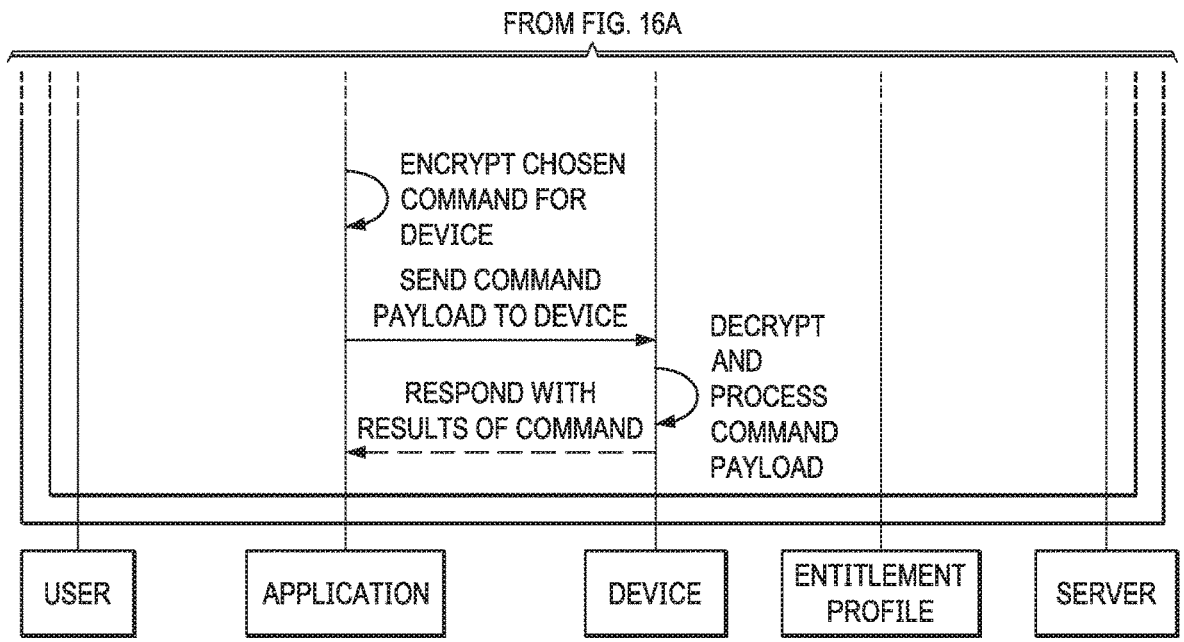
Figure 17:
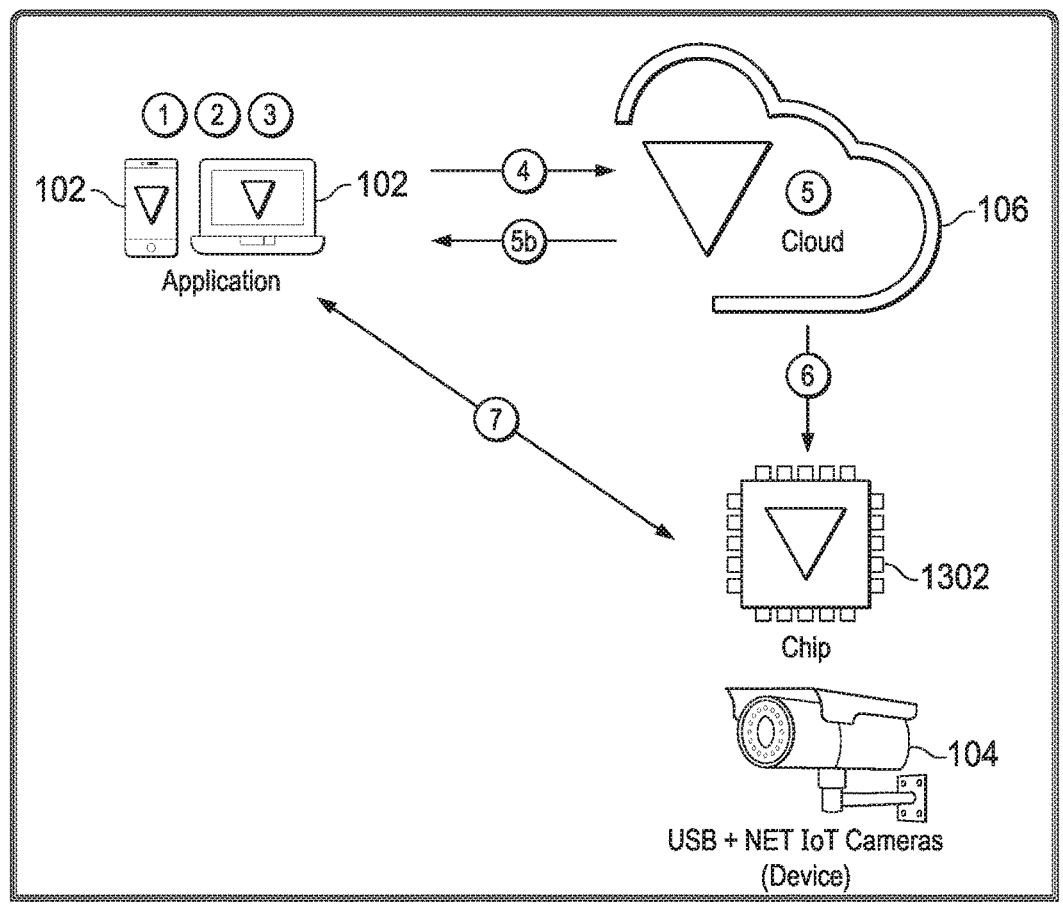
FIG. 17 illustrates a diagrammatic view of the operation of FIGS. 16A-B.

Referring now to FIGS. 16A-B and 17, there are illustrated the sequence diagram for authenticating a user with the device and a diagrammatic view thereof, respectively. Accessing of the device 104 requires a user to be validated through the server 106. The user will be able to see on their application all the allowed access they have for that device, and the ability to connect to the device with such access. Specifically, with respect to FIGS. 16A-B, the user chooses the device via their application by opening the group and selecting a device which displays the available entitlements on the device for that group. They then choose a command to send to the device with respect to the available entitlements and the desired action. These operations are illustrated in FIG. 17 with respect to paths ① to ③. The application then requests access to the device from the server 106 along the path ④. The server 106 accesses the entitlement profile to validate the user plus the entitlement and access associated with this command. If the server rejects the request due to lack of permissions, the transaction is terminated. However, once the transaction has been approved/validated by validating the user profile (group hash+device hash+user hash+entitlement) (path ⑤), the device information is sent back to the application in addition to sending to the target device the application's request for access thereto (path ⑥). This is required in order to allow the application 804 to then attempt a device connection. If the device is off-line, an alert will be sent and the transaction is ended. However, if it is online, the device 104 will encrypt the connection acknowledgment with the group encryption key (private key when not working with the group) and respond to the application with a connection acknowledgment that is encrypted. The application will then decrypt and process this connection acknowledgment wherein a peer-to-peer (path ⑦) connection is established. The chosen command will then be encrypted for the device at the application 804 and then a command payload (encrypted) sent to the device 104. The device 104 then encrypts and processes the command payload and then responds to the application with the results of the command.

With respect to FIG. 17, the paths are as follows: 1) open group, 2) select device, 3) select command (only entitled commands are viewable), 4) application requests access to device, 5) server validates user profile (group hash+device hash+user hash+entitlement), 5a) device available?-GOTO path 6, 5b) denied request, 6) server routes request to device, and 7) peer-to-peer connection is established.

Figure 18A:
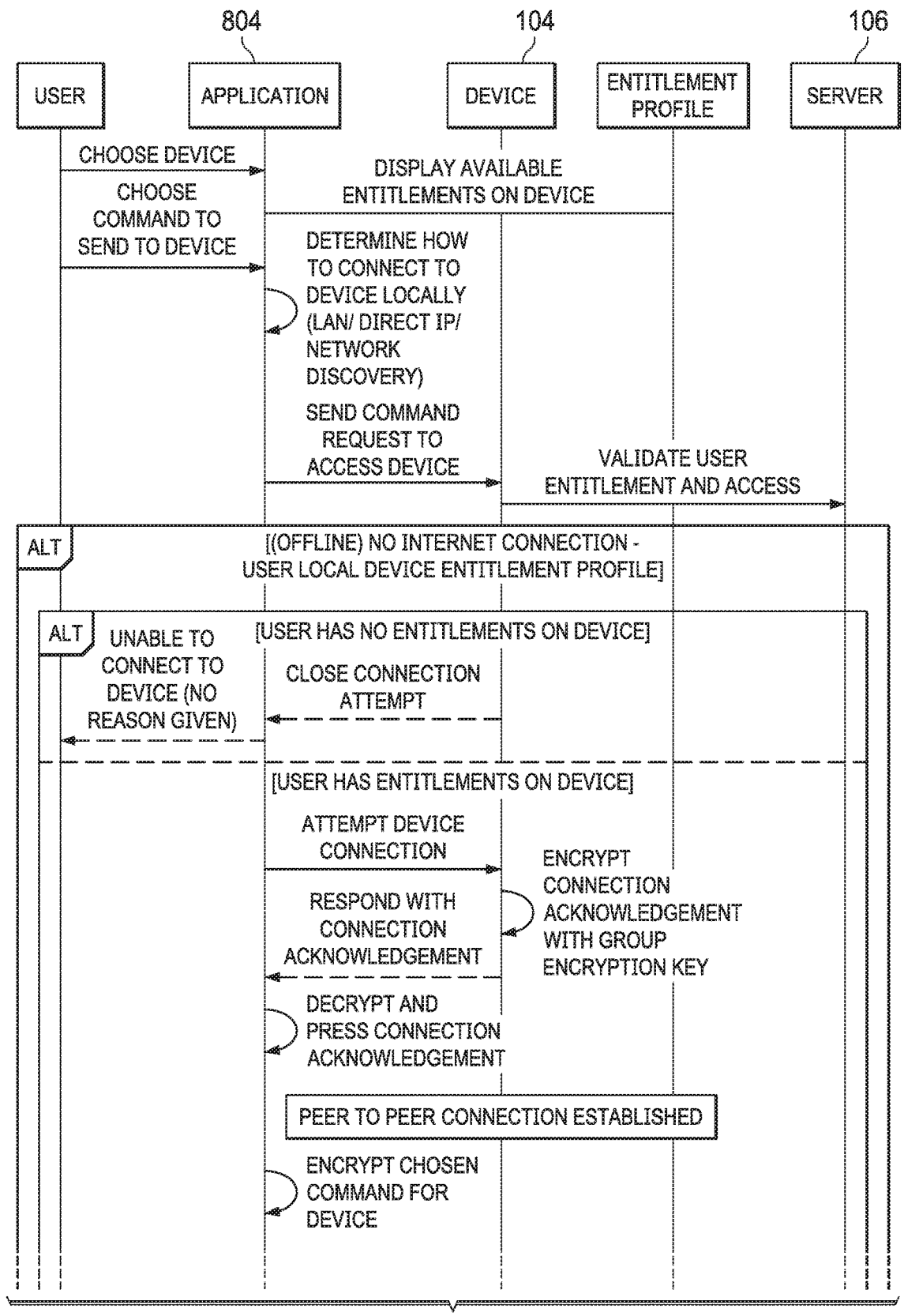
Figure 18B:
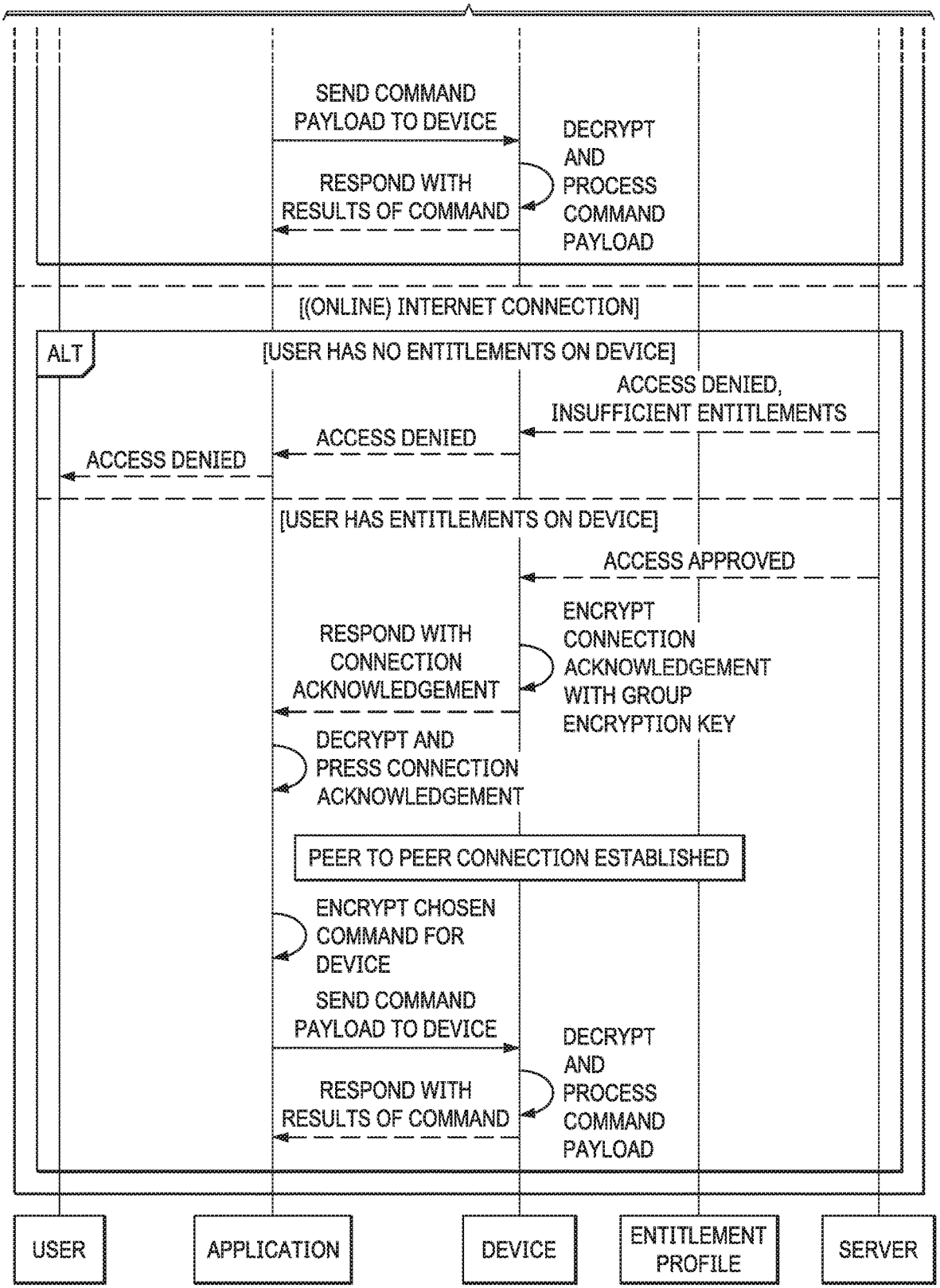
Figure 19:
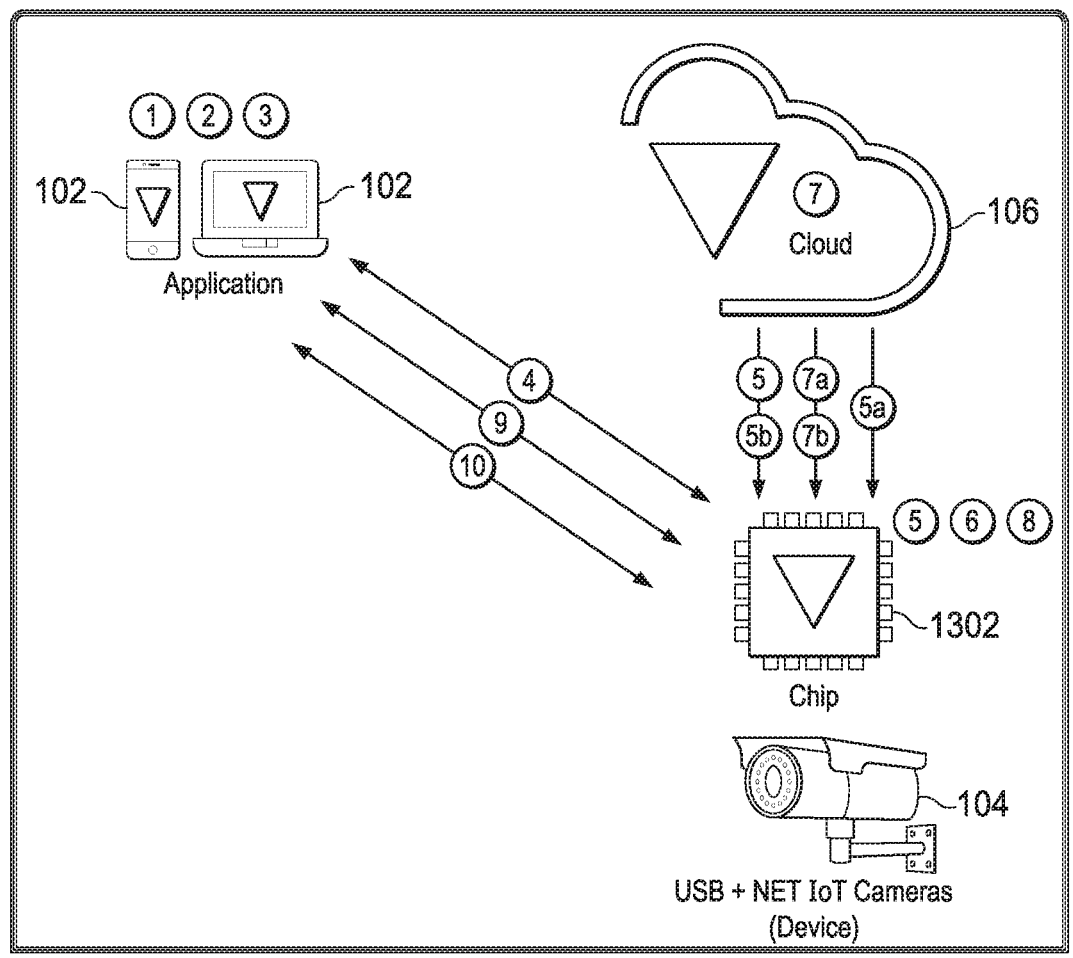
FIG. 19 illustrates a diagrammatic view of the operation of FIGS. 18A-B.

Referring now to FIGS. 18A-B and 19, there are illustrated a sequence diagram for allowing direct access for validation of the user through the device and the diagrammatic view thereof, respectively. When dealing with a local network, it is required that the user is validated directly to the device via a direct access operation. The user will be able to see on their application all of the allowed access they have for that device, and the ability to connect the device with such access. The application determines how to connect the device (via a LAN, direct IP, network discovery, etc.), and initiates a connection to the device 104. The user requests direct access to the device 104 via the application, wherein the various available entitlements are displayed from the entitlement profile on the device 104. The entitlement profile is maintained on the server 106, but a local copy can be maintained on the user device 102 also. Depending on the availability of an Internet connection, the entitlement profile may be accessed from either source, The user, after accessing the entitlement profile from the available source, will open a group, select a device and then the user will choose a command to be sent to the device (paths ①-③ in FIG. 19). It is noted that if there is no Internet connection for the device 104 to communicate directly to the server 106, then the application will check a local copy of the entitlements for the device 104 on the user device 102. If the entitlements exist in a local stored copy, then the application 804 at the user device 102 will attempt the device connection with a target device 104 in order to request access to the target device 104. The device 104 attempts to request the user profile (group hash+device hash+user hash+entitlements)

from server 106. If in the off-line mode with no Internet, the device 104 will look up the local user hash. The device 102 in the off-line mode will then encrypt a connection acknowledgment with the group encryption key (private key for nongroup operation) and then responds with the encrypted acknowledgment to the application 804 on the user device 102. The application 804 at the user device 102 then decrypts and processes the connection acknowledgment and a peer-to-peer connection is established. If, however, there is an Internet connection for the user device 102 to talk to server 106, the user device 102 will send the request for the user profile (hash+device hash+user hash+entitlements) to the server 106 to determine if the user has access to that user device 102. Since the application 804 on the user device 102 has direct contact with the IoT device 104, it is the device 104 that facilitates a connection with the server 106 for the validation process.

With specific reference to FIG. 19, paths described are as follows: 1) open group, 2) select device, 3) select command (only entitled commands are viewable), 4) application requests access to device directly via LAN or direct IP or network discovery, 5) device requests user profile (group hash+device hash+user hash+entitlements) from server, 5a) off-line-GOTO 6, 5b) online-GOTO 7, 6) device looks up local user hash, 6a) if it is local=accepts user GOTO 9, 6b) if it is not local=no response GOTO 10, 7) server validates user profile (group hash+device hash+user hash+entitlements, 7a) user profile sent to Chip 1302 GOTO 8, 7b) denied user hash request GOTO 10, 8) device decrypts user profile, 8a) device accepts a request-GOTO 9, 8b) device denies request-GOTO 10, 9). Peer to peer connection is established, and 10) DENIED-no response from device.

Figure 20:
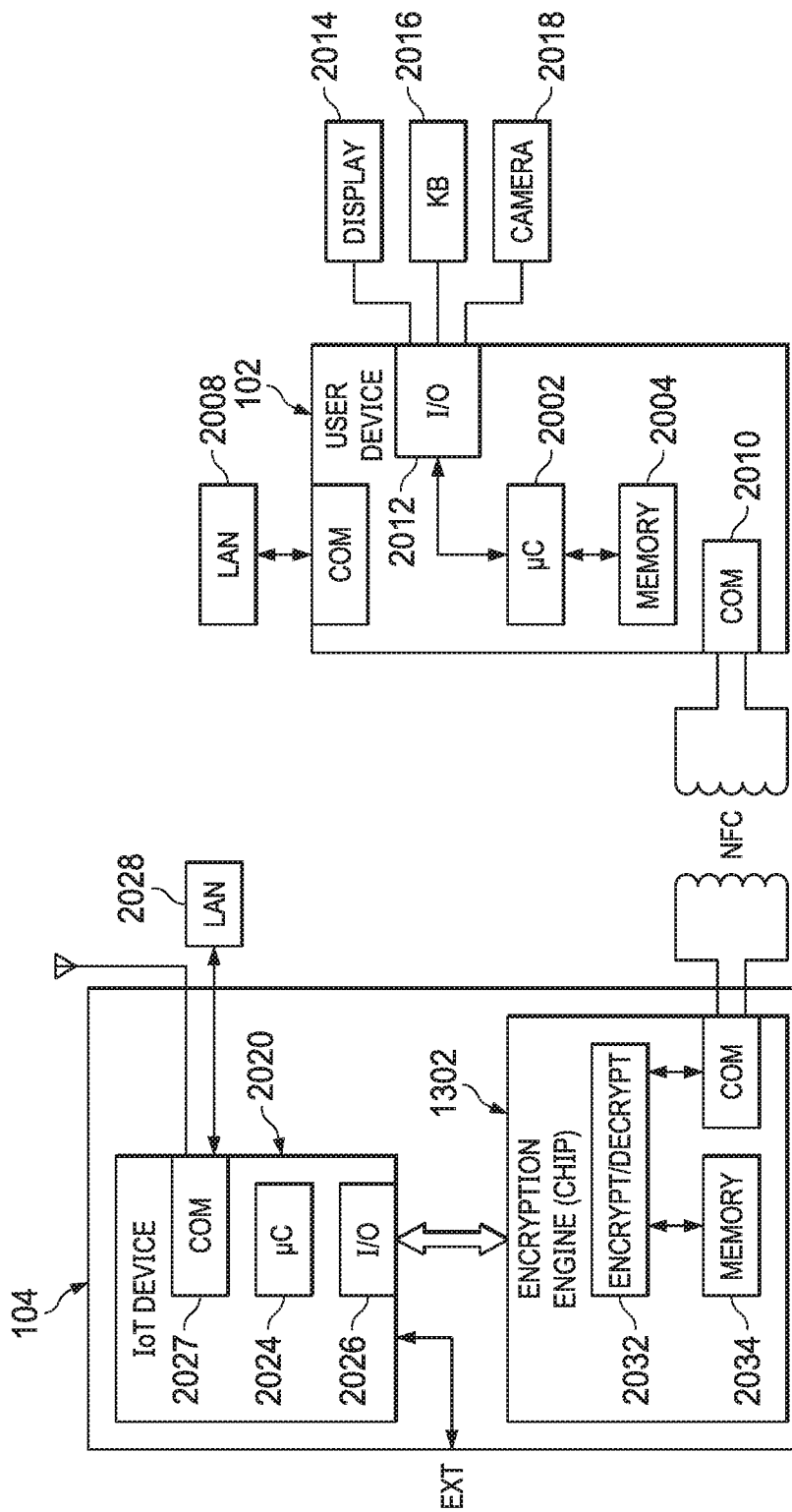
FIG. 20 illustrates a block diagram of the user device and of the IoT.

Referring now to FIG. 20, there is illustrated a block diagram for the user device 102 that interfaces with the IoT device 104. As disclosed above, user device 102 is the device that allows the user to create the unique user private key in association with an image dataset and a host factor. Basically, the user device 102 can be a computer or cell phone that has the ability to execute and run applications via some type of processor 2002, store information in a memory 2004 and be able to communicate with either an external local-area network 2008, or wireless service provider, and a near field device communication block 2010 for communicating with IoT device 104. It also has an input/output block 2012 in order to interface with a display 2014, a keyboard 2016, or other input device, and possibly a camera 2018 to obtain an image. As noted hereinabove, the image or other appropriate dataset could be downloaded over the network via the LAN 2008.

The IoT device 104 contains a basic functional IoT block 2020 which provides all of the IoT device functionality. The basic functional block 2020 has some type of processing element 2024 associated therewith, an input/output block 2026 for interfacing with the external environment to capture data, output data, etc. The basic functional device 2020 also has a communications block 2027 for communicating with an external wireless network or a local-area network 2028 in order to interface with the server 106.

In this embodiment, the device 104 has contained therein an encryption engine, the chip 1302. In this embodiment, a separate chip, chip 1302, is provided to interface with the basic functional block 2020, where basic functional block 2020 can be realized as a separate chip, in order to provide encryption of the data contained therein, this being encryption of stay at rest data that is to remain in the device or encryption of data that is transmitted to other devices. The encryption engine, chip 1302, has an encryption/decryption function 2032 associated therewith to allow it to use the private key which is imprinted thereon by user via the user device 102 and the near field communication link. There is provided memory 2034 for storing the private key, in addition to secured server keys and the such required to interface with the server 106. However, the private key that is imprinted upon the chip 1302 is used to provide quantum resistant security to the device 104. As noted hereinabove, a local connection such as the NFC connection, or a USB connection, is provided to allow a user via the user device 102 to transfer the private key to the device 104 after creation thereof on the user device 102. This imprint operation of the private key is facilitated by a Write Only Bonding Interface on the chip 1302. The chip 1302 can only be imprinted through this Bonding Interface and the private key stored in memory 2034, which has predetermined memory slots for different private keys. Once the private key has been stored, it cannot be read out via the Bonding Interface or the proximity-based communication link. It can only be used in the encryption/decryption operation by the encryption engine 2032. If another user were to bond with the IoT device 104, their private key would be stored likewise in the bonding process. Thus, the Bonding Interface provides a gateway for the storage of a private key in a Write Only operation. This is a One Time Program (OTP) function wherein the private key, once written, cannot be accessed. Typically, the memory 2034 will be a Flash memory to provide the nonvolatile function of the memory 2032 and it may be possible to provide for erasing of all the private keys stored, but the memory 2032 is protected from external reading of the key slots. It should be understood that the entire functionality of the chip 1302 could be incorporated in an application running in software or, alternatively, the hardware functionality of the chip 1302 could be integrated into a single chip such that the basic functional block 2020 and the functionality of the chip 1302 are combined into a single chip.

In operation, as described hereinabove, the user is operable utilize a very unique user PIN and known photograph (which corresponds to a fixed dataset with an associated entropy) to create a unique private key. This is all the information that the user needs to input to the application to generate this private key on the user device 102. As also described hereinabove, the application that runs on the user device 102 can pull down a host factor from the server 106 that is utilized for the key generation operation. However, the user is only in possession of their user PIN and photograph. The derived private key is then imprinted on the IoT device 104 via a proximity-based communication link in a one way Write Only operation. As such, both the application and the IoT device possess the private key allowing access to secure data transmission using encrypted data that is encrypted/decrypted with the same private key in a symmetric manner. Thus, the user, with possession of this unique and personal private key can interface with the IoT device 104 through any communication link via the application running on the user device 120, and no involvement of a host is necessary after access is granted to the IoT device 104. This provides symmetric end-to-end encryption. If, for some reason, the user needs to re-create the key, all that is required is for the user to know their unique user PIN and have access to the original photograph or image dataset (or any other dataset) in order to re-create the private key in conjunction with the host.

Figure 21A:
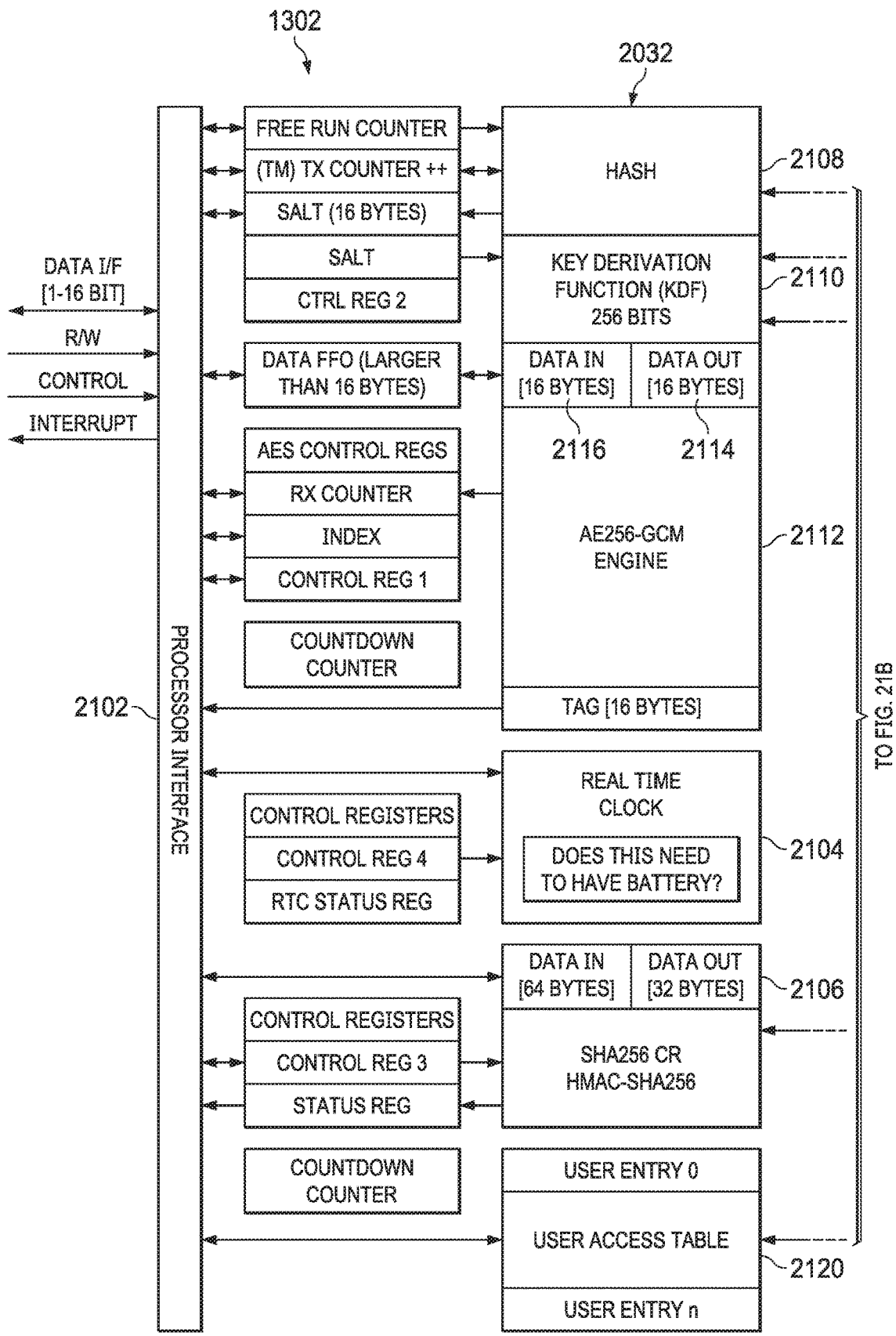
FIGS. 21A and 21B illustrate a block diagram of encryption engine chip.
Figure 21B:
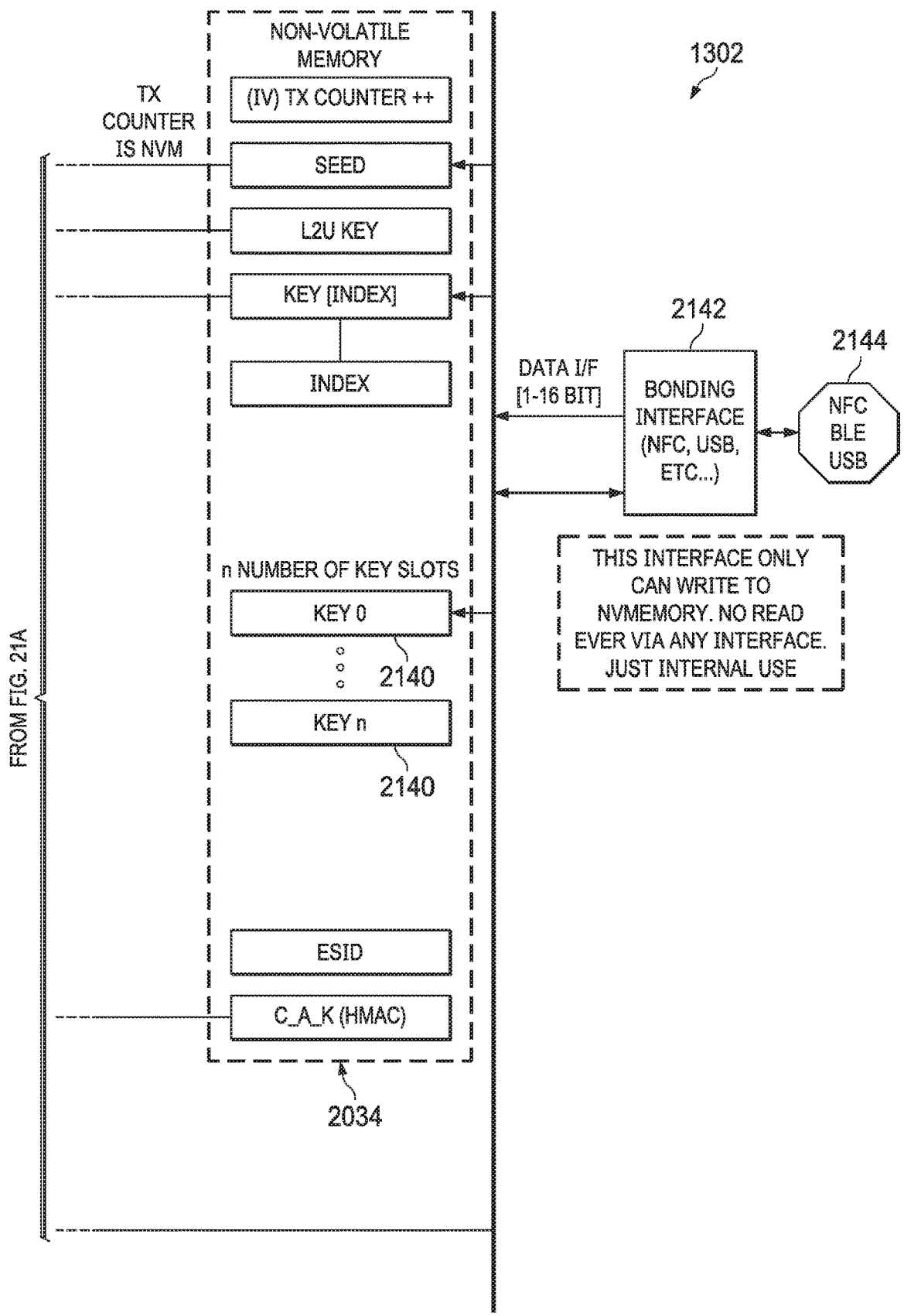

Referring now to FIGS. 21A-B, there is illustrated a block diagram of the chip 1302. As described above, the chip 1302 is utilized, in one embodiment, to provide a separate and independent chip that operates within the IoT device 104 in conjunction with the base IoT functional block/chip 2020. This allows a hardware solution to be realized for an encryption engine that can interface with the base IoT functioning block/chip 2020 having the general functionality of the IoT device, in order to secure data transfer between the IoT device 104 and the user device 102. The chip 1302 interfaces with the user device 102 through a proximity-based communication link in order to facilitate receipt and storage of the private key. The private key is then stored, in this embodiment, in hardware via a bonding interface that allows for Write Only access for key transfer (registration). This is to be compared with software storage, which can possibly lead to some level of security concerns. As noted hereinabove, the entire functionality of the chip 1302 could be implemented in software on the IoT device 104.

Once the interface between the chip 1302 and the user device 102 results in the storage of the private key in the chip 1302, chip 1302 then operates in conjunction with the general functionality of the base functioning IoT block/chip 2020 to encrypt data for transmission therefrom and to decrypt received encrypted data in accordance with the private key. This, of course, involves communication with another device that possesses the private key, i.e., the user device 102.

At the center of the chip 1302 is the encryption/decryption engine 2032. This incorporates various functioning blocks such as a hash block 2108, a key derivation function block 2110, a data out buffer 2114, a data in buffer 2116 and an Advanced Encryption Standard (AES) engine 2112. The AES engine 2112 encrypts and decrypts data in a hardware solution. The AES engine 2112 interfaces with the processor 2024 of the base IoT functioning block/chip 2020 via a processor interface 2102. Various control registers, receive counters, control registers and index registers are provided in between the AES engine 2112 and the processor interface 2102, noting that data can be transferred between the base IoT functioning block/chip 2020 and the user device 102 over the proximity-based communication link fir the bonding operation. Encryption/decryption engine 2032 interfaces with the memory 2034, a nonvolatile memory, for storage of data therein. It has memory slots contained therein for storing derived keys from the user device 102, such that multiple private keys can be accommodated. A real-time clock 2104 is provided in addition to a Hash-based Message Authentication Code (HMAC) block 2106, which HMAC is a specific type of message authentication code (MAC) involving a cryptographic hash function in the secret cryptographic key. A cryptographic hash function, such as SHA-256, may be used in the calculation of an HMAC. Basically, HMAC uses two passes of hash computation. The secret key is first used to drive to keys-inner and outer. The first pass of the algorithm produces an internal hash derived from the message and the inner key. The second pass produces the final HMAC code derived from the inner hash result in the outer key. Thus, the algorithm provides better immunity against length extension attacks. The chip 1302 also includes a user access table block 2122 containing user profile information, as described hereinabove.

The proximity-based communication is facilitated through a Bonding Interface, which could be any type of proximity-based interface such as an NFC, BLE, Zigbee, etc. interface. This Bonding Interface is designed such that it can only write derived keys to the memory 2034 with no Read operation permitted. Internally, data can be read and written to the memory, but the memory cannot be read through the Bonding Interface, i.e., Read operations prohibited. However, the base IoT functioning block/chip 2020 can communicate with the user device 102 through this interface to communicate such things as its ESID for the bonding process.

In general, the chip 1302 protects the private keys via a One Time Program (OTP) technique. After manufacture, 1) the device 104 to server 106 key can be used with a Hash-based Key Derivation (HKDF) function to create block encryption keys to encrypt (the HKDF is a simple key derivation function KDF) based on a hash-based message authentication code (HMAC)), 2) the SCAK can be used to validate payloads from the server 106 and 3) the DCAK can be used to certify payloads to the server 106. These keys can never be read, even if the chip is unsoldered manually toggle.

The chip 1302 maintains a set of storage registers that have the configuration of all known registered users. Many of these registers can be read from the chip by the processor 2024. The per user application keys can only be written through the Bonding Interface with cooperation of the processor 2024. However, these keys also have Write and Use access only; they can never be read and no Read operation from the memory of at least the stored derived private keys is permitted through the proximity-based communication link. A device selector chooses device data and keys based on index.

The chip 1302 also maintains the last sent and the last received counters from each device in the per user registers. The AES-GCM (Galois/Counter Mode) protocol always increments the counters, so a replay attack can be detected by a reused IV counter. The SSID and Wi-Fi passwords are stored in special registers. If the secure boot verifies the program, only then will the Wi-Fi data be made available in registers to be read by the processor 2024. This protects sensitive data from being exposed if the chip 1302 is unsoldered.

The HKDF creates block encryption keys using the particular encryption key chosen (in unreadable registers) and a "salt" value. The salt is unique every new session (video feed, power cycle, time period, . . . ); randomness is not required. Since IoT devices do not have much entropy on startup (random number generation is suspect), a unique number is created from several numbers hashed together. The seed (random number from bonding), the epoch time, a free running counter and the send counter are all hashed together to create an always unique number.

The chip 1302 maintains countdown registers for each user. When this register reaches zero, encryption is locked. A new server certification must be validated before encryption is unlocked.

In the bonding sequence, described hereinabove, once the secure or private key of the user has been created, the user then has to "imprint" this private key onto the IoT device 104 for storage in the memory 2034, i.e., this is a transfer operation that is part of the bonding process. As noted hereinabove, this is a process that is a one-time Write operation for storage in one of a plurality of key slots 2140 in the memory 2034. It can be appreciated that multiple private keys can be accommodated by the memory 2034 for different users. Users, once they store their private key in the memory 2034, are then registered in the use access table 2120. For any given session, after the bonding process is complete, access to the IoT device 104 is facilitated through the server 106. Since the user device 102 is registered with the server 106 in a particular communication session, i.e., via a login password and user ID, the server 106 can identify the user that is in communication therewith such that the appropriate private key for that user can be utilized in the communication session or encryption/decryption between the user and the IoT device.

As described hereinabove, the bonding interface is a proximity-based interface that is utilized for the bonding process. In one disclosed embodiment, this interface is facilitated with a bonding interface 2142 which is an interface from the chip 1302 to a physical interface 2144 which could be NFC, BLE or USB. With such a proximity-based interface, an external hacker would be virtually prohibited from gaining access to the communication of the private key from the user device 102 through the bonding at interface 2142 for storage in the memory 2034.

In operation, the user device can communicate with the processor 2024 through the bonding interface 2142 and the proximity-based physical interface 2144 to send requests thereto. The request, as described hereinabove, is for the ESID in the initial set up operation. The basic operation is that ESID be requested from the processor 2024 to identify the IoT device 104, which request is and satisfied by transferring through the bonding interface 2142 and physical interface 2144 the ESID to the user device 102. The next step is to perform a Write operation from the user device 102 to memory 2034 of the shared device-to-server key and the user private (or secure) key to the appropriate memory slots. Since this is a nonvolatile memory, each subsequent Write operation cannot write over the previous entry and, as such, each new private key will be written to the next location in memory 2034, as well as the shared key. These can be identified by the user hash which can be stored in the user access table, which is then linked to this particular address location in the memory 2034. The memory 2034, of course, can be erased in a block erase operation, as it is a FLASH memory. It is just that any Read operation through any external interface is prohibited.

During operation, as described hereinabove, the chip 1302 has no provision for allowing a Read operation to be performed on the memory 2034 over any external interface. The only Read operation that is allowed is an internal Read by the encryption engine 2032 for the purpose of encrypting or decrypting data. In order to allow encryption/decryption of data by the IoT functional block/chip 2020. Thus, any data that is to be stored, transmitted or internally processed in a secure manner for a particular user, the IoT functional block/chip 2020 will make a call to the chip 1302 for encryption/decryption thereof. This encryption/decryption operation requires the chip 1302 to access the appropriate shared key and/or private key for any encryption or decryption operation. All that is necessary is for the chip 1302 to identify the particular user in the user access table in order to determine which shared key/private key is to be utilized for a particular session. In a peer-to-peer session, the server 106 that is communicating with the IoT device 104 communicates such that the particular user is known for that particular session. There is no communication required during a peer to peer session through the bonding interface 2142. The bonding interface 2142 is utilized, in this disclosed embodiment, exclusively for the bonding process. As such, the Write operation for the shared key/private key can be controlled by the chip 1302 in order that access to the shared keys and private keys in the memory 2034 are protected. One aspect is that the private key of the user is generated in a secure manner on the user device 102, and it is the transfer (or imprinting) of the private key to the memory 2034 that must be achieved with a high level of security. The security is provided by the proximity-based Write-only communication link that virtually eliminates any exposure of the transfer operation of the private key to the memory 2034 for storage therein. Once transferred (or imprinted), the private key is locked to any external access. From a hardware standpoint, even if the IoT device 104 were accessed, it will be difficult to extract this private key out of the memory.

Figure 22:
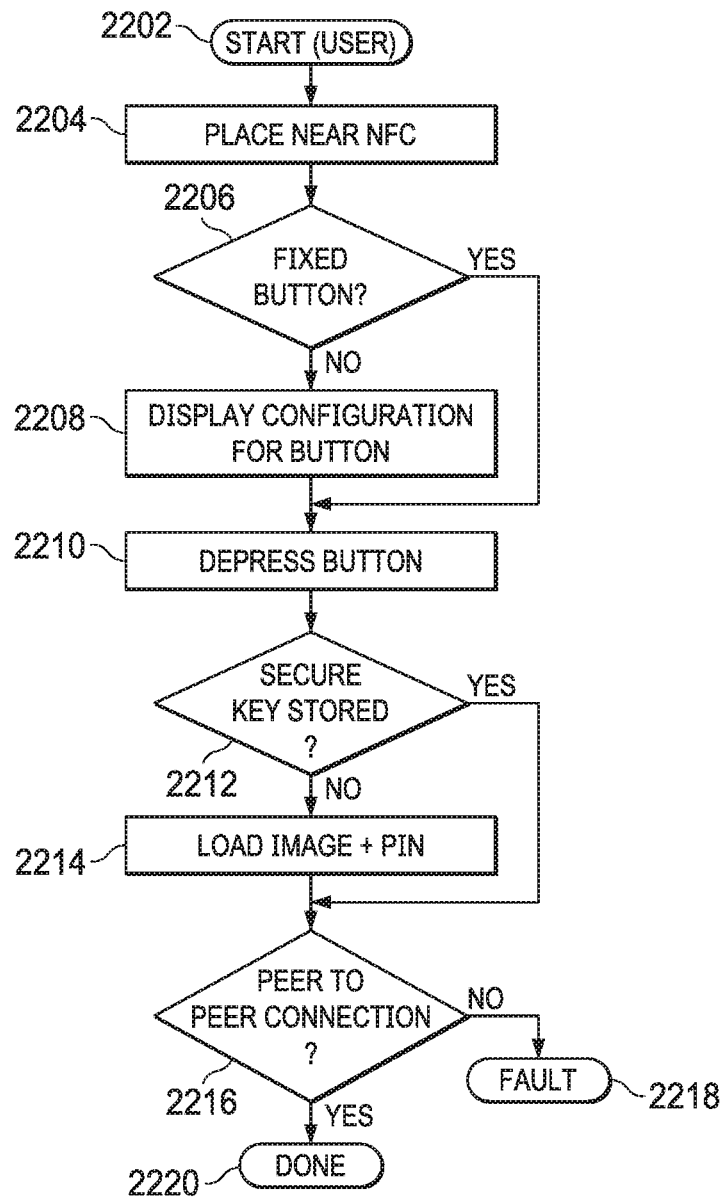
FIG. 22 illustrates a flowchart for the user initiated bonding operation via depressing a button.

Referring now to FIG. 22, there is illustrated a flowchart depicting, from the perspective of the user, the operations for initiating a bonding operation with the device 104, the IoT device. As an overview, it is desirable that the interface with any IoT device in order to establish an encrypted relationship for communication therewith be relatively straightforward. In accordance with the processes described hereinabove, a user is required merely to have access to their user PIN and unique photograph or image in the application residing on their device 102. All is required is to place their device in proximity to the IoT device 104, input their ID pin and associated photograph or image into the application and then depress a button on the IoT device 104. This operation will interface between the server 106 and the device 104 in order to generate a secure or private key at the user device, connect to the IoT device 104 and transfer thereto the secure or private key to allow a peer to peer communication thereafter. This is all affected with the mere placement of the user device 102 adjacent the NFC communication interface of the IoT device 104 and subsequent depressing of a button to a physical interaction with the IoT device 104.

The process is initiated at Start block 2202 from the perspective of the user and then proceeds to a function block 2204 wherein the user places their user device 102 adjacent to the NFC communication coil of the IoT device 104 to establish a near field communication link therewith. The program proceeds to a decision block 2206 to determine whether the operation has a predefined physical button or interface on the IoT device 104 or whether there is an operation wherein some physical interface such as a button has to be repurposed for the bonding operation. If this is not a fixed button, that requires the IoT device 104 to repurpose one of its buttons. If so, the program flows along the "N" path from decision block 2206 to a function block 2208 to display on the display of the user device 102 configuration information so that the user is informed as to what button or physical interface has been repurposed. As will be described hereinabove, this information is received from the server as a result of connecting to the IoT device 104 If it is a fixed button, the program will flow from the decision block 2206 along the "Y" path to function block 2210, which function block 2210 is also the destination of the output of the function block 2208. Therefore, once the user is apprised of the button or physical interface on the IoT device 104 that will initiate the bonding operation, the user can proceed.

The program then flows to a decision block 2212 to determine if a secure or private key for the user has been previously generated and stored at the user device 102. It is possible for there to be a previously generated secure or private key of the user stored at their device 102 or, more preferably, the secure or private key of the user is generated each time a bonding operation is initiated. If the secure or private key is not stored, the program will flow from the decision block 2212 along the "N" path to a function block 2214 wherein the unique user PIN and the associated unique image for the secure or private key generation is loaded. The image may actually be stored in the user device 102, wherein the user PIN will be input during the bonding operation. The program then flows to a decision block 2216, which is also the destination of the decision block 2212 flowing therefrom along the "Y" path, to determine if a peer to peer connection has been effected. If not, the program flows on the "N" path to a block 2218 to indicate a fault. If successful, the program flows along the "Y" path to a Done block 2220. This operation therefore illustrates how the user, merely by 1) interfacing with the NFC communication channel of the IoT device 104, 2) depressing a physical button or other interface and 3) entering their unique user PIN (assuming image was previously stored) to establish a secure peer to peer communication link with an IOT device. This particular device can be a device that only interfaces with this application, wherein communication cannot be enabled without the bonding operation. Thus, any communication is required to be an encrypted secure communication. And they can only be effective with a user that is verified on the system associated with the application running on the user device 102.

Figure 23:
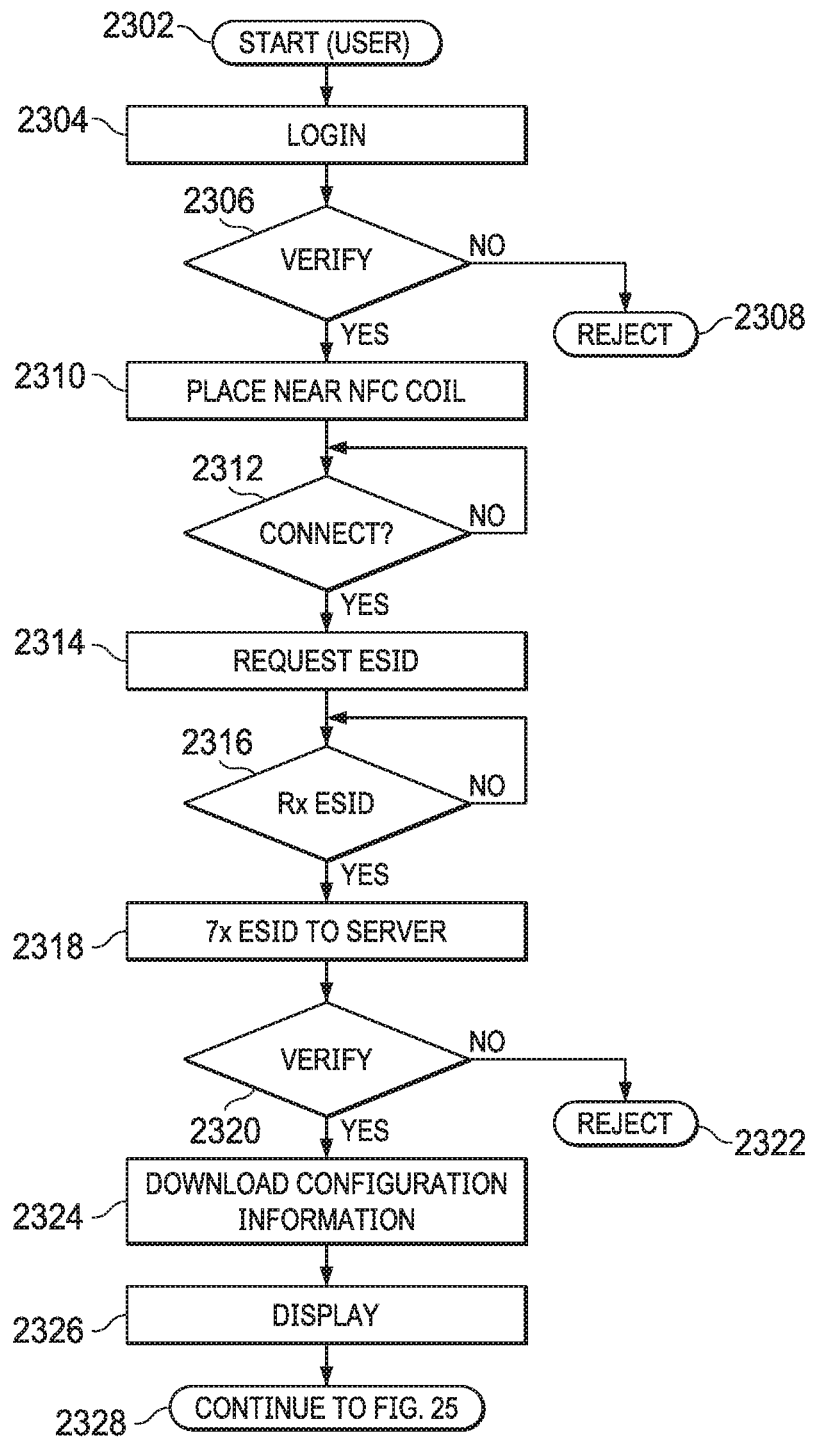
FIG. 23 illustrates a flowchart from the perspective of the user for logging into the application and retrieving configuration information for the IoT.

Referring now to FIG. 23, there is illustrated a flowchart depicting, from the perspective of the user, the operation wherein the user launches an application, logs into the system in order to retrieve information in order to determine which physical interface will initiate the bonding operation. The program is initiated at a Start block 2302 and then proceeds to a function block 2304 wherein the user launches the application and then goes to a login process, as described hereinabove. Of course, the user has to be a previously registered user of the system. The program then flows to a decision block 2306 in order to verify that the user is a valid user and, if so, the program flows along the "Y" path to a function block 2310, which indicates an operation wherein the user places the user device 102 adjacent to the NFC communication coil of the IoT device 104. If, of course, the user has not been verified by the server 106, the program will flow along the "N" path from the decision block 2306 to a block 2308 to reject the login operation. Of course, it could be that the user had input the wrong user ID and/or user password. In any event, the login operation failed at this point.

The program proceeds from the function block 2310 to a decision block 2312 to wait for a connection to be established between the user device 102 and the IoT device 104. Once connected, the program flows along the "Y" path to a function block 2314 wherein the user device requests an ESID unique to the IoT device 104 from the IoT device 104. This request could be affected merely by connection and the user device 102 identifying itself to the IoT device 104 or there could actually be a request transmitted to the IoT device 104 from the user device 102 with a specific request for the ESID, which would require some type of identification. However, it may be that the application itself has the ability to effect this communication regardless of what user device 102 is interfaced with the IoT device 104. In any event, the IoT device 104 recognizes the connection with the user device 102 and the need to transmit an ESID thereto in order to initiate a bonding operation. The program then flows along an "Y" path to decision block 2316 wherein the user device 102 waits for receipt of the ESID from the IoT device 104. Once received, the program flows along the "Y" path to a function block 2318. At this point, the user device can utilize this ESID for the purpose of identifying the IOT device 104 with respect to any configuration information needed to effect a peer-to-peer communication therewith on a secure basis.

Once received, the ESID is transmitted to the server at the function block 2318. The program flows to a decision block 2320 in order for the server to verify the ESID as being an IoT device that is registered with the system. If so, the program will flow from the decision block 2320 along a "Y" path to a function block 2324 in order to download configuration information and, if not verified, the program will flow along a "N" path from the function block 2322 to a Reject block 2322. Configuration information, in one disclosed embodiment, is maintained at the server 106, such that it can be downloaded from the server 106 to any requesting user device 102. However, it is possible that the configuration information could actually be stored in and retrieved from the IoT device 104, but this would require significantly more storage and processing power in the IoT device 104 and, as such, storage at the server 106 is preferable. Once downloaded, this configuration information is displayed on the display of the user device 102 at a function block 2326. The program then flows to a block 2328, the operation of which is continued in the flowchart of FIG. 25, hereinbelow.

Figure 24:
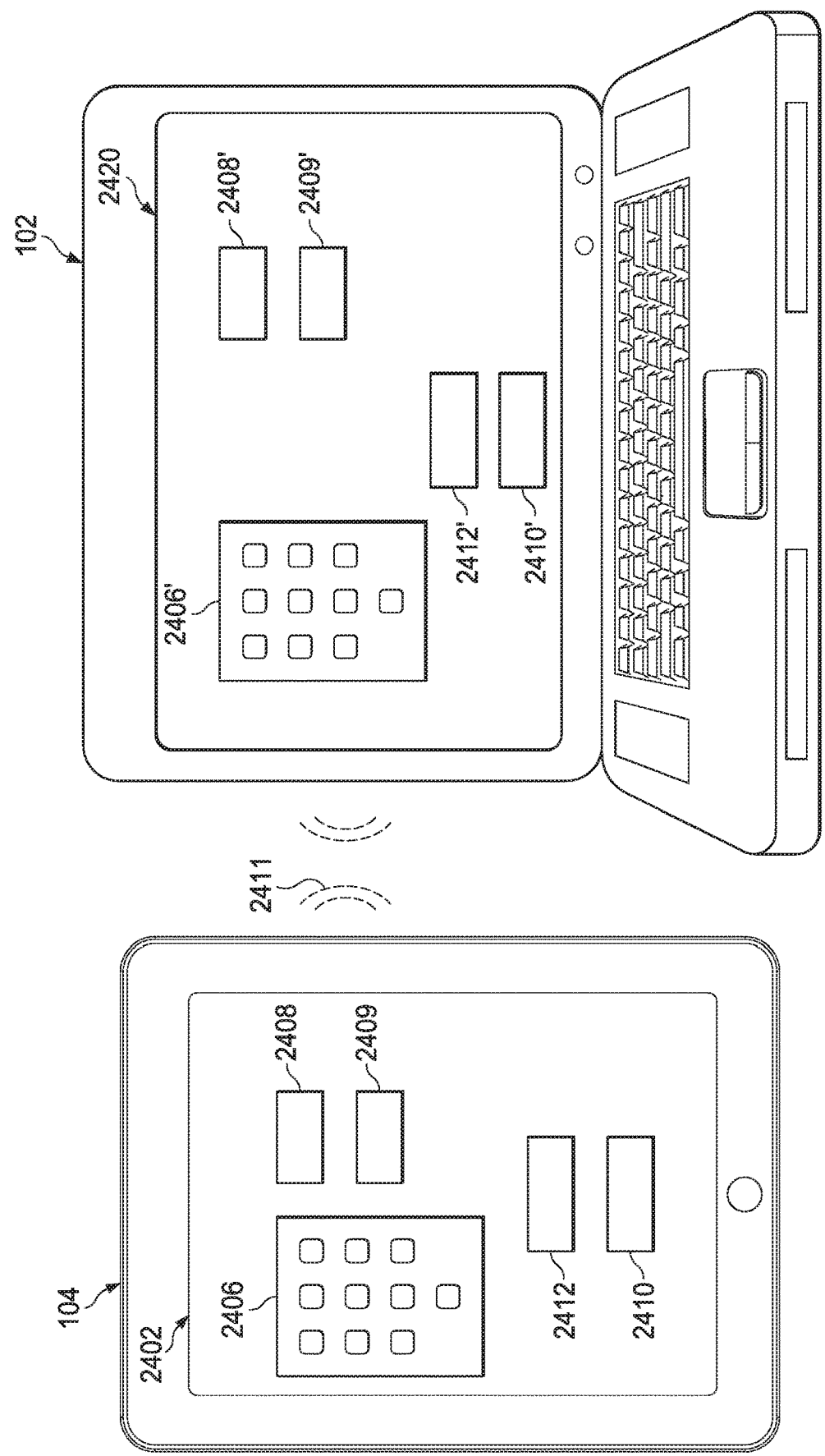
FIG. 24 illustrates a diagrammatic view of displaying panel configuration information to the user.

Referring now to FIG. 24, there is illustrated a diagrammatic view of the user device 102 disposed in close proximity to the IoT device 104 via a near field communication link 2411. The user device 102 illustrates a display 2420 that the user can view. The IoT device 104 has a panel 2402 illustrated which basically has various controls in the such for operating the IOT device 104 in its normal function. For example, this could be a smart refrigerator wherein the user can interface with the various controls necessary to operate the smart refrigerator. Thus, there is illustrated a keypad 2406 and the plurality of functional buttons 2408, 2409, 2410 and 2412 on the panel 2402. When the user device 102 downloads the configuration information from the server 106, this configuration information, and one disclosed embodiment, can be a visual display of the control panel 2402. This would thus have displayed thereon a representation of the keypad 2406 as a keypad 2406', the buttons 2408, 2409, 2410 and 2412 as representations 2408', 2409', 2410' and 2412'. In this configuration, it is noted that the representation of the button 2410, representation 2410', has a large "X" marked therethrough. This indicates that this particular button 2410 on the panel 2402 has been repurposed for the bonding operation. Of course, as noted hereinabove, there could be a fixed button or physical interface that is the bonding operation activation button or physical interface, and this would be indicated on the display 2420 to indicate to the user exactly which physical interface is required for the bonding operation. Even though this physical interface may have a large label "Bonding Operation" disposed in association therewith, it is helpful for the user to know the location of this particular bonding operation button or physical interface. It may also be that this button or physical interface is hidden on a side surface and the configuration information sent to the user device 102 from the server 106 provides information to the user as to the location of this hidden button or physical interface.

Figure 25:
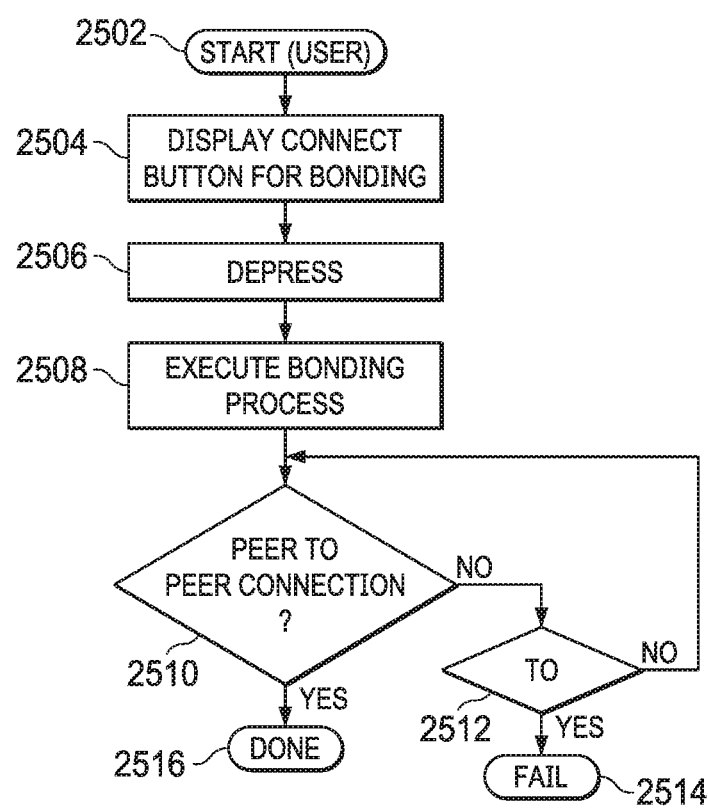
FIG. 25 illustrates a flowchart continuing from the operation from FIG. 23.

Referring now to FIG. 25, there is illustrated a continuation of the flowchart from FIG. 23. This is initiated at a Start block 2502 and this is from the perspective of the user device 102. The program flows to a function block 2504 in order to display the location of the correct button for bonding, this either being location of a fixed button or a repurposed button. The program then flows to a function block 2506 wherein the user actually physically depresses this particular button via some type of physical interface, i.e., depressing the indicated button for interfacing with the physical interface indicated on the display 2420 of the user device 102. The program then flows to a function block 2508 wherein the bonding process is then executed on the user device 102, which was described hereinabove and which will be described in more detail hereinbelow. The program then flows to the decision block 2510 in order to determine if the bonding process has been completed to allow for a peer to peer connection. If not complete, the program flows along an "N" path to a timeout decision block 2512 to determine if a timeout operation has occurred, at which time the program will flow along a "Y" path to a Fail block 2514. If not timed out, the program will continue to loop back to the input of the decision block 2510. Once the peer to peer connection has been established, the program flows along the "Y" path to a Done block 2516. At this point, it can be appreciated that user has done nothing more than physically depress the indicated button in order to effect a bonding process to establish a peer to peer communication link, which is a secure communication link, wherein a secure or private key of the user has been generated and downloaded to the IoT device 104, allowing subsequent secure communication along a peer to peer communication link.

Figure 26:
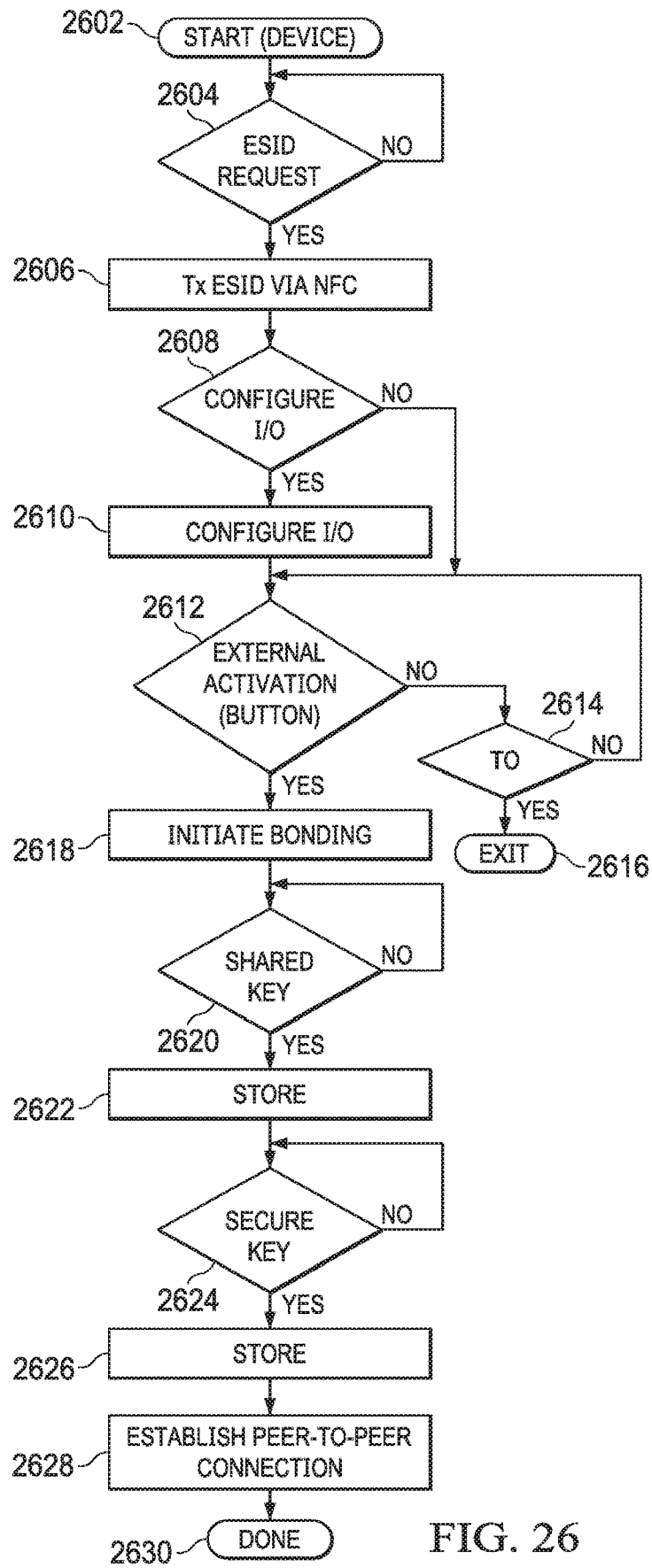
FIG. 26 illustrates a flowchart from the perspective of the device for processing the bonding operation.

Referring now to FIG. 26, there is illustrated a flowchart operating from the perspective of the IoT device 104. The program is initiated at a block 2602 and then proceeds to a decision block 2604. The IoT device 104 is in an interactive mode merely waiting to be initialized, in one disclosed embodiment. Until there is a connection from the NFC channel with a communication from the application requesting ESID, the IoT device 104 is in a standby mode waiting for initialization. The decision block 2604 and ESID request had been received, at which time it flows from the "Y" path thereof to a function block 2606 to transmit the ESID of the IoT device for via the NFC communication link to the user device 102. The program then flows to a decision block 2608 to determine if some repurposing of the input/output (I/O) is required. If so, the program flows along the "Y" path to a function block 2610 to reconfigure or repurpose any one of the inputs associated with the operation of the IoT device 104, such that a received input will be interpreted as a command to initiate the bonding process. This could be a button that, for example, indicates on a smart refrigerator in normal operation a selection of the type of ice but, in a bonding process, initiates the bonding process. If it is a physical interface that is dedicated to the bonding process, the program will flow from the decision block 2608 along the "N" path to a decision block 2612, the same path followed from the function block 2610 after configuration or repurposing of an input.

The decision block 2612 determines whether an external activation has been received. Until an external activation has been received, the program flows along a "N" path to a timeout decision block 2614. If the decision block 2614 times out, the program flows along a "Y" path to an exit block 2616 and, if no timeout has occurred, the program looks back around to the input of the decision block 2612. Once the external activation has been received, the program flows along a "Y" path from the decision block 2612 to a function block 2618. This indicates the initiation of the bonding process. The program then flows to a decision block 2622 to determine if the shared key from the server has been received. As described above, in the bonding process, the server 106 will create a shared device to server key that allows the IoT device 104 to communicate directly with the server 106. This is part of the bonding process. The program then flows along a "Y" path to a function block 2622, once the shared key has been received, for storage of the shared key. The program then flows to a decision block 2624 to wait for receipt of the secure or private key of the user and other associated information, as described hereinabove in accordance with the bonding process. Once received, the program flows from the decision block 2624 along a "Y" path to a function block 2626 for storage of the secure or private key of the user in memory. The program then flows to a function block 2628 to complete the process and establish a peer to peer link with the user device 102. As described here above, this is just a completion of the bonding process, wherein the IoT device 104 is now able to communicate with the user device 102 via a communication link other than the NFC communication link. In one embodiment, it may be that the user device 102 will send a test message to the IoT device 104 via an external communication link. Typically, there will be some type of 802.15.XX communication channel that can be established by the IoT device 104, but which require some type of configuration information to effect a connection between the IOT device 104 and some router that is disposed thereby. This may be an additional configuration step that is required by the user, i.e., a basic set up of the IoT device 104. Once complete, the program flows to a Done block 2630.

Figure 27A:
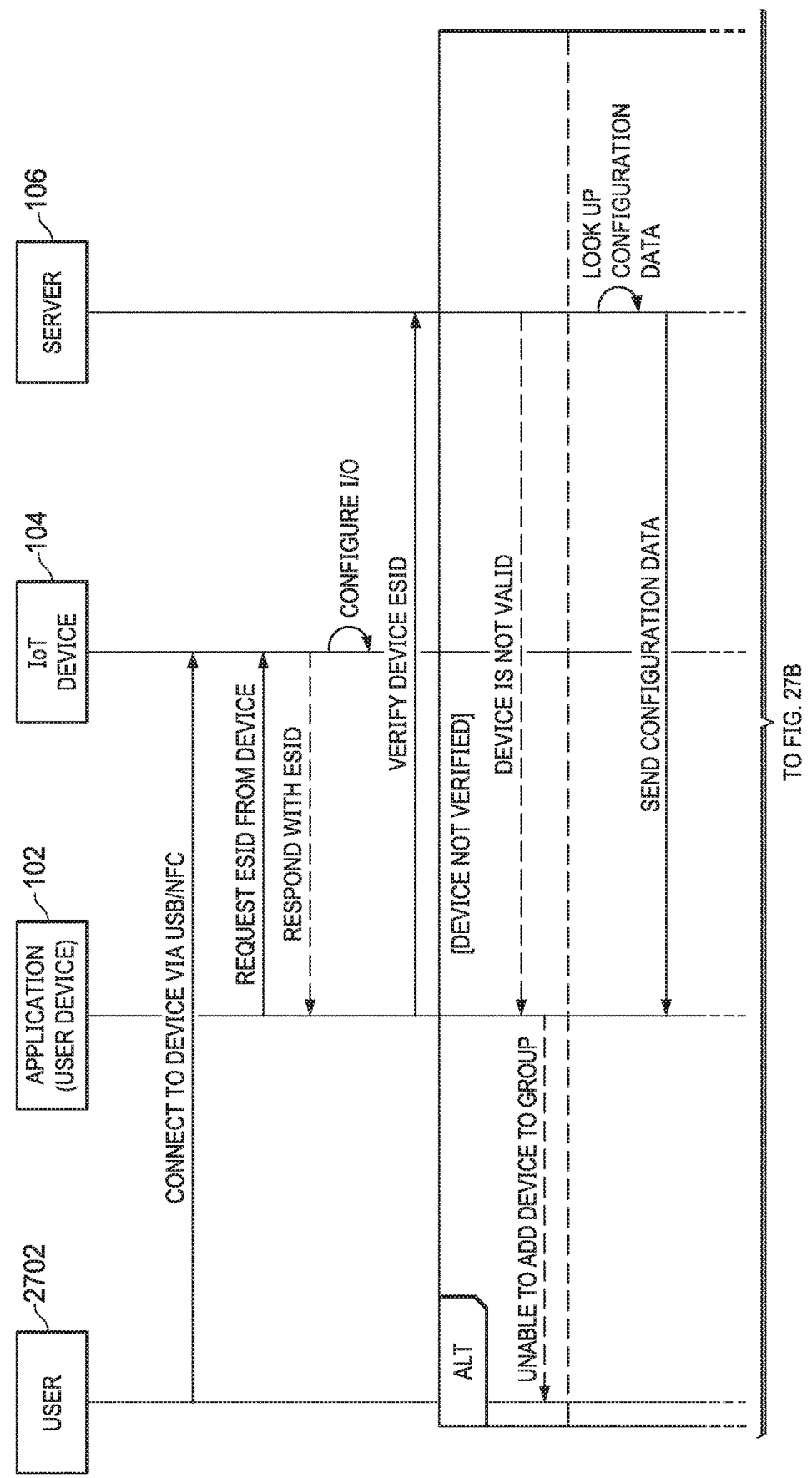
FIG. 27 illustrates a sequence diagram for the device bonding for a specific user similar to the sequence diagram of FIG. 12.
Figure 27B:
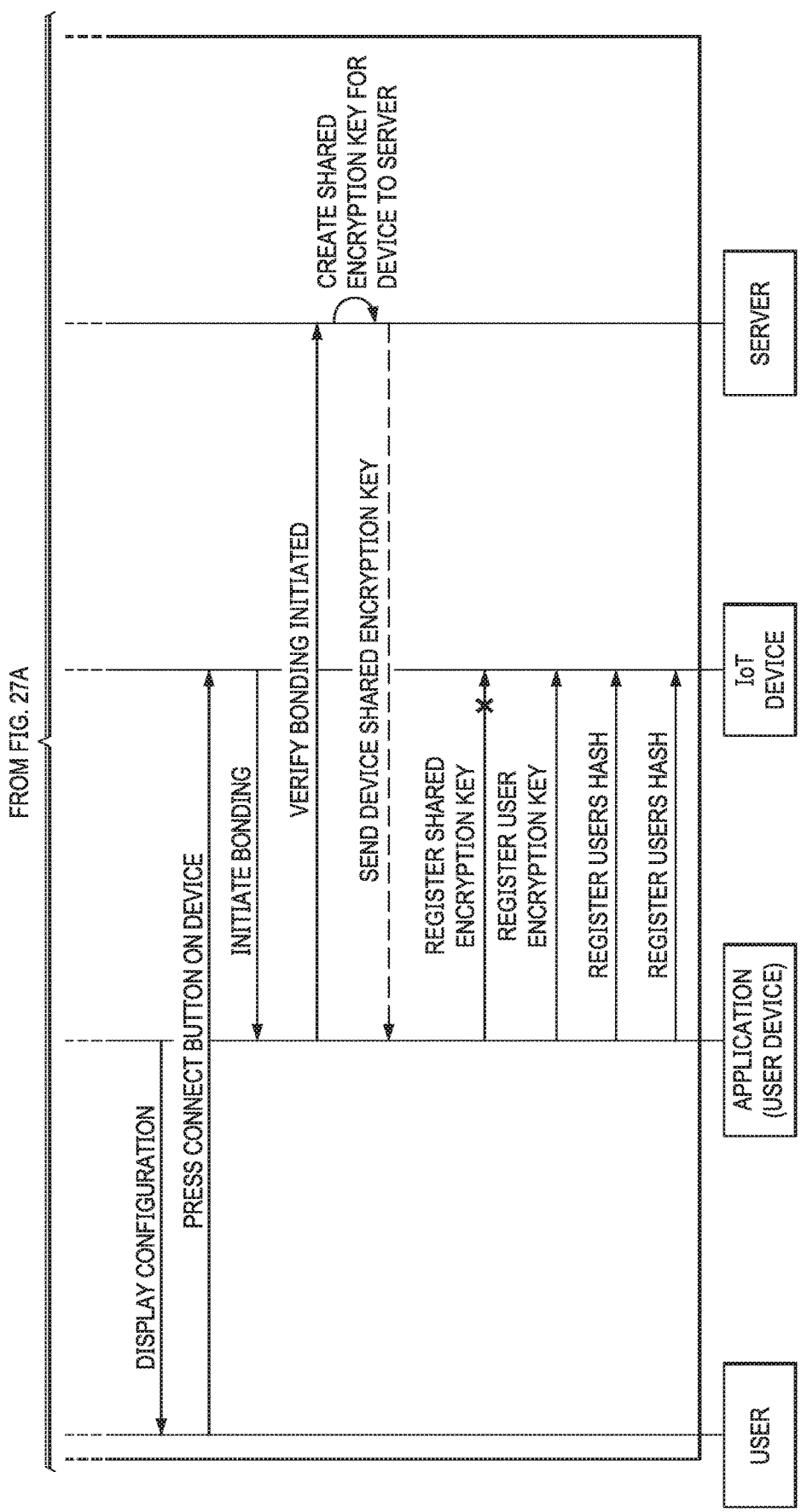
Figure 28:
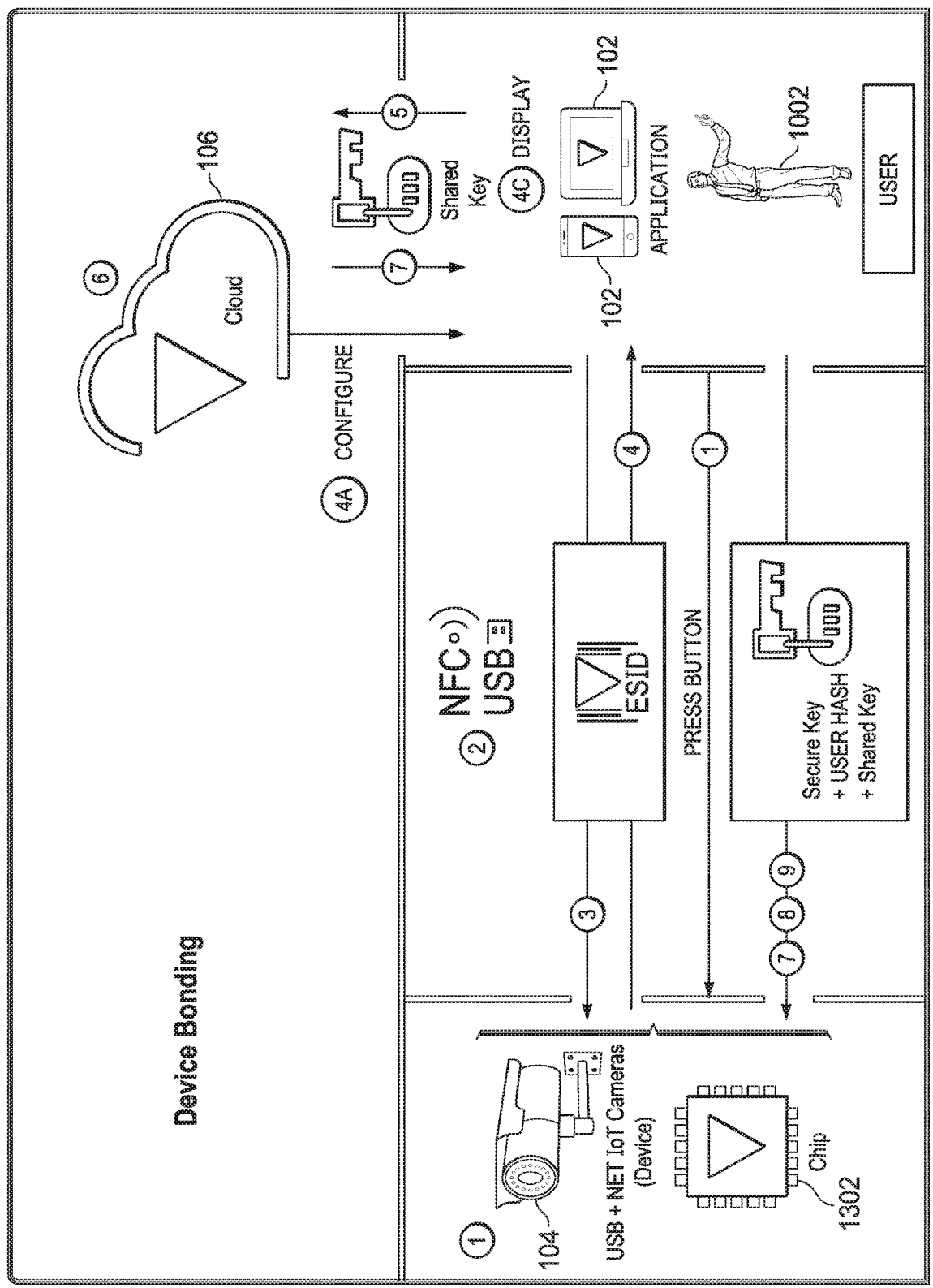
FIG. 28 illustrates a diagrammatic view for the operation of FIG. 27 for a specific user similar to the diagrammatic view of FIG. 13.

Referring now to FIG. 27 and FIG. 28, there is illustrated the process for bonding with the user device 102, the sequence illustrating specifically the bonding process for user device 102 to the IoT device 104, which was described similarly with respect to FIG. 12 and FIG. 13 hereinabove, this being different in that FIG. 12 and FIG. 13 required the use thereof by a group. With specific reference to FIG. 27, the first step is for a user 2702 to connect user device 102 to either NFC or USB, in order to establish a connection to the IoT device 104 and follow through the bonding process. The connection established between the user device 102 and the IoT device 104 will result in a request for an ESID to be transmitted from the IoT device 104 to the user device 102. The IoT device 104 will respond with its ESID and the application on the user device 102 will then verify the IoT device 104 ESID with the server 106. If the ESID is not valid, the device bonding process will terminate. In the illustration in FIG. 13, the device 104 is illustrated as being an IoT camera that has associated therewith an encryption engine in the form of a separate chip 1302. This separate chip 1302, as described hereinabove, is the device upon which the secure or private key of the user is stored and is also the device that encrypts data on the IoT device 104. It is basically the encryption engine of the IoT that forms a part of the IoT device 104. FIG. 13 illustrates the NFC/USB connection as path ② and the request for the ESID from the device 104 along path ③ with the ESID transmitted to the application 804 along path ④. The application 804 will then verify the ESID with the server 106 along path ⑤, with the validation operation occurring at ⑥. If the ESID is not valid, the device bonding process will terminate. If valid, the server 106 will then transmit configuration information along a path "④a" to the user device 102. As described above, this configuration information provides information regarding the specific IoT device 104, as defined at the server through a lookup operation associated with the received ESID of the IoT device 104. The user then presses a contact button on the IoT device 104 while still being connected to the IoT device 104 via USB/NFC. This is operation ① in FIG. 28. This differs from the operation in FIG. 12 and FIG. 13, in that the ESID is not transmitted until after the button is pressed.

After the button is pressed, the application 804 running on the user device 102 interfaces with the server 106 and the server 106 then creates a device shared key to establish a trusted relationship between the server and the IoT device 104, this being a device-to-server key. This device shared encryption key will be registered in the IoT device 104 through the system application's (804) connection to the IoT device 104, but not on the actual application 804 itself. This is illustrated as the path ⑦ which path illustrates the shared key being passed to the application 804 and then the user secure or private key plus the user hash plus the shared key is then relayed to the chip 1302 in the IoT device 104. This is a registration process of the shared encryption key with the IoT device 104. Paths ⑧ and ⑨ illustrate the transmission of the user hash+shared key, respectively. This operation comprises the registration of the user secure or private key into the IoT device 104 (and not in the application 804 on the user device 102), this being the created user private key from the user PIN/image dataset. It is noted that this diagram relates to registration of the user secure or private encryption key with the IoT device 104. For this registration of a single user, the private (or secure) key of the user will be registered with the IoT device 104. This means that it will be stored in memory on IoT device 104 for use with encryption/decryption. Thereafter, the user hash for the user will be transferred. Thus, the overall bonding process is a sequence wherein 1) the user disposes the user device 102 upon which the application 804 is running proximate to the IoT device 104 in order to establish a proximity-based communication link, 2) the application, once a connection is made, requests the ESID from the device (or just the connection results in interpretation by the IoT device 104 as being a request), 3) the device responds with ESID to the application 804, 4) the application verifies the IoT device 104 ESID with the server 106, 5) the server 106 verifies the ESID, 6) the user presses a contact button on the IoT device 104, 7) the server 106 creates a shared encryption key for device-to-server communication, 8) the shared encryption key is returned from the server 106 to the application 804, 9) the application 804 then registers the shared encryption key with the IoT device 106, and 10) the secure or private key of the user is registered with the IoT device 104. As described in hereinabove, this is a Write Only operation to memory on the IoT device 104 that cannot be read from the device 104.

With respect to FIG. 27, the paths are defined as follows: 2) connect via USB or NFC to IoT device 104 through application 804; 3) request ESID from IoT device 104; 4) receive ESID from IoT device 104; 5) validate ESID with server 106; 1) press button on IoT device 104; 6) create device shared key to define a trusted relationship between the server 106 and the IoT device 104; 7) send shared key from server 106 to IoT device 104 through application 804; and 8) send user secure or private key+user hash.

Figure 29:
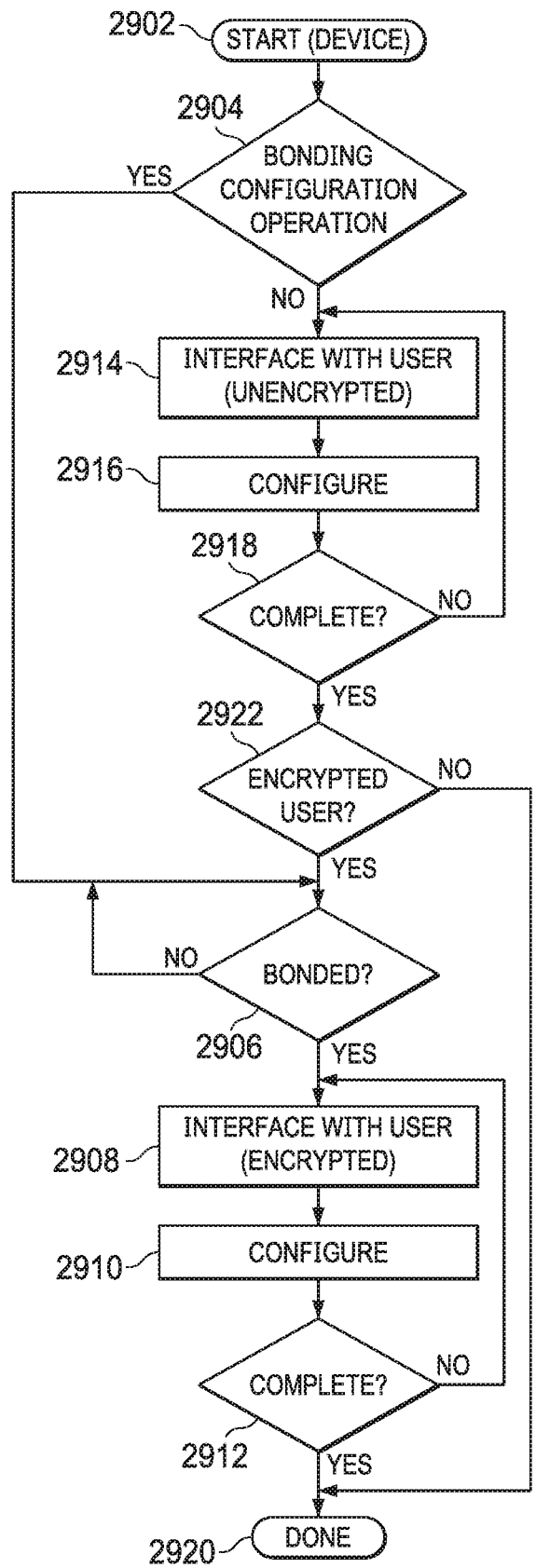
FIG. 29 illustrates a flowchart for the overall configuration operation of the IoT device for encrypted and non-encrypted interface with a user.

Referring now to FIG. 29, there is illustrated a flowchart depicting the general operation of initially configuring the IoT device 104 via both an encrypted operation and an unencrypted operation. This should be appreciated that an IoT device will have a normal mode of operation that a manufacture may desire to operate independently of the encrypted mode of operation, i.e., it may be that the manufacturer wants some communication link between its IoT device and its server via a preloaded and proprietary encryption key. As such, any user can interface with the IoT device for the use of operating it in a normal mode. For example, if a user purchases a smart refrigerator, it would be desirable that any user can at least use the IoT device in a normal functioning fashion independent of any user-based encryption requirement. For example, it may be that any user can access the IoT device and configure it to operate as a, for example, smart refrigerator. This may require the user to configure the network connection to a router and register the IoT device with the manufacturer. This, of course, requires some type of manufacturer encryption. Of course, the manufacturer now has access to all of data on the IoT device. There can be two modes of operation. A first mode can be one wherein the manufacturer allows an unencrypted configuration of the IoT device that allows communication to be effected with the manufacturer server in a manufacture-based encryption operation followed by the possibility of a user then going to a bonding process to provide the user's secure or private key for storage by the IoT device and subsequent communication on a user-encrypted basis. In this first mode, it is possible that certain information or manufacturer-encrypted data can be sent to the manufacturer's server via manufacturer-encrypted communication and user-encrypted data can be controlled by the user. It may be that the user wants to store this user-encrypted data, encrypted with the user's private key, for storage on the manufacture process server. In any event, when the user posse is private key is stored on the IOT device, and a communication with the user can only be decrypted by the user and any communication from the user to the IoT device can only be decrypted by the IoT device.

A specific reference to FIG. 29, the program is initiated at a block 2902 on the device and then proceeds to a decision block 2904 to determine if the IoT device is one that can only be interfaced through a bonding process, i.e., it is only accessible by the user on an encrypted user private key basis. If so, the program proceeds along a "Y" path and if not, the program proceeds along and "N" path. Along the "N" path, this indicates that IoT device can communicate in an unencrypted manner. The program flows to a function block 2914 to interface with a user without encryption. The program then flows to a function block 2916 where the user is allowed to interface with the IoT device and perform any type of configuration necessary to operate the device independent of a network, interface with a network or interface with a manufacturer's server. The program flows to a decision block 2918 to determine if the overall configuration operation is complete and, if not, it loops back around to the input of the function block 2914. When complete, the program flows along a "Y" path from decision block 2918 to a decision block 2922. The decision block 2922 determines whether an additional encryption operation is to be provided in order to allow encrypted communication with the user based on a user private key requiring the above described bonding process with respect to the user's interface with the IoT device. If not, the program flows along an "N" path to a Done block 2920 to terminate the configuration operation.

If, after allowing unencrypted interface of the user with the IoT device and then determining at the decision block 2922 that further encryption of the user is selected based on the above described bonding process or that the initial decision at decision block 2904 was that the IoT device only interfaces with a user based upon encryption associated with the above described bonding process, the program will flow from either decision block 2904 or decision block 2922 along the "Y" paths therefrom to decision block 2906 to determine if the user has been bonded with the IoT device in accordance with the bonding process described hereinabove. If so, the program proceeds from the decision block 2906 to function block 2908 to interface with the user in an encrypted manner. This allows a user to configure the IoT device through user private key-based encryption, as noted in a function block 2910. At this stage, if the IoT device was set up to only interface with the user exclusively with the user private key, all the configuration would be done at this step in an encrypted manner based on the user private key. If, however, some configuration or all configuration had been completed at the function one 2916 without using the user private key for encryption, thus configuration would be required. The program then flows to a decision block 2912 to determine when the operation is complete and, when complete, the program flows from decision block 2912 along a "Y" path to the Done block 2920. In this operation set forth in the flowchart of FIG. 29, the IoT device can interface exclusively with a user in accordance with the bonding process, requiring the unique private key of the user generated from the unique picture/image and user PIN, or from a combination of an unencrypted initial configuration (user private key encryption) followed by encrypted communication based on the user generated private key operation in accordance with the above described bonding process.

It will be appreciated by those skilled in the art having the benefit of this disclosure that these techniques for generating quantum resistant keys provide increased cryptographic security for communications between IoT devices and devices used by owners of the IoT devices to interface with the IoT devices. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. Apparatus for storing a private key on an Internet of Things (IoT) device for encrypted communication with an external user device having the same private key, comprising:
    a proximity-based communication interface;
    encryption circuitry for facilitating encryption and decryption operations on the IoT device with the private key;
    IoT functional circuitry for facilitating a predetermined IoT functional operation for the IoT device;
    the encryption circuitry including:
        a memory having a dedicated memory location allocated for storage of encryption keys utilized in the encryption and decryption operations,
        an encryption engine for performing the encryption and decryption operations with at least one of the stored encryption keys in association with the predetermined IoT functional operation of the IoT functional circuitry,
        an input and output interface for interfacing with the proximity-based communication interface to allow information to be exchanged with the external user device in a dedicated private key transfer operation,
        an internal system interface for interfacing with the IoT functional circuitry for transfer of information therebetween, and
        memory control circuitry for controlling storage of a received private key from the input and output interface for storage in the dedicated memory location in the memory, in a Write-only memory storage operation relative to the private key received from the input and output interface over the proximity-based communication interface, the memory control circuitry inhibiting any Read operation of the dedicated memory location in the memory through the input and output interface; and
    the IoT functional circuitry including:
        a controller for controlling the input and output interface and the memory control circuitry in the private key transfer operation to interface with the external user device to control the encryption circuitry for transfer of a private key from the external user device through the proximity-based communication interface for storage in the dedicated memory location in the memory,
        the controller interfacing with the encryption circuitry via the internal system interface, and
        operational circuitry for interfacing with the external user device over a peer to peer communication link and encrypting and decrypting information therebetween with the encryption engine in the encryption circuitry.

2. The apparatus of claim 1, wherein the proximity-based communication interface is only accessible with the input and output interface of the encryption circuitry for transfer of the private key and information associated with the transfer.

3. The apparatus of claim 1, wherein the encryption circuitry is contained on a first and encryption chip and the IoT functional circuitry is included on a second and IoT functional chip.

4. The apparatus of claim 1, wherein the proximity-based communication interface is a Near Field communication (NFC) interface.

5. The apparatus of claim 1, wherein the proximity-based communication interface is a Universal Serial Bus (USB) communication interface.

6. The apparatus of claim 1, wherein the encryption circuitry is operable in the private key transfer operation to receive a server-to-device encryption key over the proximity-based communication interface under control of the input and output interface for storage in the dedicated memory location in the memory, wherein the server-to-device encryption key allows the IoT functional circuitry to fumigate with a remote server, which remote server associated with the peer to peer communication link with the external user device.

7. The apparatus of claim 6, wherein the remote server is associated with the private key transfer operation.

8. The apparatus of claim 1, wherein the IoT functional circuitry includes a memory for storing a unique identification code for uniquely identifying the IoT device and wherein the private key transfer operation is initiated upon receiving a request over the proximity-based communication interface through the input and output circuitry for the unique identification code.

9. The apparatus of claim 8, wherein the encryption circuitry has an interrupt included as a portion of the internal system interface for notifying the IoT functional circuitry of the receipt of the request for the unique identification code.

10. A system for secure encrypted communication, comprising:
    an Internet of Things (IoT) device;
    a user device comprising a memory, the user device for communicating with the IoT device utilizing a private key unique to a user of the user device;
    a proximity-based communication interface disposed between the IoT device and the user device;

the IoT device including:

encryption circuitry for facilitating encryption and decryption operations on the IoT device with the private key, the encryption circuitry including:

a memory for storage of the private key, an encryption engine for performing the encryption and decryption operations with the stored private key, an input and output interface for interfacing with the proximity-based communication interface to allow information to be exchanged with the user device in a dedicated private key transfer operation, an internal system interface for interfacing with IoT functional circuitry for transfer of information therebetween, and memory control circuitry for controlling storage of a received private key from the input and output interface for storage in a dedicated memory location in the memory of the encryption circuitry, in a Write-only memory storage operation relative to the private key received from the input and output interface over the proximity-based communication interface, the memory control circuitry inhibiting any Read operation of the dedicated memory location in the memory of the encryption circuitry through the input and output interface, and the IoT functional circuitry for facilitating a predetermined IoT functional operation for the IoT device, and including:

a controller for controlling the input and output interface and the memory control circuitry in the private key transfer operation to interface with the user device to control the encryption circuitry for transfer of a private key from the user device through the proximity-based communication interface for storage in the memory of the encryption circuitry, the controller interfacing with the encryption circuitry via the internal system interface, and operational circuitry for interfacing with the user device over a peer to peer communication link and encrypting and decrypting information therebetween with the encryption engine in the encryption circuitry.

* * * * *